(12) United States Patent
Takeuchi et al.

(10) Patent No.: US 6,201,898 B1
(45) Date of Patent: Mar. 13, 2001

(54) VIDEO SIGNAL RECORDING APPARATUS, VIDEO SIGNAL REGENERATING APPARATUS, IMAGE CODING APPARATUS AND IMAGE DECODING APPARATUS

(75) Inventors: Seiichi Takeuchi, Neyagawashi; Masakazu Nishino, Kashiwarashi; Tatsuro Juri, Oosakashi; Yuji Fujiwara, Nisinomiyasi, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/298,988

(22) Filed: Apr. 26, 1999

Related U.S. Application Data

(62) Division of application No. 08/795,503, filed on Feb. 5, 1997.

(30) Foreign Application Priority Data

Feb. 5, 1996 (JP) .................................................. 8-018545
Apr. 2, 1996 (JP) .................................................. 8-079795
Jun. 3, 1996 (JP) .................................................. 8-139871

(51) Int. Cl.$^7$ ................................................... G06K 9/36
(52) U.S. Cl. ............................................................ 382/251
(58) Field of Search .................................. 382/251, 238

(56) References Cited

U.S. PATENT DOCUMENTS 5,764,808 * 6/1998 O'Connell et al. ................... 382/242
5,940,132 * 8/1999 Kondo et al. ......................... 348/441

FOREIGN PATENT DOCUMENTS 2-312383   12/1990  (JP) .
8-46958    2/1996   (JP) .
2548122    8/1996   (JP) .

* cited by examiner

*Primary Examiner*—Phuoc Tran
(74) *Attorney, Agent, or Firm*—Parkhurst & Wendel, L.L.P.

(57) ABSTRACT

To a conventional video signal recording apparatus, there are added additional information generating means and data replacement means for replacing data at a specified position in compressed data with additional information generated by the additional information generating means. This enables to provide a video signal recording apparatus and a video signal regenerating apparatus which are able to increase transmissible information content; an image coding apparatus that executes high-efficiency non-linear quantization at a small circuit containing no quantization table and also prevents error propagation; and an image decoding apparatus for regenerating coded data obtained in the image coding apparatus.

64 Claims, 41 Drawing Sheets

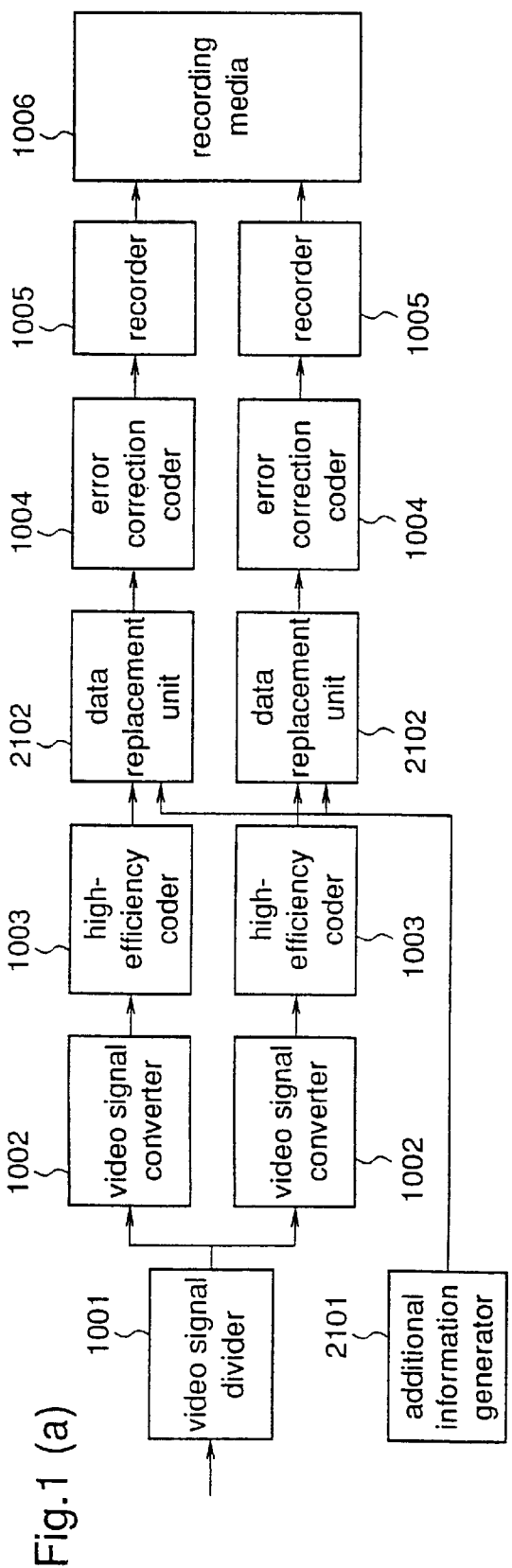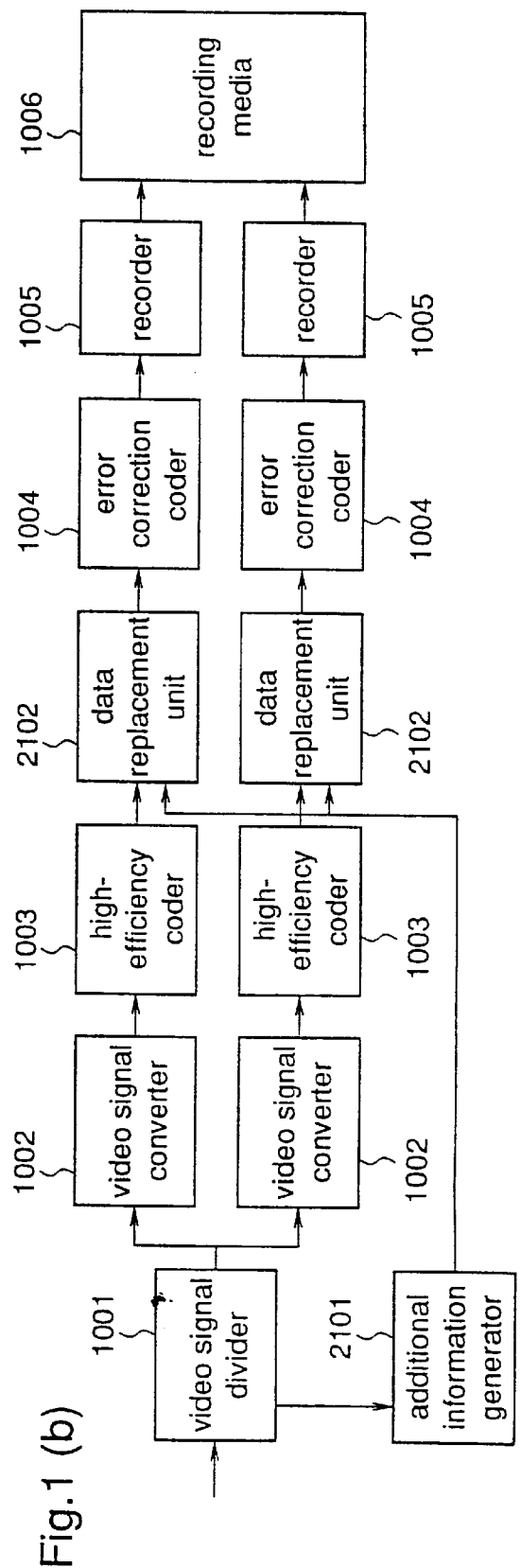

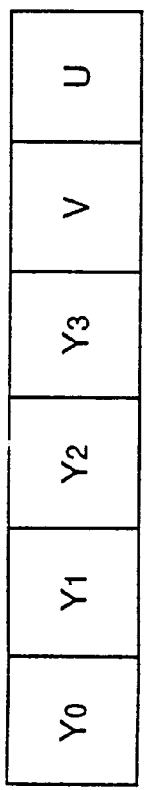
Fig.2 (a)
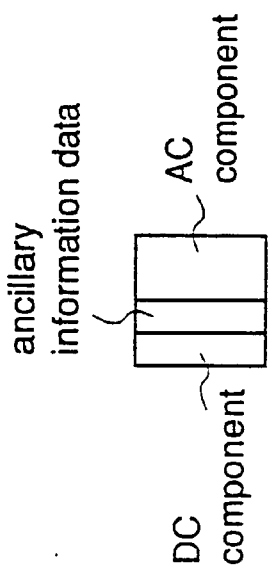
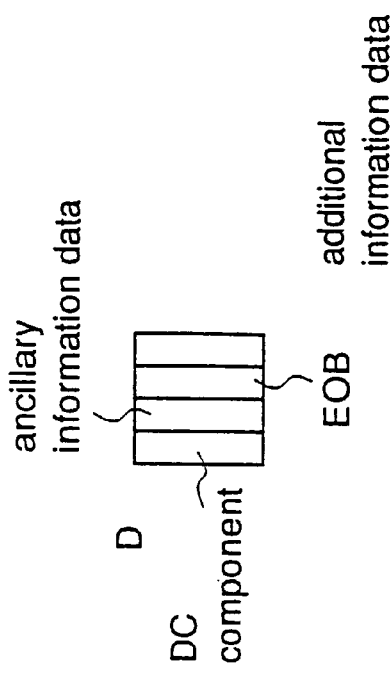
Fig.2 (b)
Fig.2 (c)
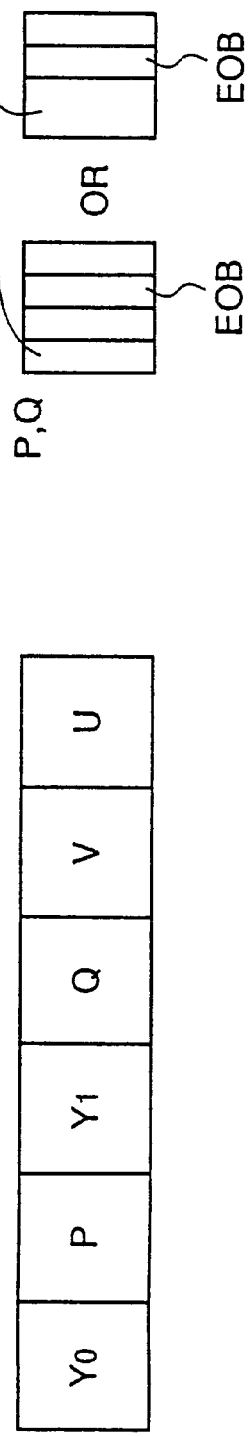

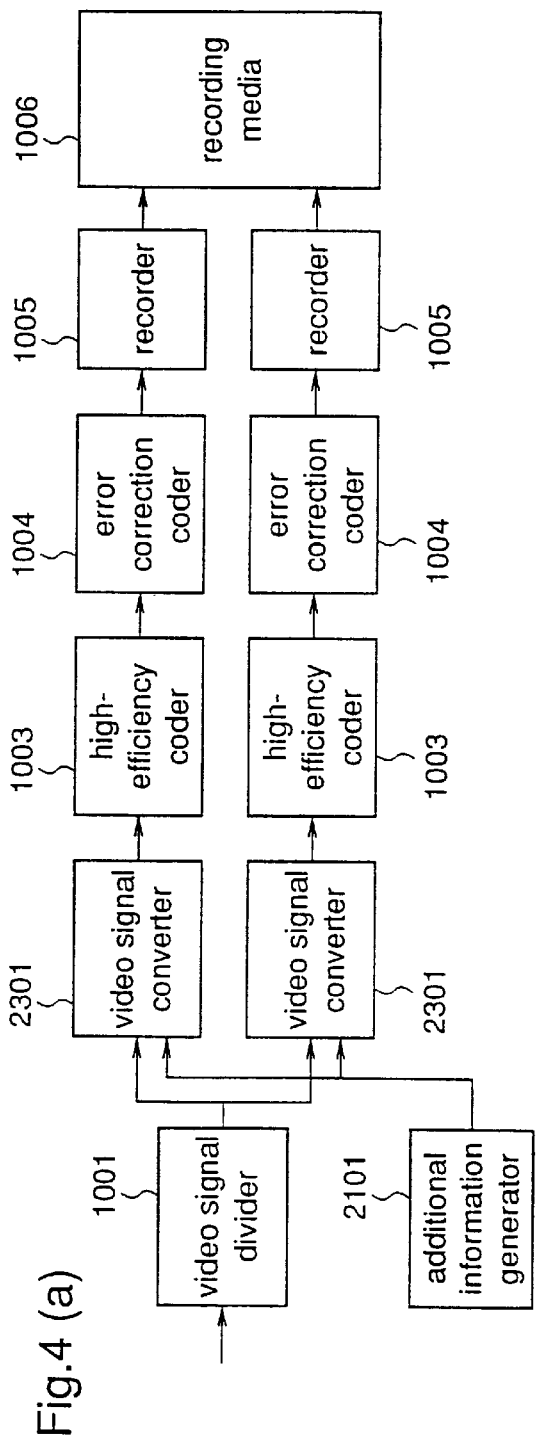
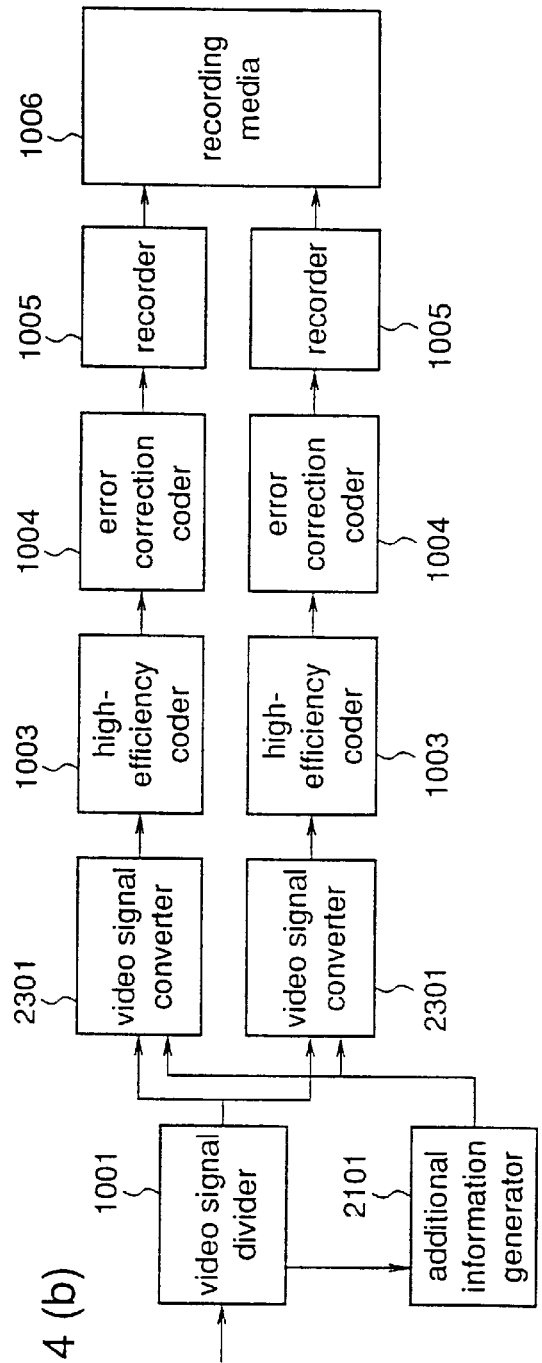
Fig.4 (a)
Fig.4 (b)

Fig.5 (a)

| Y0 | Y1 | V | U |

Fig.5 (b)

| Y0 | S | Y1 | T | V | U |

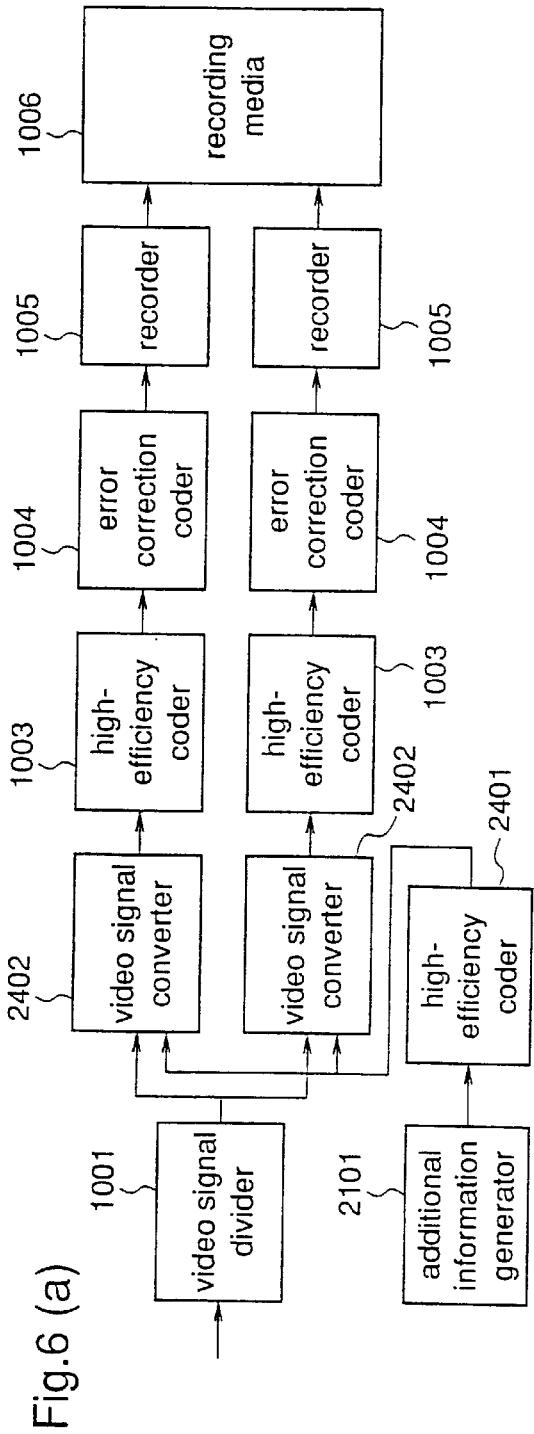
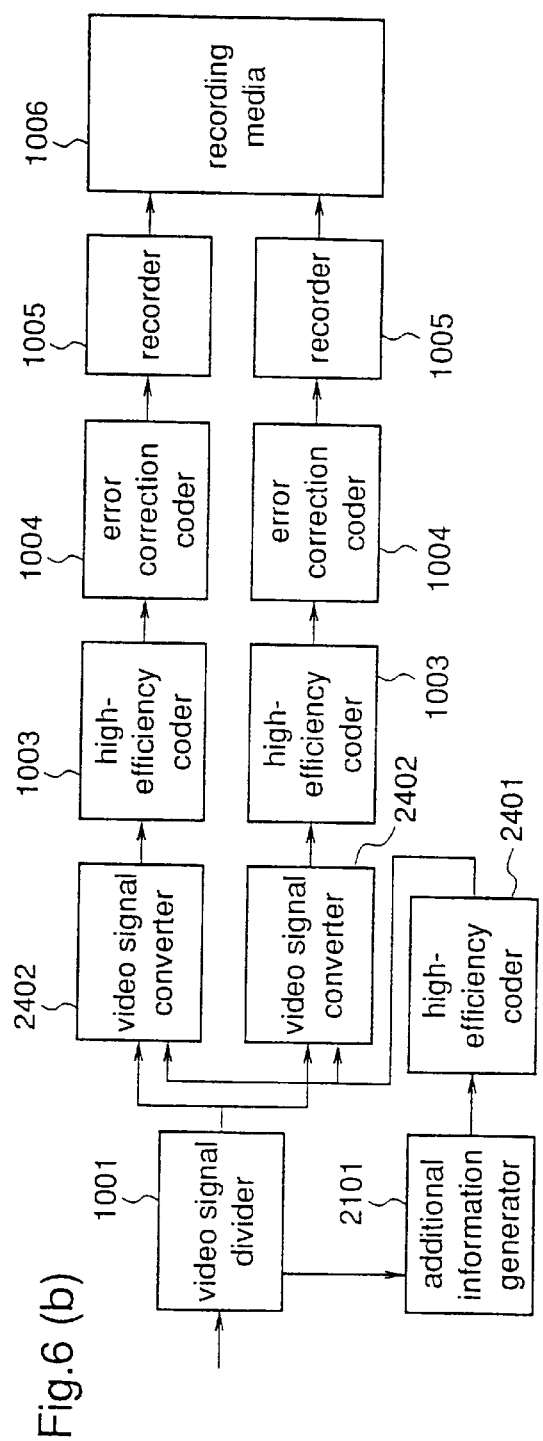
Fig.6 (a)
Fig.6 (b)

Fig.7 (a)

| Y0 | Y1 | V | U |

Fig.7 (b)

| Y0 | S' | Y1 | T' | V | U |

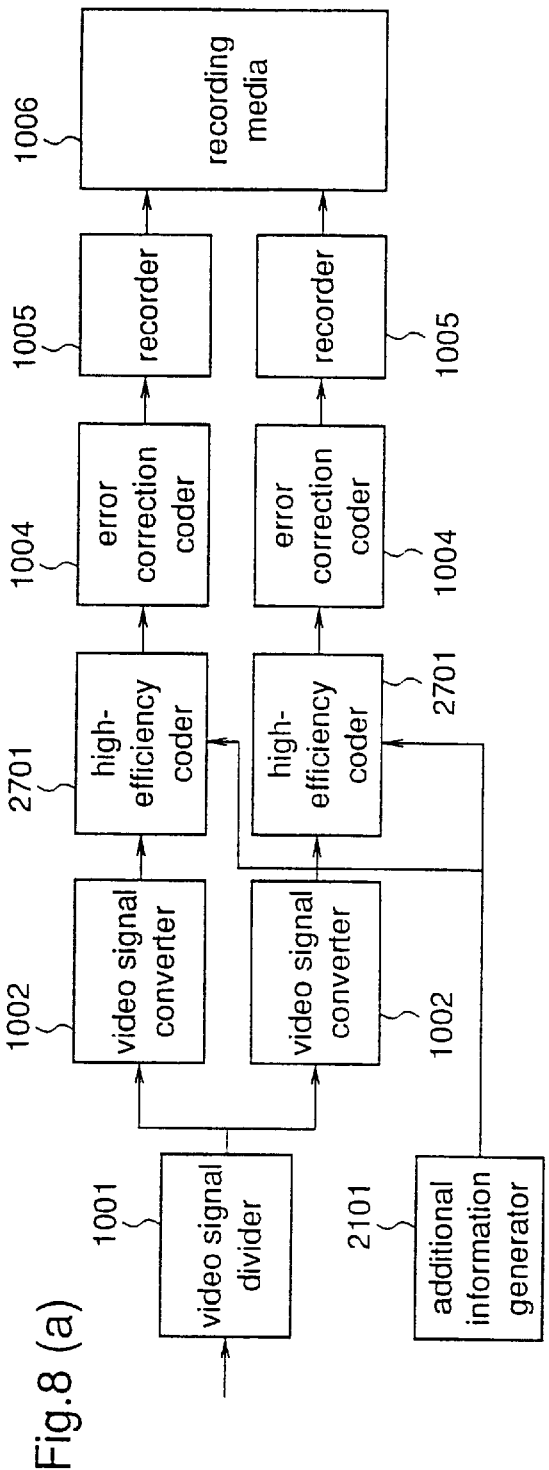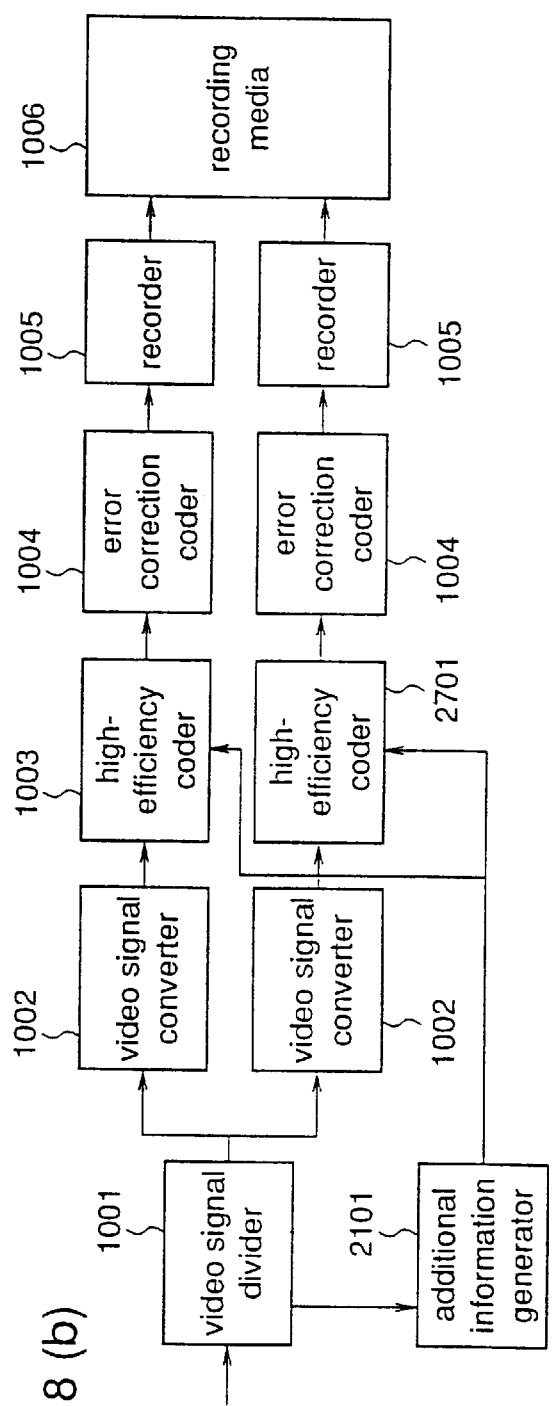

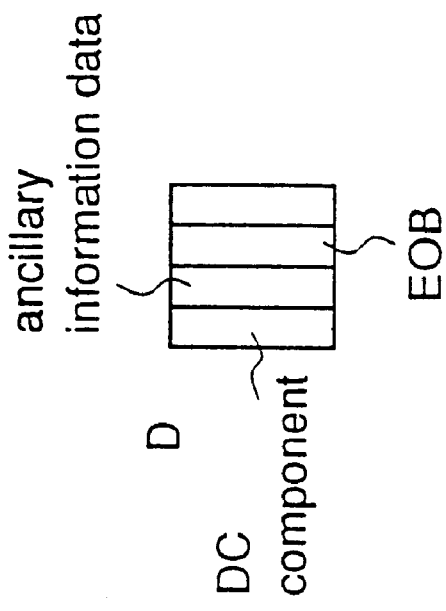
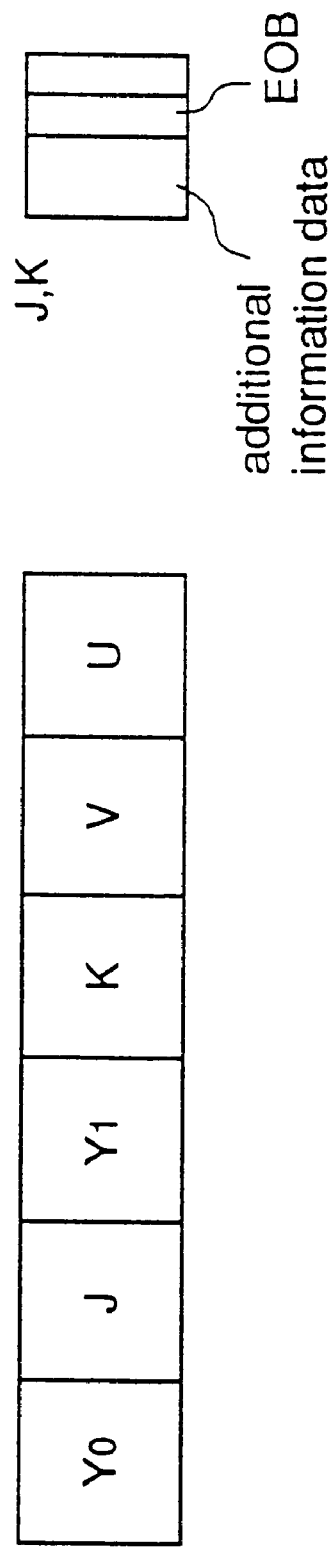
Fig.9 (a)
Fig.9 (b)

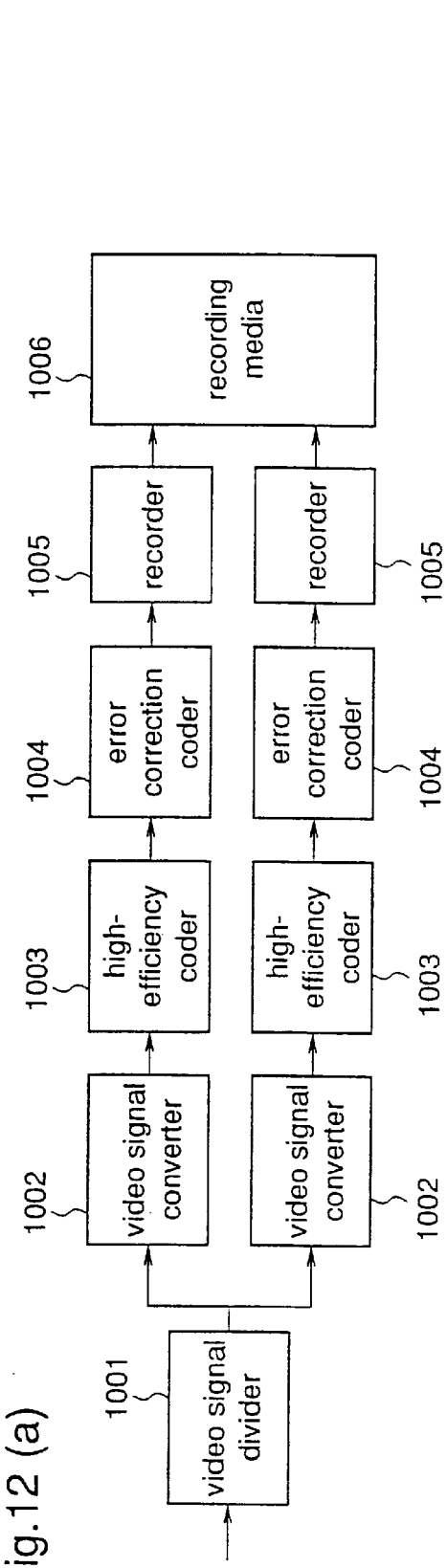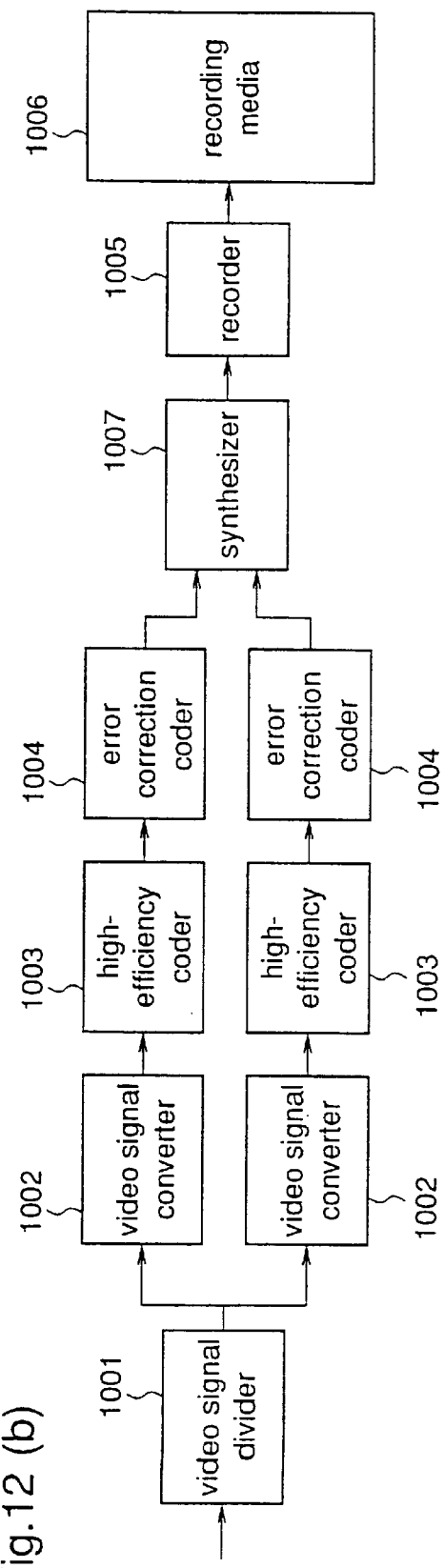

Prior Art
Fig.13 (a)   411 digital signal
                                      Y   Y   Y   Y   V   U
Fig.13 (b)   422 digital signal
                                        Y   Y   Y   Y   V   V   U   U
Fig.13 (c)   211 digital signal
                                        Y   Y   Y   V   U
Fig.13 (d)   pseudo - 411 digital signal
                                        Y   D   Y   D   V   U
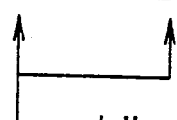
                                                      adding dummy signal Prior Art
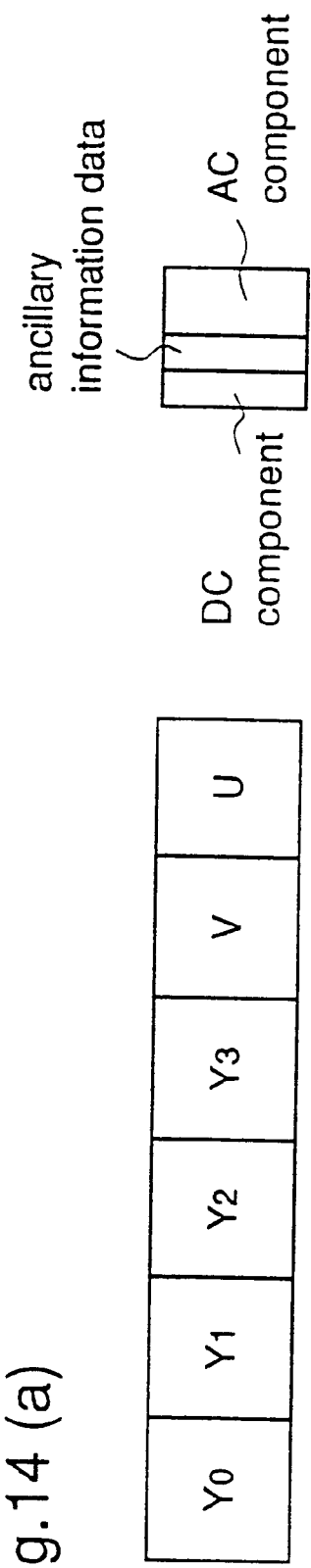
Fig.14 (a)
Fig.14 (b)
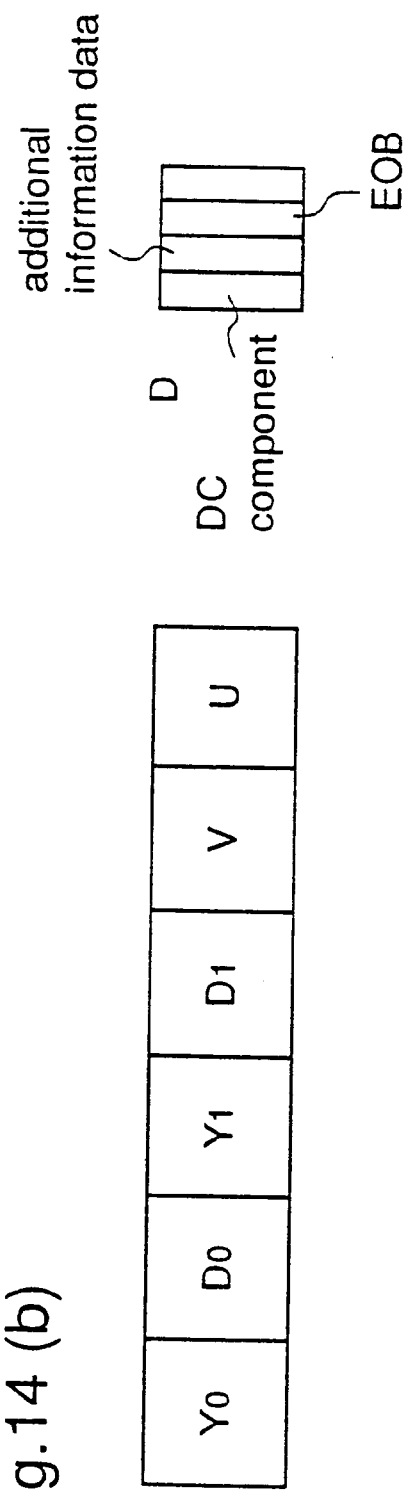

Fig.15 (a) Prior Art
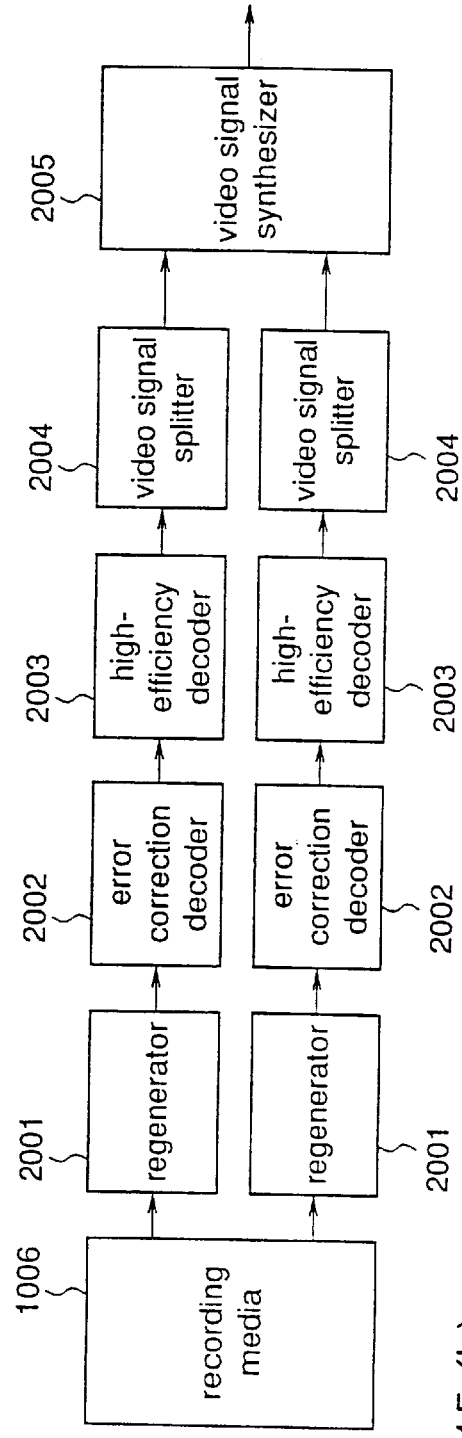
Fig.15 (b)
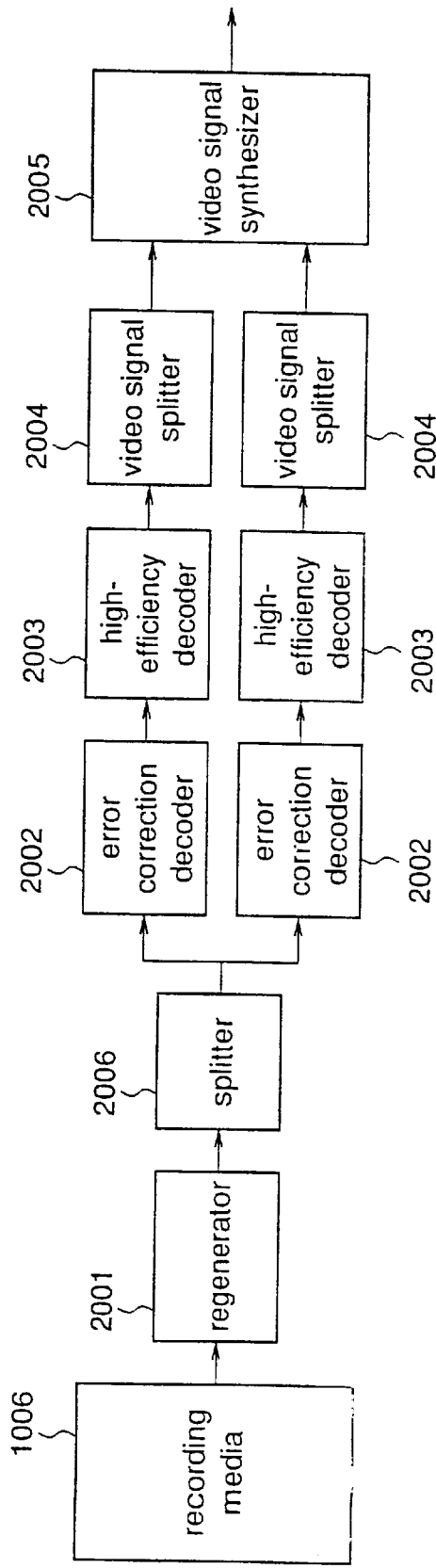

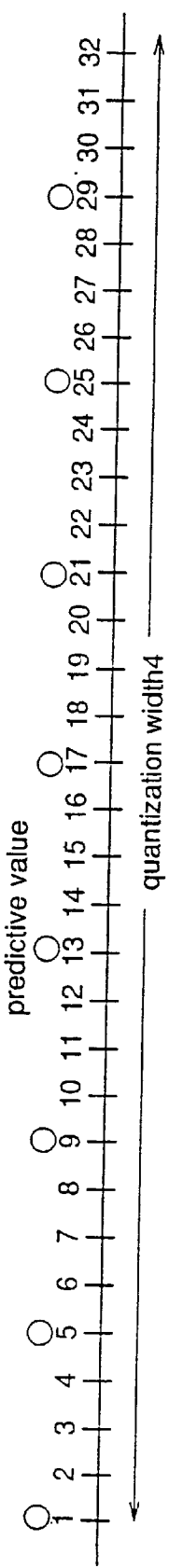
Fig.17 (a)  linear quantization representative value / predictive value
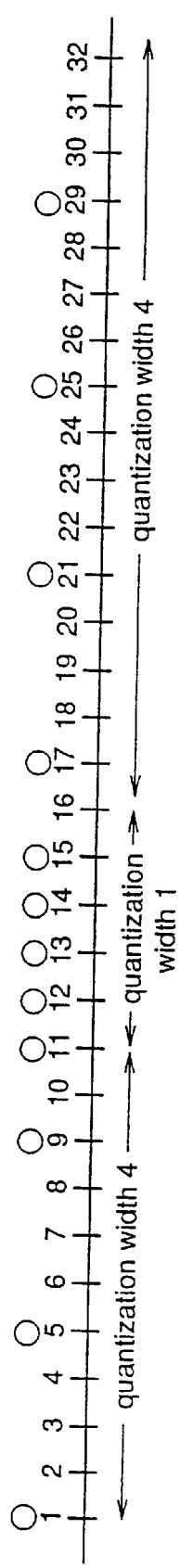
Fig.17 (b)  addition of quantization value
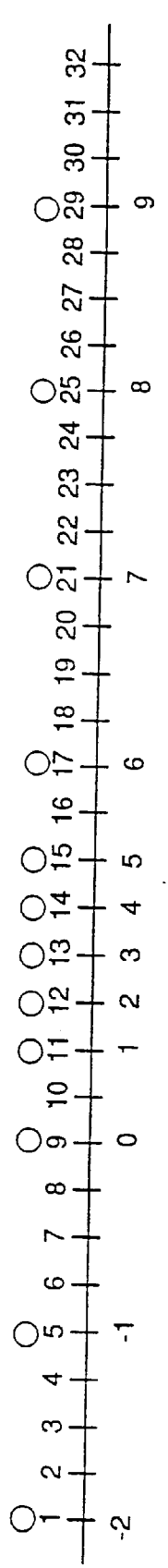
Fig.17 (c)  allocation of quantization value
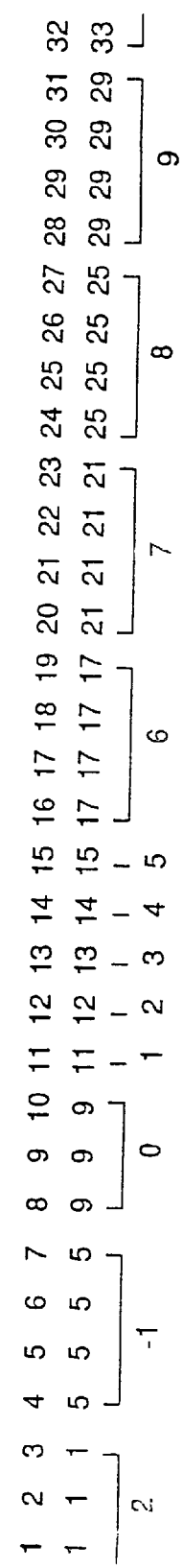
Fig.17 (d)  quantization

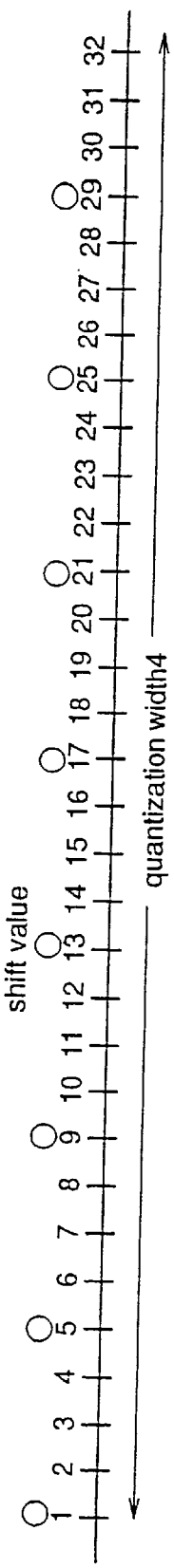
Fig.20 (a) linear quantization representative value
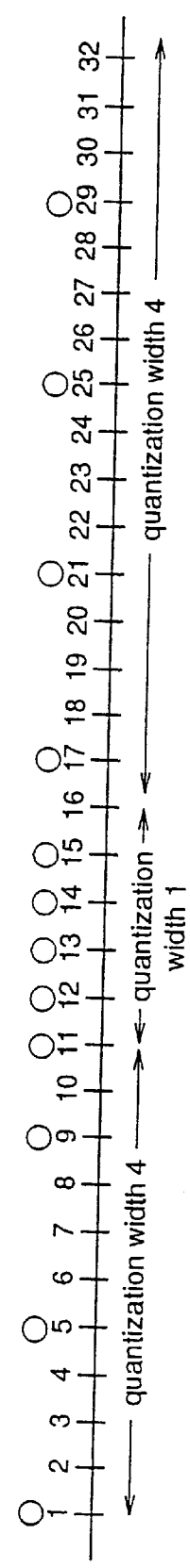
Fig.20 (b) addition of quantization value
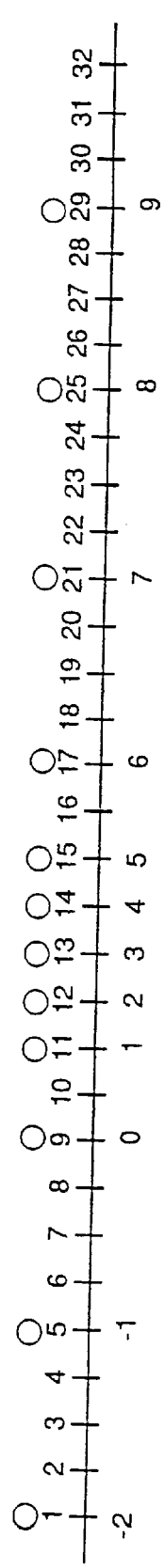
Fig.20 (c) allocation of quantization value
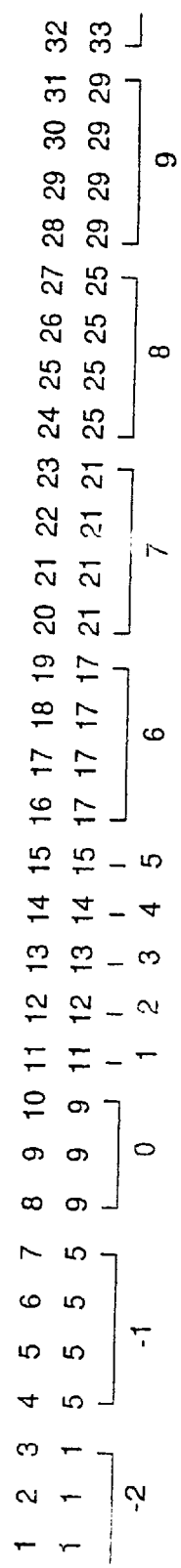
Fig.20 (d) quantization

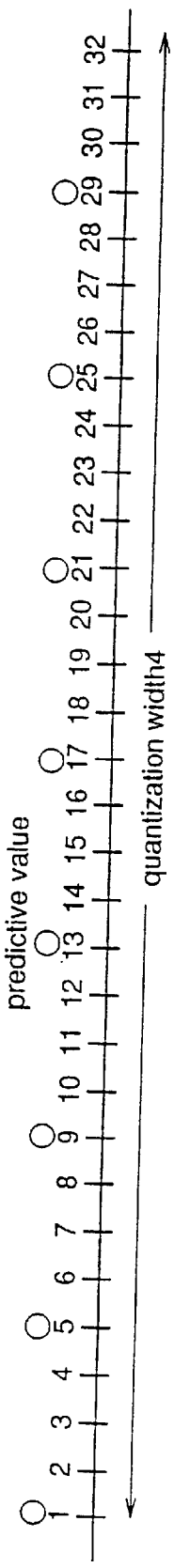
Fig.23 (a) linear quantization representative value
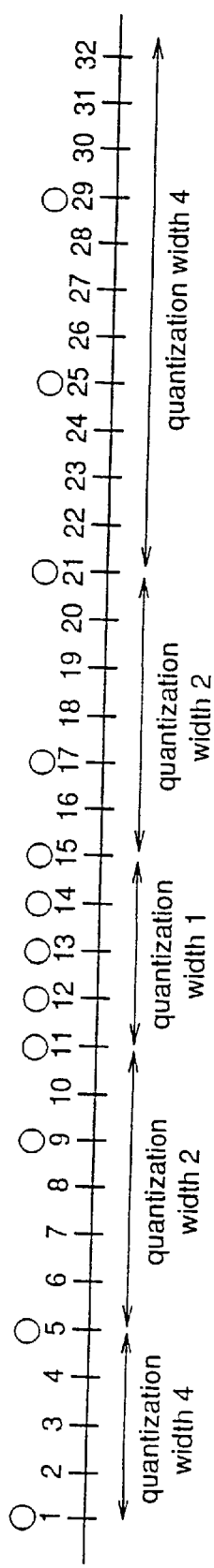
Fig.23 (b) addition of quantization value
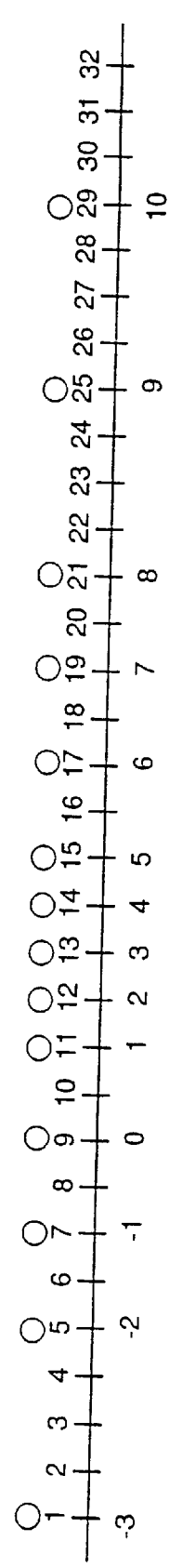
Fig.23 (c) allocation of quantization value
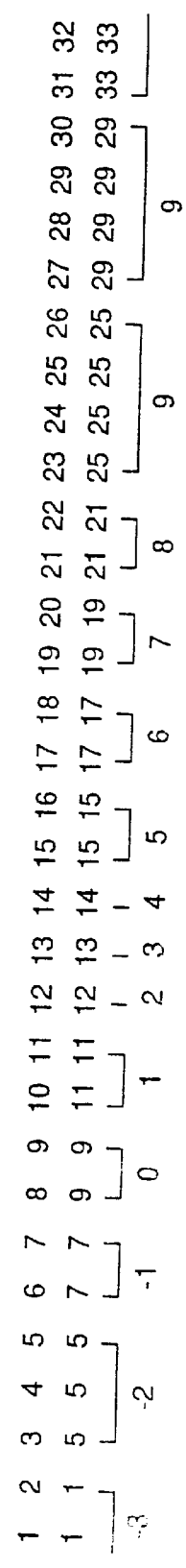
Fig.23 (d) quantization

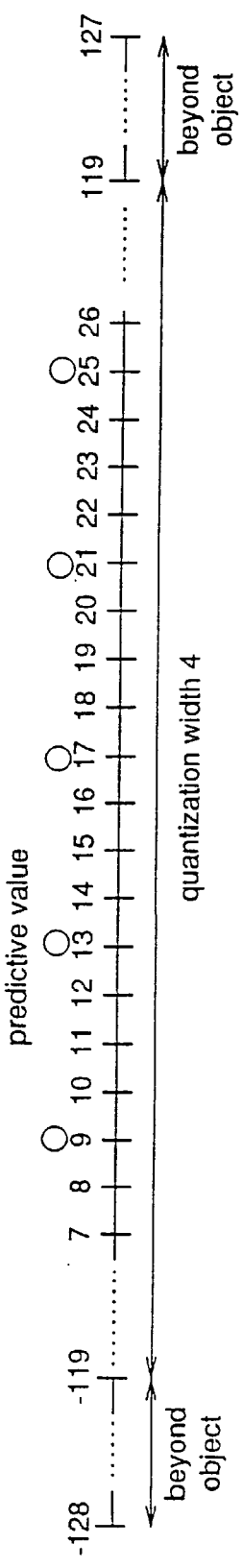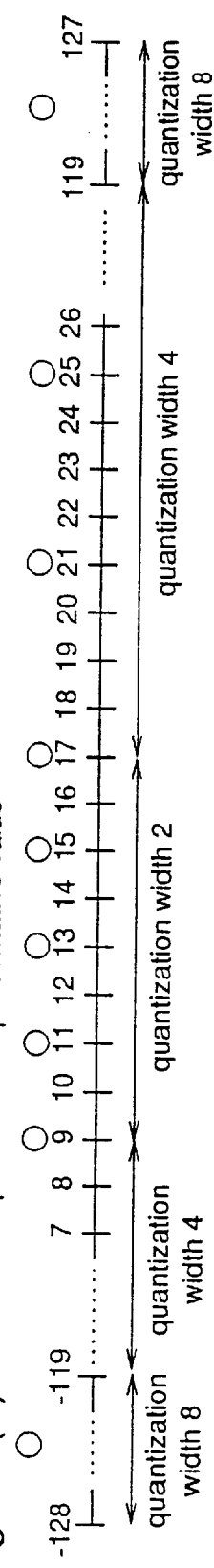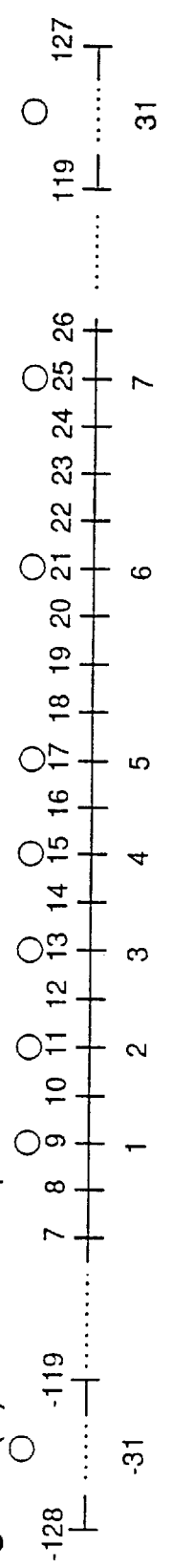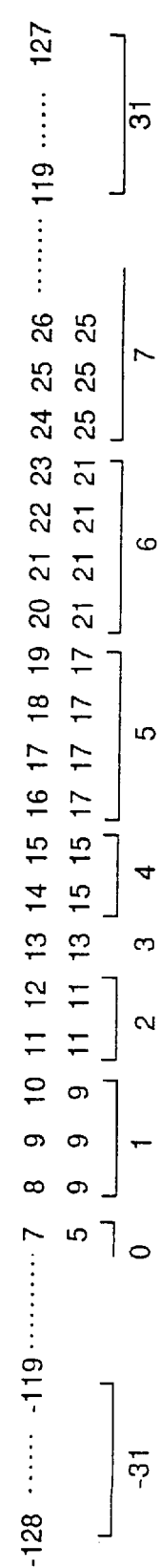
Fig.32 (a) linear quantization representative value
Fig.32 (b) addition of quantization representative value
Fig.32 (c) allocation of quantization value
Fig.32 (d) quantization

Fig.36 (a) coding

Fig.36 (b) decoding example : rounding processing of from 3-bit to 2-bit

| linear quantization | | | | | | | | | |
|---|---|---|---|---|---|---|---|---|---|
| input value | 0 | 1 | 2 | 3 | 4 | 5 | 6 | 7 | 8 |
| quantization representative value | 0 | | 2 | | 4 | | 6 | | 8 |
| replacement with representative value | 0 | 0 | 2 | 2 | 4 | 4 | 6 | 6 | 8 |

| non-linear quantization | | | | | | | | | |
|---|---|---|---|---|---|---|---|---|---|
| input value | 0 | 1 | 2 | 3 | 4 | 5 | 6 | 7 | 8 |
| quantization representative value | | 1 | | 3 | 4 | | 6 | | |
| or | 0 | | | 3 | 4 | | | 7 | |

VIDEO SIGNAL RECORDING APPARATUS, VIDEO SIGNAL REGENERATING APPARATUS, IMAGE CODING APPARATUS AND IMAGE DECODING APPARATUS

This is a Division of application Ser. No. 08/795,503 filed Feb. 5, 1997.

FIELD OF THE INVENTION

The present invention relates to a video signal recorder for recording video signals, a video signal regenerator for regenerating the recorded signals, an image coding apparatus for compressing and recording image data from video signals by coding, and an image decoding apparatus for regenerating the coded and recorded image.

BACKGROUND OF THE INVENTION

Recently there have been developed various video signal recorder that code and compress video signals of digital data by a specified mode and perform a digital recording. It is, however, required much expenses and labor for the standardization of compression modes and compressed algorithm hardware, e.g., LSI. In order to reduce the development costs for early development, it is preferable to apply a known standard and its corresponding accumulated techniques, a known hardware of compressed algorithms and the like. Hence there have been developed novel video signal recorders depending on the purpose.

For example, the mode employing 411 digital video signal in which the ratio of luminance signal, chrominance signal and another chrominance signal is 4:1:1, is widely used in general apparatuses for domestic use. While, depending on the purpose, 422 digital video signal containing more chrominance signal may be more preferable in terms of image quality and the like. There have been developed apparatuses that can treat 422 digital video signal by applying the standards and hardware of algorithms for 411 digital video signal.

FIGS. 13(a) to 13(d) are diagrams illustrating the construction of the signal. FIG. 13(a) shows 411 digital video signals that is generally used. FIG. 13(b) shows 422 digital video signal used when high image quality is required. In Figures, "Y" indicates luminance signal, "V" and "U" indicate chrominance signal.

In order to apply such apparatuses as developed in the standard for 411 digital video signal to 422 digital signal, the following processing is performed. That is, 422 digital video signal as shown in FIG. 13(b) are split into 211 digital video signal, which signal are then appended with dummy signal to create pseudo-411 digital signal as shown in FIG. 13(d), followed by necessary processing. The signal shown in FIG. 13(d) has the same format as that of FIG. 13(a), allowing to apply the apparatus with the standard for 411 digital video signal. The two split signals are to be synthesized when recording or regenerating.

A description will be given of a conventional video signal recorder and a video signal regenerator, each treating 422 digital signal as described.

Referring to FIG. 12(a), there is shown the construction of the conventional video signal recorder. A video signal splitter 1001 splits 422 digital video signal with luminance signal to chrominance signal ratio of 4:2:2 into two 211 digital video signals with that ratio of 2:1:1, based on a specified split format. A video signal converter 1002 adds a specified dummy signal into the luminance signal in the input 211 digital video signal to convert it into 411 digital video signal with the luminance signal to chrominance signal ratio of 4:1:1. A high-efficiency coding apparatus 1003 performs a specified high-efficiency coding of the input 411 digital video signal to create compressed data. An error correction coding apparatus 1004 appends a specified error correction coded data to the compressed data. A recorder 1005 records the output of the error correction coding apparatus 1004 in a recording media 1006, e.g., tape media such as VTRs, disk media such as optical disks. In the recording media 1006, digitized data is recorded for the retention.

The video signal recorder so constructed will perform the aforesaid compression, coding and recording as follows. The video signal splitter 1001 abolishes, from the input video signal, portions other than a significant area as a processing object, and then splits 422 digital video signal with the luminance signal to chrominance signal ratio of 4:2:2, into two 211 digital video signal with that ratio of 2:1:1, based on a specified split format. The two split 211 digital video signal are separately input into either of the two video signal converters 1002.

Each video signal converter 1002 appends a specified dummy signal to the luminance signal in the input 211 digital video signal, to convert it into 411 digital video signal with the luminance signal to chrominance signal ratio of 4:1:1. The data of the 211 digital video signal is sequenced in this order: luminance signal (Y), luminance signal (Y), chrominance signal (V), and chrominance signal (U), as shown in FIG. 13(c). The above data is then converted into 411 digital video signal with the sequencing of the luminance signal (Y), dummy signal (D), the luminance signal (Y), dummy signal (D), the chrominance signal (V), and the chrominance signal (U), as shown in FIG. 13(d). All the dummy signal (D) are identical data. Each video signal converter outputs the converted 411 digital video signal to the high-efficiency coder 1003.

Each coder 1003 performs a high-efficiency coding of the input 411 digital video signal by employing a specified high-efficiency coding algorithm, and then outputs it as compressed data.

Referring to FIGS. 14(a) and 14(b), the format of the compressed data will be exemplified. The coder 1003 inherently performs a high-efficiency coding of 411 digital video signal by the algorithm utilizing DCT(discrete cosine transform). A DCT block consists of 8×8 pixels. A macro block consists of four DCT blocks of luminance signal (Y), one DCT block of chrominance signal (V) and one DCT block of chrominance signal (U). The compressed data of this macro block is sequenced as shown in FIG. 14(a). The sequence of each DCT block is first DC components, then additional information data, and AC components. In this example, since there is employed pseudo-411 digital signal based on 422 digital signal, the sequence of the DCT block is as shown in FIG. 14(b), and that of the block of the dummy signal (D) is first a specified DC components, then additional data and finally EOB (end of block).

Each coder 1003 outputs such compressed data as shown in FIG. 14(b) to the error correction coder 1004. Each coder 1004 appends error correction codes to the input compressed data by a specified mode to obtain the error correction coded data, and outputs it.

The recorder 1005 records the error correction coded data in a specified position of a specified recording media 1006. Thus, the conventional video signal recorder codes/compresses 422 digital video signal and then records it.

It is noted that the video signal recorder may have two recorders 1005 which separately write in the recording media 1006, as shown in FIG. 12(*a*), or may have a synthesizer 1007 that synthesizes two output results and then write in the recording media 1006. The operation of the latter is the same as that of the former, except the synthesize and the writing.

Referring to FIG. 15, there is shown the construction of a conventional video signal recorder, in which video data as recorded in the above manner is regenerated to obtain videos. A recording media 1006 is to be recorded video data (error correction coded data) in the conventional video signal recorder, as previously described. A regenerator 2001 regenerates the error correction coded data from the recording media 1006. An error correction decoder 2002 performs the error corrections based on the error correction codes added in the video signal recorder to obtain compressed data, and then outputs it. A high-efficiency decoder 2003 performs the reverse conversion of the high-efficiency coding performed by the video signal recorder to decode digital video signal. A video signal separator 2004 separates the dummy signal added in the video signal recorder out of 411 digital video signal (luminance signal to chrominance signal ratio is 4:1:1) which has been decoded by the high-efficiency decoder 2003, to output 211 digital video signal (luminance signal to chrominance signal ratio is 2:1:1). A video signal synthesizer 2005 synthesizes 211 digital video signal output from two video signal separators 2004, based on a specified synthetic format, thereby obtaining 422 digital video signal with luminance signal to chrominance signal ratio of 4:2:2.

The video signal regenerator so constructed will regenerate the data recorded in the recording media as follows.

The regenerator 2001 regenerates the error correction coded data recorded in a specified position of the recording media 1006. The error correction decoder 2002 performs the error correction based on the error correction codes added in the video signal recorder to output compressed data. The high-efficiency decoder 2003 decodes the compressed data by performing the reverse conversion of the high-efficiency coding in the video signal recorder, to output it as 411 digital video signal. The video signal separator 2004 separates the dummy signal added by the video signal recorder from the 411 digital video signal decoded by the high-efficiency decoder 2003, to output the 211 digital video signal. The video signal synthesizer 2005 synthesizes, based on the synthetic format, the 211 digital video signals as the outputs of the two vide signal separators 2004 to obtain the 422 digital video signal, and then outputs it. The separated dummy signal is to be discarded.

As described above, the conventional video signal recording apparatus and video signal regenerating apparatus are for recording and regenerating 422 digital video signal, respectively, according to the standards and devices basically for 411 digital video signal.

It should be noted that in the conventional video signal recording apparatus dummy signal is added to the original video signal, while in the conventional video signal regenerating apparatus the dummy signal is separated and then discarded. Such useless data treatment in the recording and transmission of video signal will decrease the efficiency. Particularly on recording media, dummy signal requires a storage capacity like video signal. This will cause disadvantages to the effective use of recording media.

When obtaining digital data to be treated by computers and the like, based on the video signal of such as TV signal, it is general that image data comprising digitized video signal is first obtained, the image data is then compressed and coded, and the obtained data is recorded or transmitted. The digitized image data is in a sequence of pixel data having pixel values indicating luminance and chrominance, and the image data is coded by processing to obtain coded image data.

As a general method for compressing/coding image data based on video signal, there is predictive coding. The predictive coding is a system in which a predictive value for an input pixel that is the object of coding is generated, and a difference value between the input pixel and the predictive value is subjected to non-linear quantization, the obtained data is then transmitted. When the image from video signal is treated, a predictive value is obtained by predicting a pixel value at a certain point, from its periphery pixels, based on that adjacent parts tends to have the same or an approximate pixel value indicating luminance and chrominance. The predictive coding has the advantages that the circuit scale for an apparatus is small and the compression rate is low. When data rate after compression is high, high-quality image is obtainable. This is the reason why the predictive coding has been widely used.

FIG. 43 is a conceptual diagram explaining the linear processing and non-linear processing in quantization. Input data has a certain dynamic range. That is, the input data is represented in the range of d-bit as a dynamic range, and, the linear processing is possible. When n-bit output data is obtained by quantizing the input data, a suitable number of quantization representative values are selected, and quantizing values are allocated to the representative values. To each input data, there is given a quantizing value allocated to a quantization representative value that is approximate to the input data. By setting the number of the quantization representative values to not more than $2^{2n}$, the output data can be treated by n-bit.

As shown in FIG. 43, to set quantization representative values at uniform intervals is linear quantization. When an expected value is previously obtained as in the predictive coding, non-linear quantization in which the quantization representative values are set densely in the vicinity of the expected value, and widely as the distance from the expected value is increased.

In FIG. 43, there is shown a rounding processing of from 3-bit to 2-bit. By setting four ($2^2$) quantization representative values against eight ($2^3$) ones, the output data can be represented by 2-bit.

In the linear processing, the quantizing representative values are set, for example, by selecting every other piece, to assign the quantizing value. For input data having the values from 0 to 7, they are replaced with the adjacent quantizing representative value to give a quantizing value assigned to the respective representative value in the following manner. For the value of 0 or 1, its quantizing representative value is 0, for the value of 2 or 3, its quantizing value is 2, and the like.

In the non-linear processing, when an expected value for the input data is 3, for example, the setting of quantizing values will be set densely in the vicinity of 3, and roughly as the distance from 3 is increased. As the quantizing width is creased, that is, as the interval of the quantizing representative values is increased, the number of data replaceable with the quantizing representative value is increased. This shows that data of different value tends to be treated equally. Therefore, nearer the vicinity of the expected value, the magnitude of the quantizing value reflects more precisely the magnitude of the input value.

The non-linear quantization utilized in the predictive coding is performed in various systems. Since it is normally difficult to perform the non-linear quantization by such a simple operation as in the linear quantization, that is performed by referring to a table such as a ROM table. This might increase the circuit scale and the processing costs, resulting in the cost increase and the reduced processing speed.

On the other hand, the predictive coding has the problem that transmitted data is a difference value between an input value and a predictive value and, when an error of the predictive value occurs, such an error will be propagated at the regeneration. Thus in order to suppress such an error propagation within a certain range, there has been employed a method of inserting a PCM value periodically. This method, however, decreases the compression rate and causes the unevenness in image quality, failing to solve the problem.

A method of preventing the error propagation without reduction in compression rate is disclosed, for example, in Japanese Patent Application No. 60-160599. In this method, among a plurality of non-linear quantizing units there is selected one unit whose quantization width in the vicinity of a predictive value is small, to perform the quantization. This method basically utilizes the direct quantization of input pixel values, not the quantization of differences. As a result, the predictive value error is hardly propagated. However, the construction provided with a plurality of quantizing units will increase its circuit scale, leading to the cost increase.

SUMMARY OF THE INVENTION

It is an object of the present invention to provide a video signal recording apparatus and a video signal regenerating apparatus that effectively utilize recording media and device resource by recording additional information in an area where a dummy signal has been recorded in a conventional video signal recording apparatus.

It is a further object of the invention to provide a image coding apparatus that performs non-linear quantization processing at high speed and with a small circuit scale, without ROM tables, and prevents the error propagation during predictive coding without reduction in compression rate.

It is yet another object of the invention to provide a image decoding apparatus that performs decoding processing at high speed and with a small circuit scale, without ROM table.

Other objects and advantages of the present invention will become apparent from the detailed description given hereinafter; it should be understood, however, that the detailed description and specific embodiment are given by way of illustration only, since various changes and modifications within the scope of the invention will become apparent to the those skilled in the art from this detailed description.

According to one aspect the present invention provides a video signal recording apparatus comprising effective area dividing means that divides digital video signal to obtain video signal in a significant area; video signal adding means for adding additional signal to the video signal of the significant area; compression means for creating compressed video data by performing a specified high-efficiency coding of the video signal containing the additional signal; additional information generating means for generating additional information; data replacing means that replaces the compressed video data at a specified position in the compressed data with the additional information; and recording means for recording the compressed data in specified recording media.

According to another aspect the invention provides a video signal regenerating apparatus comprising means for regenerating compressed data recorded in a specified recording media; means for decoding the compressed data, which decoding being the reverse conversion of the specified high-efficiency coding, to output digital video signal; area dividing means for dividing the digital video signal into a specified significant area and additional information; video signal arranging means for arranging the significant area in a specified order; and means for recognizing the additional information by a specified system.

According to another aspect the invention provides an image coding apparatus comprising predictive value generating means that generates a predictive value for an input pixel value from pixels in the vicinity of the input pixel; linear quantizing unit generating means for generating a linear quantizing unit which has a quantization width of $2^{d-n}$ in d-bit accuracy, and has linear quantization representative points, the number of which is obtained by subtracting a pre-set addition upper limit from $2^n$; non-linear quantization unit generating means in which to the quantization representative values of the linear quantization unit, quantization representative points of not more than the addition upper limit are added in the vicinity of the predictive value to generate a non-linear quantization unit, whose quantization width in the vicinity of the predictive value is smaller than that of the linear quantization unit; and quantization means for quantizing an input pixel value by the non-linear quantization unit to obtain a quantization value.

According to another aspect the invention provides an image decoding apparatus comprising predictive value generating means that generates a predictive value for an input quantization value from pixels in the vicinity of the input quantization value; linear quantizing unit generating means for generating a linear quantizing unit which has a quantization width of $2^{d-n}$ in d-bit accuracy, and has linear quantization representative points, the number of which is obtained by subtracting a pre-set addition upper limit from $2^n$; non-linear quantization unit generating means in which to the quantization representative values of the linear quantization unit, quantization representative points of not more than the addition upper limit are added in the vicinity of the predictive value to generate a non-linear quantization unit, whose quantization width in the vicinity of the predictive value is smaller than that of the linear quantization unit; and reverse quantization means that performs the reverse quantization of the input quantization value by the non-linear quantization unit to obtain a regenerative value.

BRIEF DESCRIPTION OF THE DRAWINGS

FIGS. 1(a) and 1(b) are block diagrams showing a construction of video signal recording apparatus according to Embodiment 1 and 2, respectively, of the invention.

FIGS. 2(a) and 2(c) are diagrams for explaining video signal utilized in the video signal recording apparatus of Embodiment 1.

FIGS. 4(a) and 4(b) are diagrams showing a construction of video signal recording apparatus of Embodiment 5 and 6, respectively, of the invention.

FIGS. 5(a) and 5(b) are diagrams for explaining video signal utilized in the video signal recording apparatus of Embodiment 5.

FIGS. 6(a) and 6(b) are diagrams showing a construction of video signal recording apparatus of Embodiment 7 and 8, respectively, of the invention.

FIGS. 7(a) and 7(b) are diagrams for explaining video signal utilized in the video signal recording apparatus of Embodiment 7.

FIGS. 8(a) and 8(b) are diagrams showing a construction of video signal recording apparatus of Embodiment 9 and 10, respectively, of the invention.

FIGS. 9(a) and 9(b) are diagram for explaining video signal utilized in the video signal recording apparatus of Embodiment 9.

FIGS. 12(a) and 12(b) are diagrams showing a construction of a conventional video signal recording apparatus.

FIGS. 13(a) to 13(d) are diagrams for explaining the conversion of video signal in the conventional video signal recording apparatus.

FIGS. 14(a) and 14(b) are diagrams for explaining video signal utilized in the conventional video signal recording apparatus.

FIGS. 15(a) and 15(b) are block diagrams showing a construction of a conventional video signal regenerating apparatus.

FIGS. 17(a) to 17(d) are diagrams for explaining the quantization of the image coding apparatus of Embodiment 15.

FIGS. 20(a) to 20(d) are diagrams for explaining the quantization of the image coding apparatus of Embodiment 16.

FIGS. 23(a) to 23(d) are diagrams for explaining the quantization of the image coding apparatus of Embodiment 17.

FIGS. 32(a) to 32(d) are diagram for explaining the quantization of the image coding apparatus of Embodiment 19.

DETAILED DESCRIPTION OF THE PREFERRED EMBODIMENT

Embodiment 1

Figure 3:
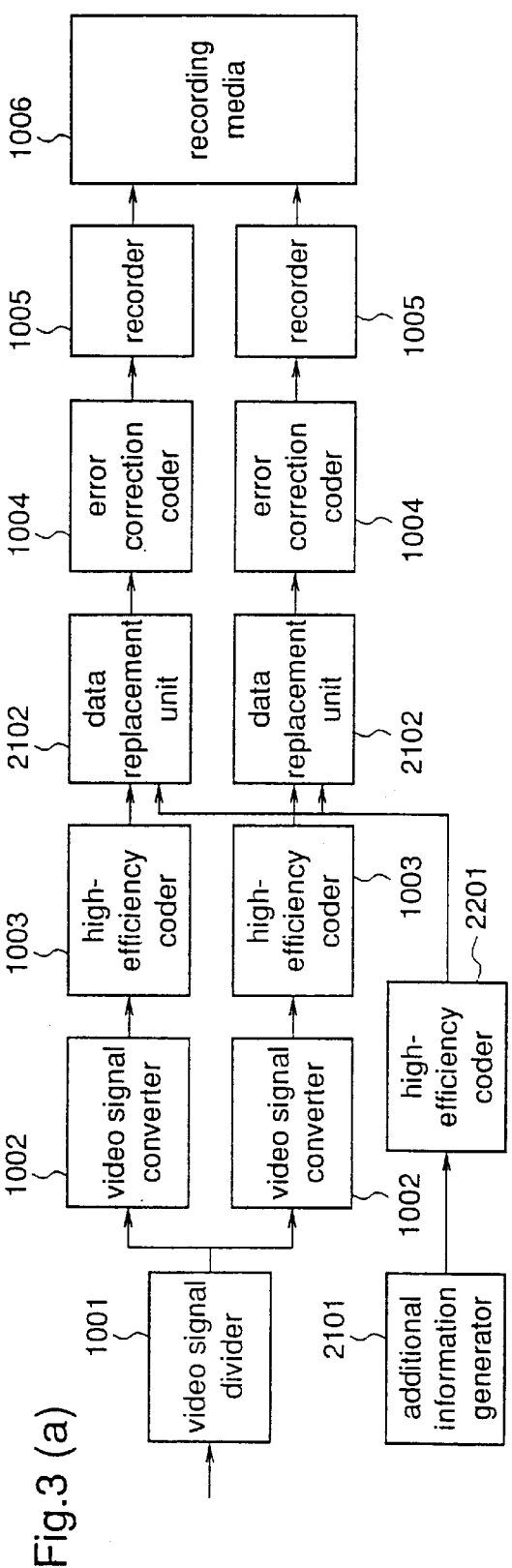
FIGS. 3(a) and 3(b) are diagrams showing a construction of video signal recording apparatus of Embodiment 3 and 4, respectively, of the invention.
Figure 3:
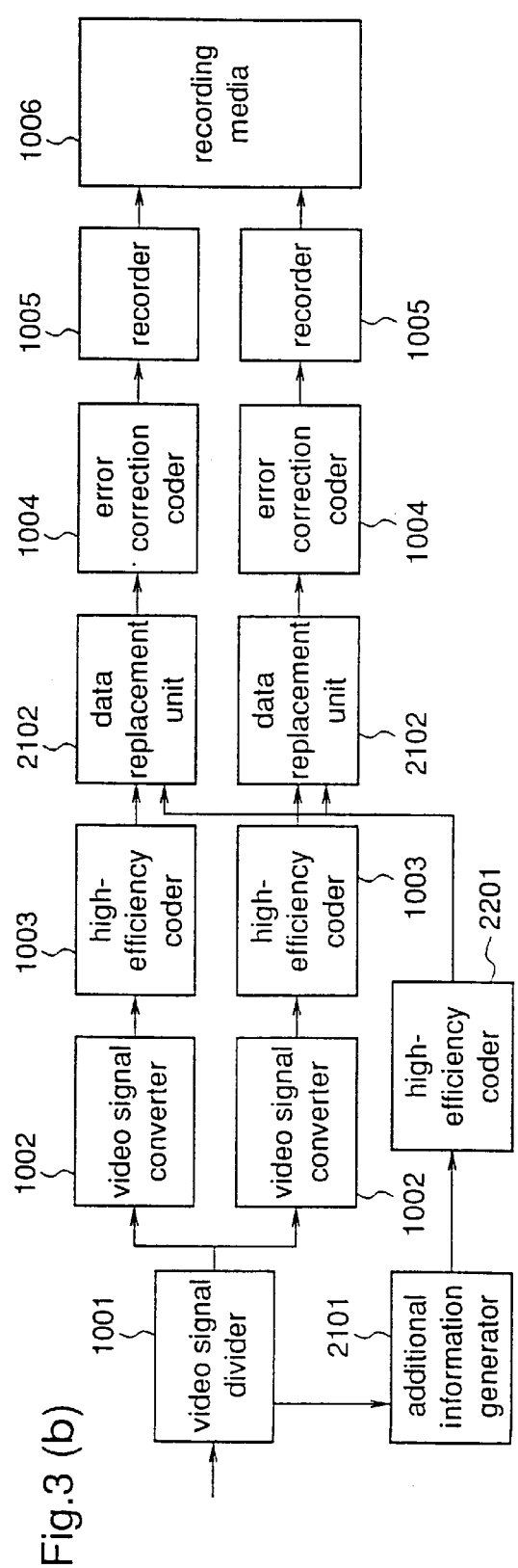

Referring to FIG. 1(a), there is shown the construction of a video signal recording apparatus of Embodiment 1, in which additional information is replaced with added dummy signal.

An additional information generator 2101 is to generate additional information. A video signal divider 1001 is to divide 422 digital video signal consisting of luminance signal to chrominance signal ratio of 4:2:2, into two 211 digital video signal consisting of that ratio of 2:1:1, based on a specified division format. A video signal converter 1002 is to add a specified dummy signal into luminance signal in the input 211 digital video signal to convert it into 411 digital video signal consisting of luminance signal to chrominance signal ratio of 4:1:1. A high-efficiency coder 1003 is to create compressed data from the input 411 digital video signal by a specified high-efficiency coding. A data replacement unit 2101 is to replace data at a specified position in the compressed data with the data output from the additional information generator 2101. An error correction coder 1004 is to add a specified correction code data into the compressed data. A recording apparatus 1005 is to record the output results from the error correction coder 1004 in a recording media 1006. Examples of the recording media 1006 include a tape media such as VTRs, and a disk media such as optical disks, in which digitized data is recorded for retention.

The video signal recording apparatus so constructed will compress/code video signal and record it in the following operations.

The video signal divider 1001 discards input video signal of areas other than a significant area, i.e., a processing object. The input video signal is 422 digital video signal having the aforesaid ratio of 4:2:2, which signal is then divided into two 211 digital video signals by the video signal divider 1001 based on a specified division format. These 211 digital video signals are separately input to either of the video signal converters 1002.

Each video signal converter 1002 adds a specified dummy signal to the luminance signal in the 211 digital video signal to convert it into 411 digital video signal, and outputs it to each high-efficiency coder 1003. As described in prior art, the 211 digital video signal as shown in FIG. 13(c), whose data is arranged in this order of luminance signal (Y), luminance signal (Y), chrominance signal (V) and chrominance signal (U), is converted into 411 digital video signal as shown in FIG. 13(d), whose data is arranged in the order: luminance signal (Y), dummy signal (D), luminance signal (Y), dummy signal (D), chrominance signal (V) and chrominance signal (U), wherein every dummy signal (D) has the same data.

The foregoing operations are common to those of the conventional apparatus, while the additional information generator 2101 generates a specified additional information and outputs it to the data replacement unit 2102.

Each high-efficiency coder 1003 codes the respective input 411 digital video signal at high efficiency utilizing a specified high-efficiency algorithm, to output compressed data. Referring to FIGS. 2(a) to 2(c), the format of the compressed data will be exemplified. The coder 1003 inherently codes 411 digital video signal at high efficiency by the algorithm utilizing DCT. The DCT block consists of 8×8 pixels. A set of four luminance signal (Y), one chrominance signal (V) and one chrominance signal (U) defines a macro block.

When used 411 digital video signal, the compressed data of such a macro block is arranged as shown in FIG. 2(a). Each DCT block is arranged in this order: DC composition, ancillary information data, and AC composition. When employed dummy signal, the DCT block is arranged as shown in FIG. 2(b). The block of the dummy signal (D) consists of a specified DC composition, ancillary information data, and EOB (end of block), which are arranged in this order. The foregoing is common to a format in prior art as shown in FIGS. 14(a) and 14(b).

The compressed signal having the constitution shown in FIG. 2(b) is output from each coder 1003 to each data replacement unit 2102. The unit 2102 replaces the data at a specified area in the compressed data with the additional information generated at the additional information generator 2101, and outputs the resulting data.

A replacement method will be described referring to FIGS. 2(a) to 2(c). In each data replacement unit 2102, the DC composition in the dummy signal recording area, or the parts of the DC composition data and the ancillary information data, is replaced with the additional information, to obtain the constitution as shown in FIG. 2(c), and the resulting data is output to each error correction coder 1004.

Each coder 1004 outputs error correction coded data which is obtained by adding a specified error correction code to the input compressed data. Each recording apparatus 1005 records the error correction coded data in a specified position of a specified recording media 1006.

As described above, the video signal recording apparatus of Embodiment 1 is provided the additional information generator 2101 and the data replacement unit 2101 in order to add and record the additional information that can be created depending on the purpose, instead of dummy signal to be recorded in a conventional video signal recording apparatus. Therefore, more information can be recorded, permitting the effective use of recording media.

Embodiment 2

Referring to FIG. 1(b), there is shown the construction of a video signal recording apparatus of Embodiment 2, in which the additional information to be created from the input video signal of areas other than a significant area is replaced with added dummy signal.

In the video signal divider 1001 the parts of significant area of 422 digital video signal having the aforesaid ratio of 4:2:2 are divided into two 211 digital video signals based on a specified format, and the other parts are output to the additional information generator 2101. In the generator 2101 the input video signal (signals in areas other than the significant area) is temporally stored and additional information is generated from that signal. Others are common to Embodiment 1.

The operations of Embodiment 2 are common to those of Embodiment 1, except that the additional information is generated by the video signal divider 1001 and the additional information generator 2101 as described.

In the video signal recording apparatus so constructed, the video signal divider 1001 outputs the video data of areas other than the significant area being a processing object, to the additional information generator 2101. The generator 2101 generates additional information based on the video data from the divider 1001. The data replacement unit 2102 replaces dummy information with the additional information. It is therefore possible to record more information than the conventional recording apparatus, and to utilize data of areas other than a significant area, which data has been regarded as data beyond processing object, and then discarded in the conventional apparatus. Hence, when treating data containing parts to be cut off due to nonstandard video, and data accompanying such as control information and management information, the apparatus of Embodiment 2 is able to utilize such cut-off data and accompanying information data.

Embodiment 3

Referring to FIG. 3(a), there is shown the construction of a video signal recording apparatus of Embodiment 3, which replaces added dummy signal with compressed/coded additional information. In a high-efficiency coder 2201 (for additional information), the additional information generated in the additional information generator 2101 is subjected to a high-efficient coding utilizing a specified high-efficiency coding algorithm, to obtain compressed data, which data is then output. Others are common to FIGS. 1(a), and the descriptions are similar to those of Embodiment 1.

The operations of Embodiment 3 is common to those of Embodiment 1, except that the coder 2201 codes the additional information generated in the generator 2101 at high efficiency, utilizing a specified high-efficiency coding algorithm, and outputs the resulting data as compressed data; and that the data replacement units 2102 replaces the data at a specified area in the compressed data generated in the high-efficiency coders 1003 with the compressed data generated in the coder 2201, and outputs it.

Thus in Embodiment 3, the additional information generator 2101 and the data replacement unit 2102 enable to record more information than a conventional video recording apparatus. In addition, the high-efficiency coder 2201 (for additional information) enables to compress additional information. It is therefore possible to add more additional information than Embodiment 1, leading to further effective use of recording media.

Embodiment 4

Referring to FIG. 3(b), there is shown the construction of a video signal recording apparatus of Embodiment 4, which replaces added dummy signal with additional information that is created from input video signals of areas other than a significant area and then compressed/coded.

The video signal divider 1001 and the additional information generator 2101 are common to those of Embodiment 2. The divider 1001 outputs input video signal of areas other than a significant area to the generator 2101. The generator 2101 generates additional information from the received video signals. Others are common to FIG. 3(a), and the descriptions are the same as those of Embodiment 3.

The operations of the apparatus of Embodiment 4 so constructed are the same as those of Embodiment 3, except the operations of the divider 1001 and the generator 2101 as described.

Thus in Embodiment 4, the video signal divider 1001 outputs the video data of areas other than the significant area, i.e., a processing object, to the additional information generator 2101. The generator 2101 generates additional information based on the video data from the divider 1001. The high-efficiency coder 2201 compresses the additional information. The data replacement unit 2102 replaces dummy information with the compressed additional information. It is therefore possible to record much information like Embodiment 3.

Furthermore when a video contains such as nonstandard parts and accompanying information, Embodiment 4 can utilize such parts and information like Embodiment 2.

Embodiment 5

Referring to FIG. 4(a), there is shown the construction of a video signal recording apparatus of Embodiment 5, in which at the conversion of video signal there is added additional information instead of dummy information.

A video signal converter 2301 adds additional information generated in an additional information generator 2101 to the luminance signal in the input 211 digital video signal, to convert it into 411 digital video signal. Others are common to FIG. 1(a) and 1(b), except that Embodiment 5 is not provided with data replacement units (i.e., 2102).

The video signal recording apparatus so constructed will compress/code video signal and then record it in the following operations. Like Embodiment 1, the video signal divider 1001 divides 422 digital video signal being input signal to obtain two 211 digital video signals, and then outputs them to the video signal converters 2301. The additional information generator 2101 generates a specified additional information and then output it to the video signal converters 2301. The converter 2301 adds the additional information generated in the generator 2101 to the luminance signal in the 211 digital video signal, to convert it into 411 digital video signal.

Figures 5A, 5B:
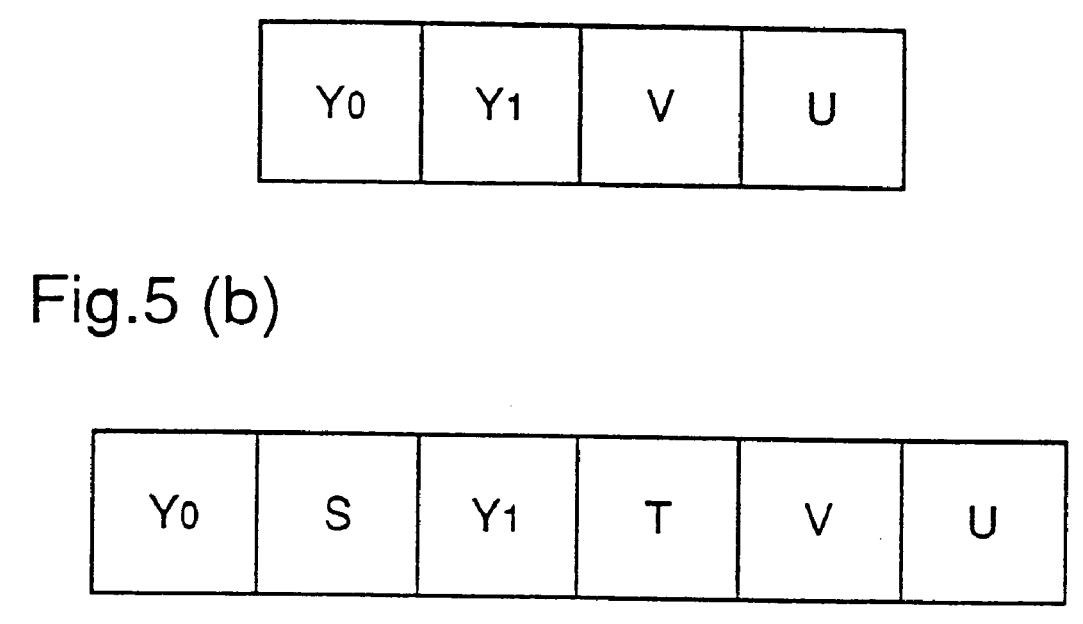

The conversation will be described using two examples, in both of which the digital video signal having the construction shown in FIG. 5(a) is converted into that shown in FIG. 5(b).

In the first example the data of 211 digital video signal is arranged in this order: luminance signal (Y), luminance signal (Y), chrominance signal (V) and chrominance signal (U). This data is converted into 411 digital video signal arranged in this order: luminance signal (Y), additional information signal (S), luminance signal (Y), additional information signal (T), chrominance signal (V) and chrominance signal (U). In this conversion, when no additional information signal is required, dummy signal (D) of identical data may be added like prior art. Thus such a conversion enables that additional information is added depending on the purpose.

The second example differs from the former in that additional information signal is added when data is arranged as DCT blocks of 8×8 pixels by the high-efficiency coder 1003, so as to have an identical value in a single DCT block. In such a conversion, signal containing no AC component can be obtained from DC component alone, so that data to be reliably regenerated is recorded.

Thus in Embodiment 5, the additional information generator 2101 and the video signal converter 2301 in which the additional information generated in the generator 2101 is added at the signal conversion, enable to record more information then the conventional signal recording apparatus, like Embodiment 1 where firstly dummy signal is added and thereafter the dummy signal is replaced with additional information by the data replacement unit.

Depending on the setting, it is possible that additional information is added as required, and such dummy signal as used in prior art may be added unless any additional information is required. It is also possible to add additional information to be reliably regenerated, with its compression processing into consideration. There are hardly difference in effect between Embodiment 5 and Embodiment 1 having the data replacement unit. Therefore, it is preferably to select either embodiment, depending on the components, circuit design of the apparatus; and data types and data quality and the like.

Embodiment 6

Referring to FIG. 4(b), there is shown the construction of a video signal recording apparatus of Embodiment 6, in which at the video signal conversion there is added additional information created from input video signal of areas other than a significant area, instead of dummy information.

The vide signal divider 1001 and the additional information generator 2101 are common to Embodiment 2. The divider 1001 outputs the input video signal of areas other than the significant area to the generator 2101 in which additional information is generated based on the received video signal. Others are common to FIG. 6(a), and the their descriptions are the same as those of Embodiment 5.

The operations of Embodiment 6 are common to those of Embodiment 5 except that the additional information is generated by the divider 1001 and the generator 2101 as described.

Thus, Embodiment 6 that include no data replacement unit like Embodiment 5 is able to record much information, and to utilize nonstandard parts and accompanying information if they are contained in video.

Embodiment 7

Referring to FIG. 6(a), there is shown the construction of a video signal recording apparatus of Embodiment 7, in which at the video signal conversion there is added compressed/coded additional information, instead of dummy information.

A high-efficiency coder 2401 (for additional information) codes the additional information generated by the additional information generator, utilizing a specified high-efficiency coding algorithm, and then outputs it as compressed data. A video signal converter 2402 adds the compressed data from the coder 2401 to the luminance signal in the input 211 digital video signal, to convert it into 411 digital video signal. Others are common to FIG. 4(a), and the descriptions are the same as those of Embodiment 5.

In Embodiment 7 so constructed, video signal is compressed/coded and then recorded in the following operations.

The video signal divider 1001 divides the effective area of 422 digital video signal, i.e., input signal, to obtain two 211 digital video signals, and outputs it to the converter 2402. The additional information generator 2101 generates a specified additional information and then outputs it to the coder 2401. The coder 2401 efficiently codes the additional information generated in the generator 2101 to obtain compressed data, and then outputs it to the converter 2402. The converter 2402 adds the compressed data from the coder 2401 to the luminance signal in the 211 digital video signal, to convert it into 411 digital video signal.

Figures 7A, 7B:
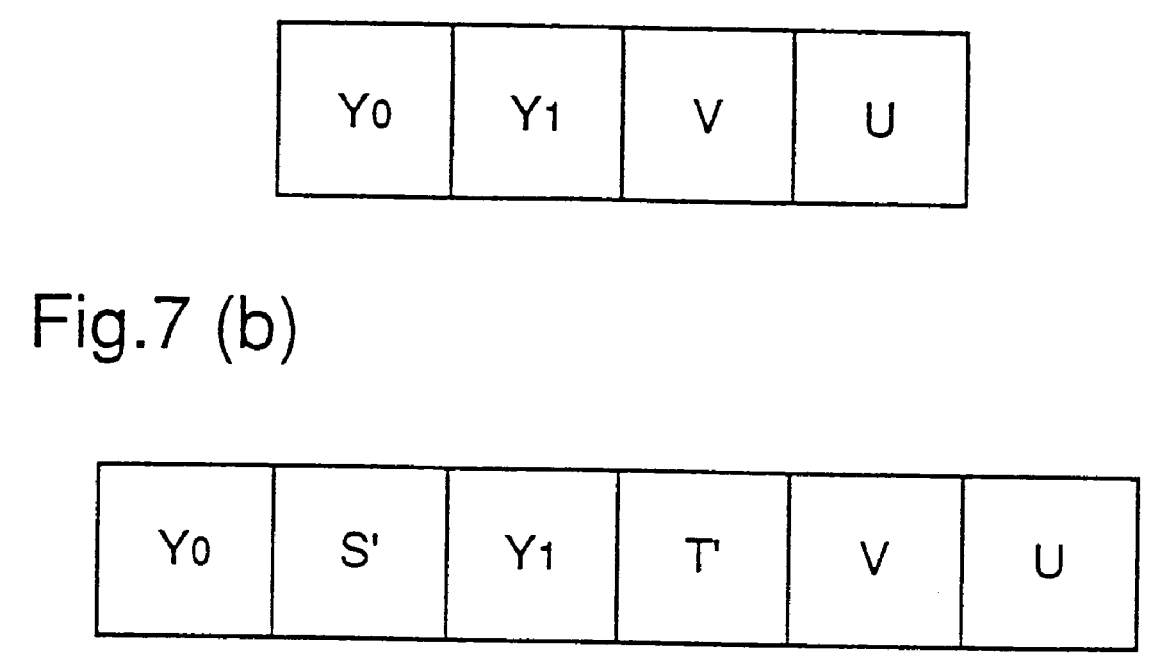

The aforesaid conversion will be discussed taking two examples, in both of which the digital video signal having the construction shown in FIG. 7(a) is converted into that shown in FIG. 7(b).

In the first example the data of 211 digital video signal is arranged in this order: luminance signal (Y), luminance signal (Y), chrominance signal (V) and chrominance signal (U). This data is converted into 411 digital video signal of the sequence: luminance signal (Y), additional information signal (S'), luminance signal (Y), additional information signal (T'), chrominance signal (V) and chrominance signal (U). In this conversion, when no additional information signal is required, dummy signal (D) of identical data may be added like prior art. Thus such a conversion enables that additional information is added depending on the purpose.

The second example differs from the former in that additional information signal is added when data is arranged as DCT blocks of 8×8 pixels in the high-efficiency coder 1003, so as to have an identical value in a single DCT block. In such a conversion, a signal containing no AC component can be obtained from DC component alone, so that data to be reliably regenerated is recorded.

Thus Embodiment 7 is provided with the additional information generator 2101, the high-efficiency coder 2401 that compresses the additional information generated by the additional information generator 2101, and the video signal converters 2402 that adds the compressed data which is obtained by compressing/coding of the additional information, to the video signal. Hence, like Embodiment 3 where firstly dummy signal is added and the dummy signal is replaced with the compressed additional information by the data replacement unit, the use of the compressed information enables to record much more information than Embodiment 1 or 5.

Like Embodiment 5, depending on the setting, it is possible that additional information is added if required, and such dummy signal as used in prior art is added unless any additional information is required. It is also possible to add additional information to be reliably regenerated, with its compression processing into consideration.

There are hardly difference in construction between Embodiment 3 and Embodiment 7, like between Embodiments 1 and 5.

Embodiment 8

Referring to FIG. 6(b), there is shown the construction of a video signal recording apparatus of Embodiment 8, in which at the video signal conversion there is added additional information created from input video signal of areas other than a significant area, instead of dummy information.

The video signal divider 1001 and the additional information generator 2101 are common to Embodiment 2. The divider 1001 outputs the video signal of areas other than a significant area to the generator 2101 in which additional information is generated from the received video signal. Others are common to FIG. 6(a), and the descriptions are the same as those of Embodiment 7.

The operation of Embodiment 8 is the same as that of Embodiment 7 except that the additional information is generated by the divider 1001 and the generator 2101 as described.

Thus, Embodiment 8 that includes no data replacement unit like Embodiment 7 can record much information and can utilize nonstandard parts and accompanying information if they are contained in video, like Embodiment 2.

Embodiment 9

Referring to FIG. 8(a), there is shown the construction of a video signal recording apparatus of Embodiment 9, which replaces added dummy signal with additional information at the coding.

Like Embodiment 1, high-efficiency coders 2701 not only obtain compressed data but also replace and insert additional information block in the compressed data, the block consisting of additional information and an EOB (end of block). An additional information generator 2101 generates additional information and then outputs it to the coders 2701. Others are common to FIG. 1(a), except that the data replacement unit (i.e., 2102) is provided unlike Embodiment 1.

The video signal recording apparatus so constructed will compress/code video signal and record it in the following operation.

The operations of the video signal divider 1001 and the video signal converter 1002 are the same as those of Embodiment 1.

The additional information generator 2101 generates additional information and outputs it to the high-efficiency coders 2701. In the coders 2701, 411 digital video signal from the converters 1002 is coded by a specified high-efficiency coding to obtain compressed data, and then the block of dummy signal is replaced with additional information block in the compressed data, which block consisting of additional information and an EOB.

An example of insert compression codes for additional information block will be described. FIG. 9(a) illustrates the construction of a macro block of a conventional video signal recording apparatus, which construction is the same as FIG. 14(a). FIG. 9(b) illustrates a compressed code to which additional information block has been inserted, wherein the blocks designated by "J" and "K" are the additional information. As seen from the figure, the compressed code consists of the ancillary information data and EOB.

Thus in Embodiment 9, the additional information generator 2101 generates additional information and outputs it to the high-efficiency coders 2701, in which a block including EOB is made based on the additional information and the block of dummy signal in the compressed data is replaced with the obtained block. Therefore, like Embodiment 1 where the dummy signal is replaced with the additional signal by the data replacement unit, it is possible to record more information than conventional video signal recording apparatuses. It is also possible to obtain data that can be regenerated by conventional video signal regenerating apparatuses.

It should be noted that in Embodiments 1, 3, 5, 7 and 9, additional information can be created as information transmission function in image display, e.g. video to be added, telop and character information, as control/management information, e.g., time code, and as information containing no important content, e.g., background colors. That is, various additional information can be created properly.

Embodiment 10

Referring to FIG. 8(b), there is shown a video signal recording apparatus of Embodiment 10, which replaces added dummy signal with additional information created from the parts other than the significant area in input video signal, at the coding.

The video signal divider 1001 and the additional information creater 2101 are common to those of Embodiment 2. The divider 1001 outputs parts other than the significant area in the input video signal to the generator 2101, in which additional information is generated from the input video signal. Others are common to FIG. 8(a), and their descriptions are the same as those of Embodiment 9.

The operation of Embodiment 10 is the same as Embodiment 9, except that the additional information is created by the divider 1001 and the generator 2101 as described.

Thus, Embodiment 10 so constructed enables to record more information than the conventional video signal recording apparatus, like in Embodiment 9, and to obtain data that is regenerative by the conventional video regenerating apparatus. Furthermore, similar to Embodiment 2 it is able to utilize nonstandard parts and accompanying information if they exist in video.

It should be noted that although in each of Embodiments 1 to 10 there are shown the two recorders independently perform the recording to the recording media, in accordance with the apparatuses of prior art shown in FIG. 12(a), each Embodiment may carry out the recording via a synthesizer shown in FIG. 12(b), resulting in the same effect.

Embodiment 11

Figure 10:
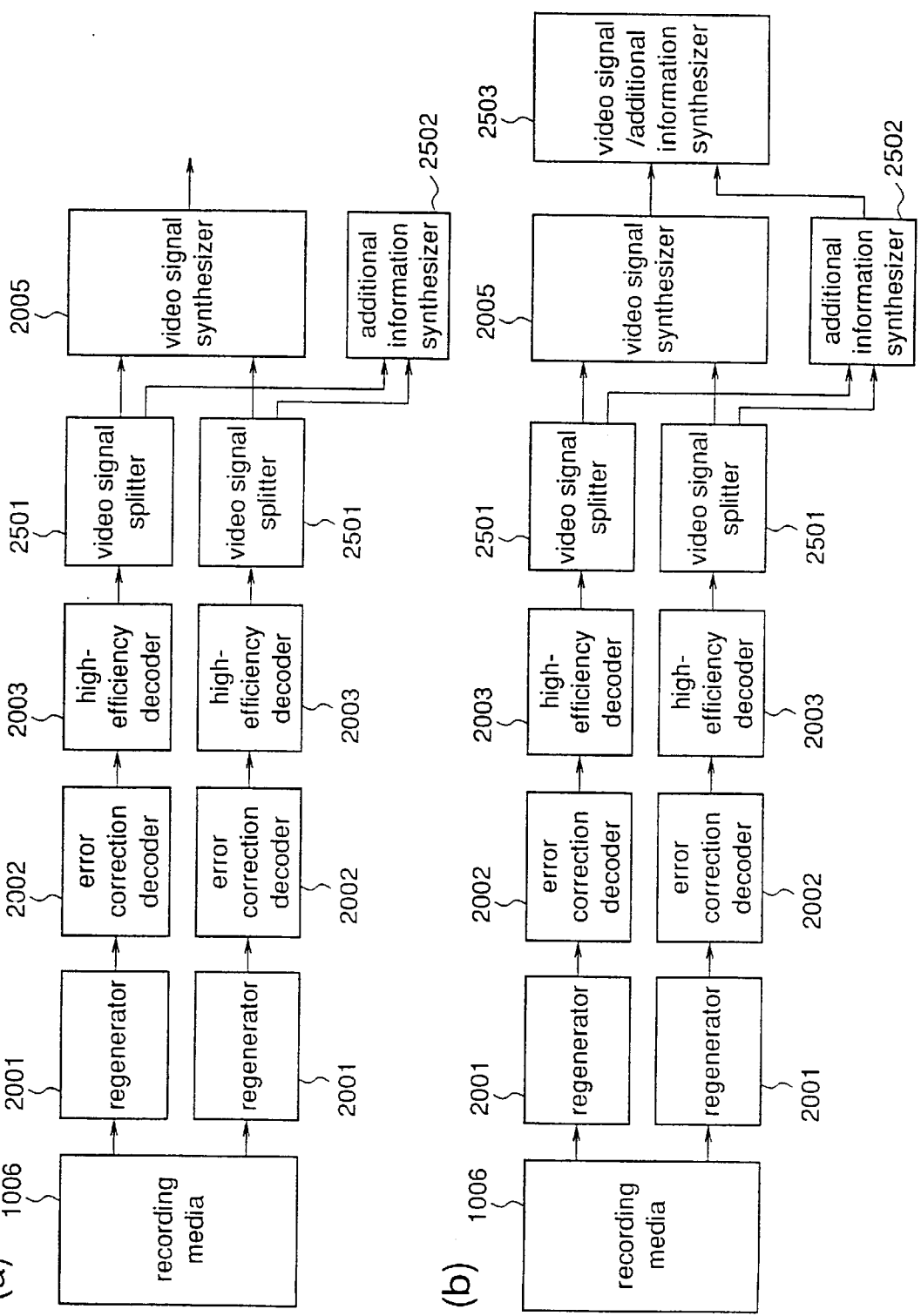
FIGS. 10(a) and 10(b) are diagrams showing a construction of video signal regenerating apparatus of Embodiment 11 and 12, respectively, of the invention.

Referring to FIG. 10(a), there is shown the construction of a video signal regenerating apparatus of Embodiment 11, in which compressed and coded data including additional information is decoded and then the additional information is split.

A video recording media 1006 is that to which the error correction coded data has been recorded in the video signal recording apparatus of Embodiment 1. Regenerator 2001 regenerates (reads out) the error correction coded data from the recording media 1006. An error correction decoder 2002 performs error corrections based on the error correction codes added by the video signal recording apparatus, and then outputs the results as compressed data. A high-efficiency decoder 2003 performs the reverse conversion of the high-efficiency coding performed by the video signal recording apparatus to decode digital video signal. A video signal splitter 2501 splits the video signal in the significant area and the additional information added by the video signal recording apparatus from the 411 digital video signal decoded in the decoder 2003, and outputs the former as 211 digital video signal to a video signal synthesizer 2005 and outputs the latter as it is to an additional information synthesizer 2502. The synthesizer 2005 synthesizes the 211 digital video signal from two video signal splitters 2004 based on a specified synthetic format to output it as 422 digital video signal. The additional information synthesizer 2502 synthesizes the additional information from the two splitters 2004 based on a specified synthetic format to obtain necessary information.

The video signal regenerating apparatus so constructed will regenerate the data recorded in the recording media in the following.

The regenerating apparatus 2001 regenerates (reads out) the error correction coded data that is recorded at a specified area in the recording media 1006. The error correction decoder 2007 performs the error correction for the regenerated data based on the system of adding error correction codes in the video signal recording apparatus, to output the results as compressed data.

In the high-efficiency decoder 2003 the reverse conversion of the high-efficiency coding in the video signal recording apparatus is carried out for the compressed data after the error corrections to decode digital video signal, thereby outputting it as 411 digital video signal. The video signal splitter 2501 splits the 411 digital video signal decoded in the decoder 2003 into the video signal of the significant area and the additional information added in the video signal recording apparatus, and then outputs the former as 211 digital video signal to the video signal synthesizer 2005 and outputs the latter as it is to the additional information synthesizer 2502.

The video signal synthesizer 2005 synthesizes the 211 digital video signal from the two splitters 2501 based on a specified synthetic format to obtain 422 digital video signal and then outputs it.

The synthesizer 2502 synthesizes the additional information from the two video signal splitters 2501 to obtain necessary information.

Thus in the regenerating apparatus of Embodiment 11 the two video signal splitters 2501 outputs the additional information split from the video signal and the output additional information is then synthesized in the additional information synthesizer 2502. It is therefore able to regenerate the video signal recorded in the video signal recording apparatus of Embodiment 1 or 3, and to utilize the additional information. This enables to obtain further more information than conventional regenerating apparatus in which dummy signal is to be discarded.

As to additional information such as information on control and management and character information, it is effective to firstly split such information by the regenerating apparatus of Embodiment 11 and then utilize it appropriately.

Although the recording media 1006 is to be recorded in the video signal recording apparatus in Embodiment 1, it is possible to employ that recorded in Embodiment 2, 5 or 6, resulting in the same effect.

Embodiment 12

Referring to FIG. 10(b), there is shown the construction of a video signal regenerating apparatus of Embodiment 12, in which compressed and coded data including additional information is decoded and the decoded data is then utilized.

An additional information synthesizer 2502 synthesizes additional information as in Embodiment 10, and then outputs its result to a video signal/additional information synthesizer 2503. A video signal synthesizer 2005 synthesizes the input video signal and then outputs its result to the synthesizer 2503. In the synthesizer 2503 the synthesized video signal and the synthesized additional information thus input are synthesized. Others are common to FIG. 10(*a*), and the descriptions are the same as those of Embodiment 11.

The operation of the video signal regenerating apparatus of Embodiment 12 is the same as that of Embodiment 11, except the operations of the additional information synthesizer 2502, the video signal synthesizer 2005 and the video signal/additional information synthesizer 2503.

Thus in Embodiment 12, the synthesized results of both the additional information synthesizer 2502 and the video signal synthesizer 2005 are output to the video signal/additional information synthesizer 2503, thereby obtaining video in which video signal and additional information have been synthesized. Therefore, when applied to the cases where in the video signal recording apparatus, additional information is created as video information or additional information is created from video signal other than those of the significant area, such additional information can be utilized effectively.

It is noted that the recording media 1006 may be that recorded in the recording apparatus of Embodiment 1, 2, 5 or 6, preferably Embodiment 2 or 6.

Embodiment 13

Figure 11:
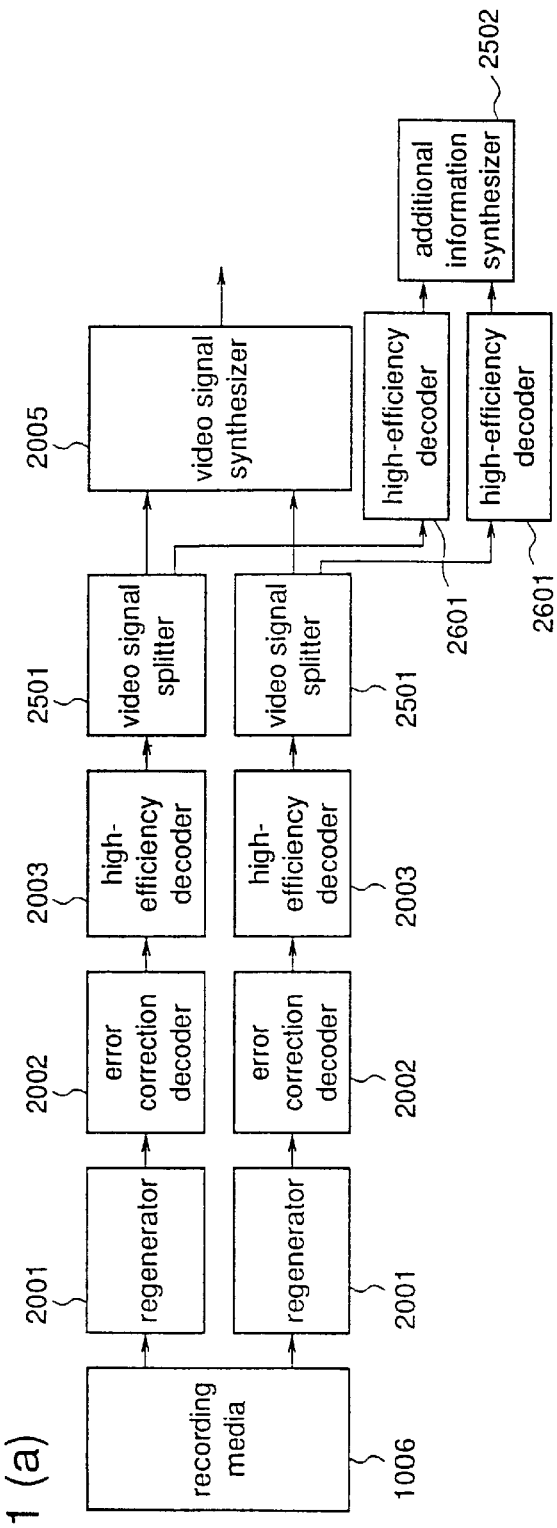
FIGS. 11(a) and 11(b) are diagrams showing a construction of video signal regenerating apparatus of Embodiment 13 and 14, respectively, of the invention.
Figure 11:
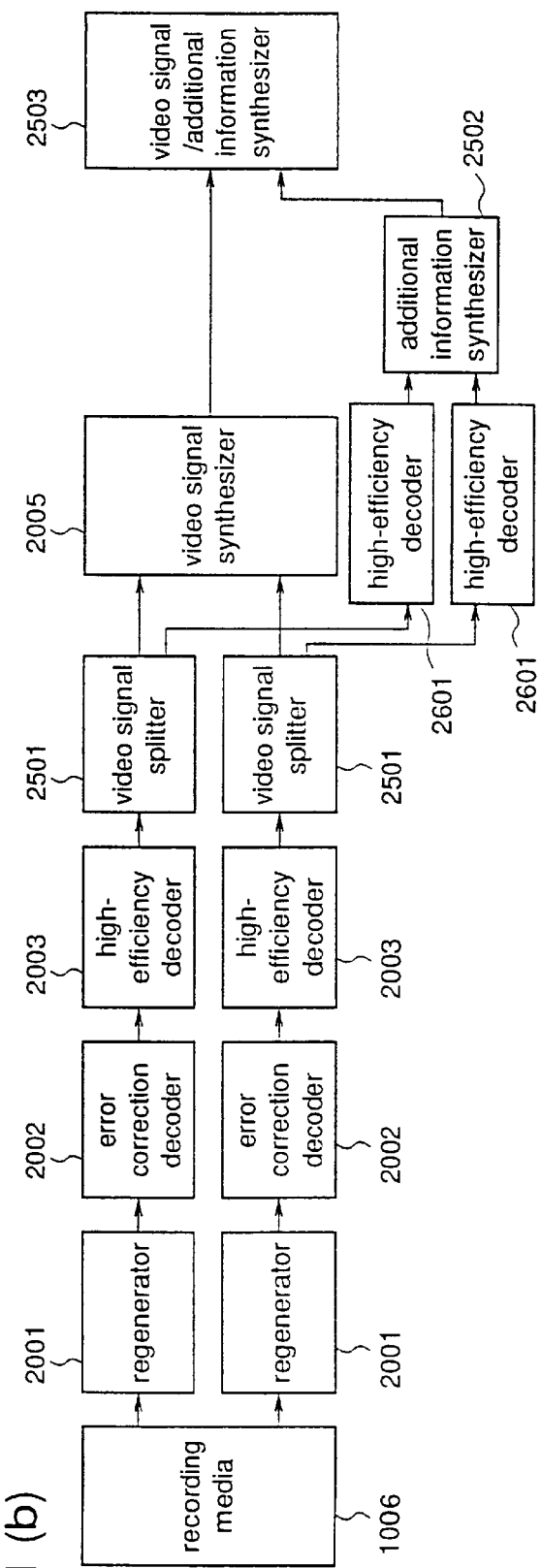

Referring to FIG. 11(*b*), there is shown the construction of a video signal regenerating apparatus of Embodiment 13, in which compressed and coded data including additional information is decoded and additional information is split and then decoded.

The recording media 1006 is that which has been recorded in the video signal recording apparatus of Embodiment 3. High-efficiency decoders 2003 (for additional information) performs the reverse conversion of a specified high-efficiency coding for the compressed data of the additional information output from the video signal splitter 2501, thereby decoding the additional information. Others are common to FIG. 10(*a*), and the descriptions are the same those of Embodiment 11.

The operation of the video signal regenerating apparatus so constructed will be described. The data recorded in the recording media is regenerated in the following manner. The processing up to the decoding in the high-efficiency decoder 2003 is the same as that of Embodiment 11.

The video signal splitter 2501 splits the 411 digital video signal decoded in the decoder 2003 into the video signal of the significant area and the compressed data of the additional information added in the video signal recording apparatus. The former is output to the video signal synthesizer 2005 as 211 digital video signal, and the latter is output to the high-efficiency decoders 2601 information as it is.

Thus in Embodiment 13, the decoder 2003 enables to regenerate the compressed data including the additional information compressed repeatedly that has been recorded in the video signal recording apparatus of Embodiment 3. It is therefore possible to utilize more additional information than the regenerating apparatus of Embodiment 11 or 12.

It is noted that although the recording media 1006 is that which has been recorded in the recording apparatus of Embodiment 3, it may be that of Embodiment 4, 7 or 8.

Embodiment 14

Referring to FIG. 11(*b*), there is shown the construction of a video signal regenerating apparatus of Embodiment 14. As in Embodiment 12, the additional information synthesizer 2502 synthesizes additional information and outputs its result to the video signal/additional information synthesizer 2503, and the video signal synthesizer 2005 synthesizes the input video signal and outputs its result to the synthesizer 2503. The synthesizer 2503 synthesizes the input synthesized video signal and the synthesized additional information. Others are common to FIG. 16, and the descriptions is the same as those of Embodiment 13.

The operation of Embodiment 14 is the same as that of Embodiment 13 except the operations of the additional information synthesizer 2502, the video signal synthesizer 2005 and the video signal/additional information synthesizer 2503.

Thus in Embodiment 14, the synthesized results of both the additional information synthesizer 2502 and the video signal synthesizer 2005 are output to the video signal/additional information synthesizer 2503, thereby obtaining video in which video signal and additional information have been synthesized. Therefore, the video signal regenerating apparatus of Embodiment 14 provides the following advantages. When applied to the cases where in the video signal recording apparatus additional information is created as video information or additional information is created from video signal other than that of the significant area, such additional information can be utilized effectively, like Embodiment 11. It is possible to regenerate additional information as being repeatedly compressed, enabling to utilize much more additional information, like Embodiment 12.

As the recording media 1006 there can be employed any of those which have been recorded in Embodiment 3, 4, 7 or 8, preferably in Embodiment 4 or 8.

It is noted that although Embodiments 11 to 14 are described such that two regenerating apparatus individually regenerate (read-out) from recording media, according to the construction shown in FIG. 15(*a*) as a conventional apparatus, these Embodiments may be in the system comprising the read-out in the regenerating apparatus 2001 and the splitting and decoding in the splitter 2006 as shown in FIG. 15(*b*), resulting in the same effect.

It is noted that although Embodiments 1 to 14 are described as the apparatus, the processing providing the aforesaid effects can be served as soft in general apparatuses such as personal computers and workstations.

It is noted that the error correction coding or decoding in Embodiments 1 to 14 may be omitted.

Embodiment 15

An image coding apparatus and an image decoding apparatus of Embodiment 15 are those in which a quantization representative point is added to a linear quantizing unit having a linear quantization representative value to realize a non-linear quantization unit performing quantization or reverse quantization.

Figure 16:
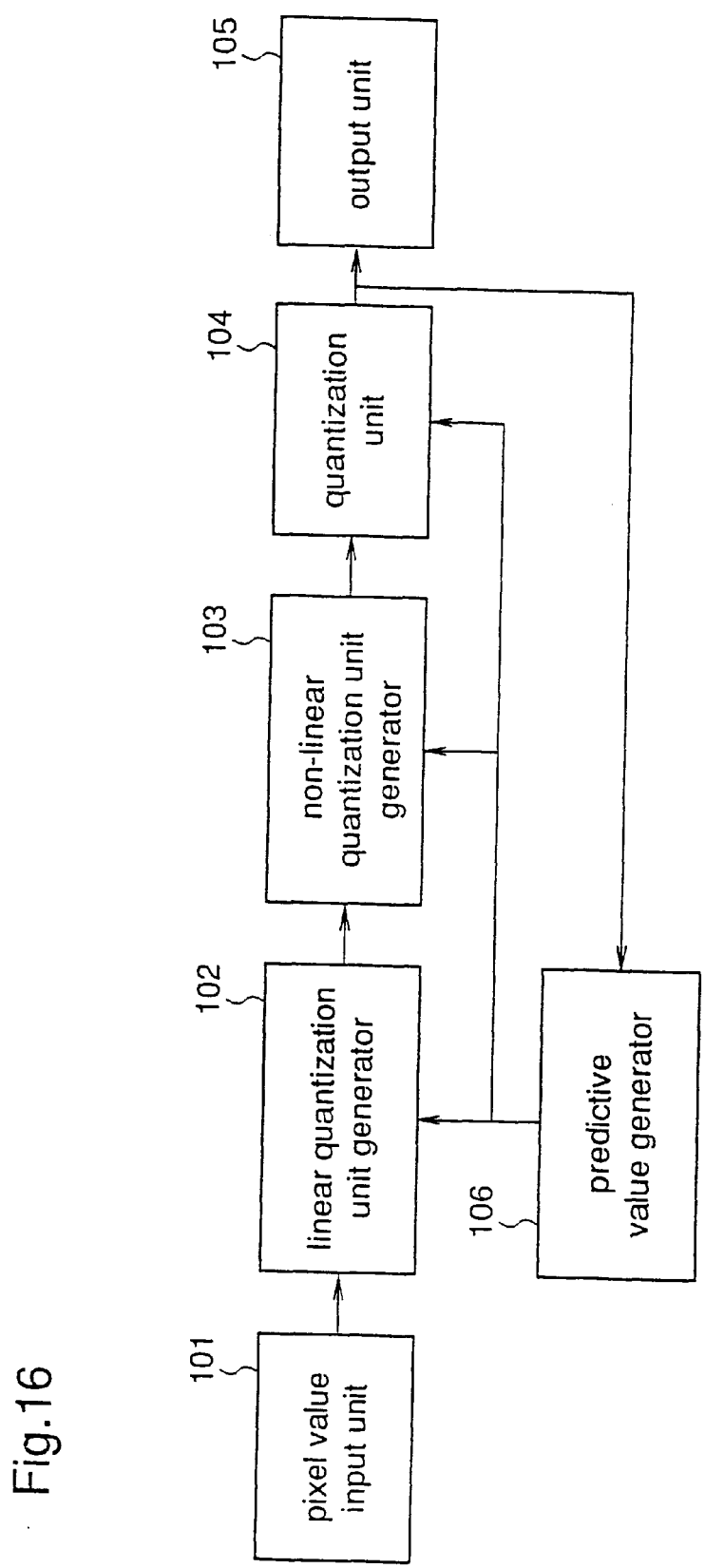
FIG. 16 is a block diagram showing a construction of a image coding apparatus of Embodiment 15 of the invention.

Referring to FIG. 16, there is shown the construction of the image coding apparatus of Embodiment 15. A pixel value input unit 101 inputs a pixel value having a dynamic range of d-bit. A linear quantization unit generator 102 generates a linear quantization unit having linear quantization representative points. A non-linear quantization unit generator 102 adds the quantization representative point to the vicinity of a predictive value to generate a non-linear quantization unit whose quantization width in the vicinity of the predictive value is smaller than that of the linear quantization unit. A quantization unit 104 quantizes an input pixel value using the non-linear quantization unit to obtain the quantization value of n-bit. An output unit 105 outputs the quantization value obtained in the quantization unit. A predictive value generator 106 generates a predictive value for the input pixel value from the peripheral pixels of the input pixel.

The operation of the image coding apparatus so constructed will be described. For shortness' sake, assuming that the input pixel value is indicated by 8-bit (d) and the quantization value after being coded is 6-bit (n) wherein n=6, k=d−n=2; and that in order to add quantization representative points, the upper limit number of the addition (m) is 5, which number is previously set.

In the predictive value generator 106, utilizing the peripheral pixels of the input pixel, a predictive value of 8-bit is generated for the pixel value from the pixel value input unit 101, as a linear sum obtainable from the quantization value of the peripheral pixels. Based on the predictive value thus generated, a quantization representative value for the input pixel value is set in the linear quantization unit generator 102 and the non-linear quantization unit generator 103.

Referring to FIGS. 17(*a*) to 17(*d*), there is shown an example of setting of quantization representative values, in which the predictive value is assumed to be 13.

The linear quantization unit generator 102 sets linear quantization representative values including the predictive value of 13 as a quantization representative value. The generator 102 is assumed to generate $2^n$−m linear quantization representative values with quantization width of $2^k$, wherein m is previously set as an upper bound value of the quantization representative point to be added in the preceding processing. In this example, the quantization representative values are set with the quantization width of 4 ($2^2$), positioning the predictive value 13 in the center. As shown in FIG. 17(*a*), 1, 5, 9 and 17, 21, 25, 29 are set near 13 in the shown range. The number of the quantization representative values set on the whole is 59 ($2^6$−5) from the above setting ($2^n$−m).

The non-linear quantization unit generator 103 adds not more than m quantization representative points near the above predictive value to reduce the quantization width near the predictive value than that of the linear quantization unit generator. In this example, 4 (4<m=5) quantization representative values are added in the range of two levels around the predictive value of 13. As a result, the quantization width is set to 1 only around the predictive value. Other parts are set to 4 as described. The number of the resulting quantization representative values sums up to 63 (<$2^6$), whereby the quantization value after coding is indicated in 6-bit.

Subsequently the quantization value for the smallest quantization representative value is set to be −31, and the quantization value is allocated in order of ascending, from the smallest quantization representative value. As shown in FIG. 17(*c*), the quantization value of −2 is allocated to the quantization representative value of 1, . . . , and 9 is allocated to 29 in this manner. On the whole, the quantization values of −31 to 31 are allocated in order of ascending.

The quantization unit 104 selects the nearest quantization representative value for an input pixel value to obtain its quantization value, and outputs it to the output unit 105. As shown in FIG. 17(*d*), when a pixel value is 2, the quantization value is −2, when a pixel value is 14, the quantization value is 14, and the like.

As described above, in the image coding apparatus of Embodiment 15, the quantization representative values are set basically by the linear quantization processing, and the quantization representative values are added only in the vicinity of a predictive value. Therefore in the quantization processing there can perform such an operation processing as employed in linear processing. Even non-linear quantization does not require ROM table and the like. In stead of processing the difference between an input pixel value and a predictive value, the input pixel value is directly quantized, and therefore, the quantization representative value (pixel value) is proportional to the quantization value. Thus, since each quantization value itself contains the absolute level information, even when a predictive value is incorrect, error propagation is hardly caused. In the example illustrated in FIGS. 17(*a*) to 17(*d*), only four quantization representative values added to the vicinity of the predictive value, i.e., non-linear parts, are affected.

Figure 18:
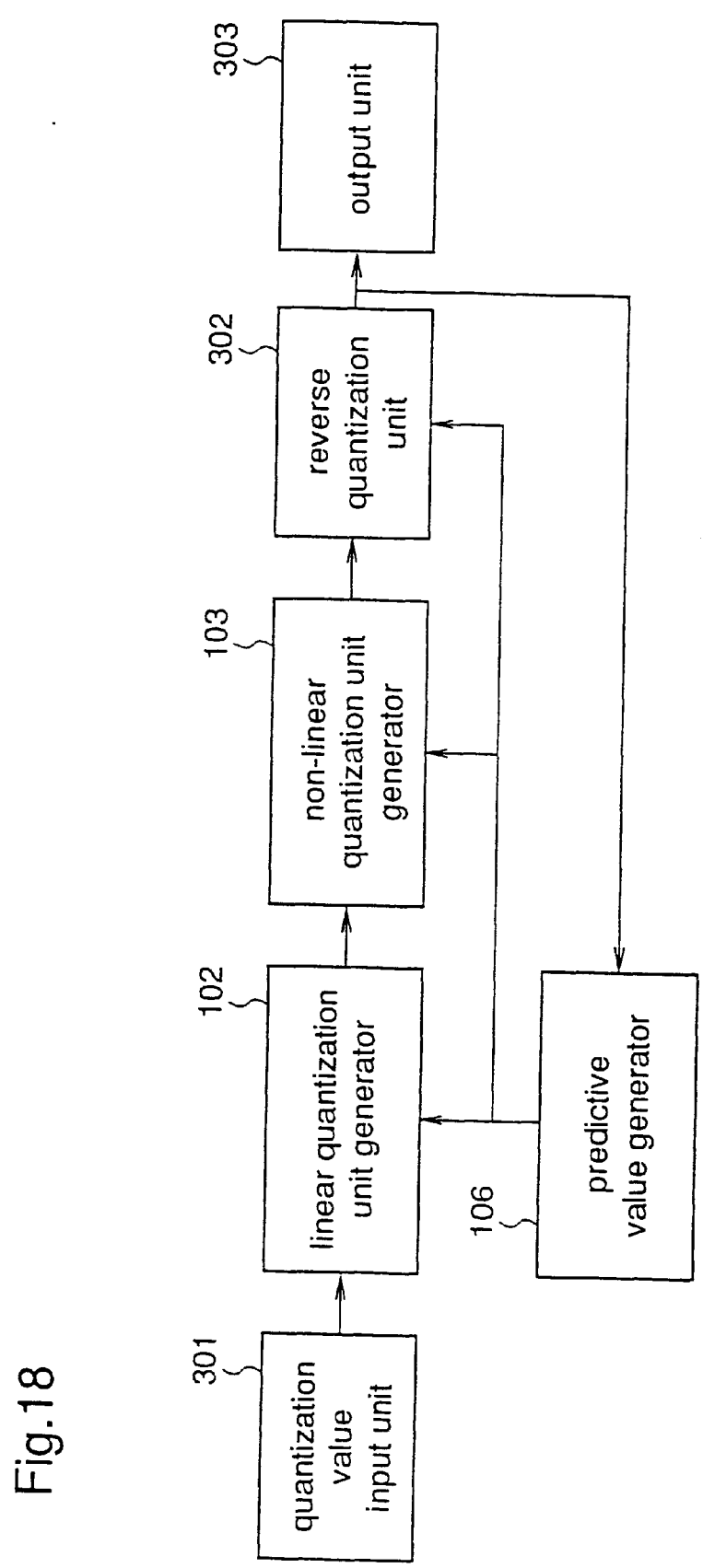
FIG. 18 is a block diagram showing a construction of the image decoding apparatus of Embodiment 15.

Referring to FIG. 18, there is shown a construction of the image decoding apparatus of Embodiment 15. A description will be given of the operation when this apparatus decodes the data coded as described above.

A quantization value input unit 301 inputs a quantization value as the result of coding. A reverse quantization unit 302 performs the reverse quantization of an input quantization value utilizing the non-linear quantization unit generated in the non-linear quantization unit generator 103. An output unit 303 outputs the result of decoding. Others are common to the image coding apparatus.

The operation of the image decoding apparatus so constructed will be described. When a quantization value as the result of coding is input from the input unit 301, a predictive value generator 106 generates, as a linear sum, a predictive value for the quantization value by utilizing the peripheral pixels of the input quantization value.

Similar to the image coding apparatus, based on the predictive value generated in the predictive value generator 106, a non-linear quantization unit whose quantization width is small only in the vicinity of the predictive value is generated in the linear quantization unit generator 102 and the non-linear quantization unit generator 103. Utilizing the quantization unit thus obtained, the reverse quantization unit 302 performs the reverse quantization of the quantization value input from the quantization input unit 301, and then outputs the result to the output unit 303.

Therefore, the image decoding apparatus of Embodiment 15 realizes the reverse quantization of non-linear quantization without ROM tables and the like, as in the aforesaid coding apparatus. It is therefore able to realize a decoding circuit with a considerably small circuit.

Thus in the image coding apparatus and the image decoding apparatus of Embodiment 15, a predictive value for an input data based on the peripheral data is generated in the predictive value generator 106. The linear quantization unit generator 102 and the non-linear quantization unit generator 103 provide that after a quantization representative point is set by linear processing, quantization representative values are added in the vicinity of the predictive value to obtain the non-linear quantization unit generator whose quantization width is small only in the vicinity of the predictive value, thereby performing the quantization or the reverse quantization. Since Embodiment 15 is basically executed in the operation processing utilized in linear quantization, there is required no ROM tables and the like. Required are only a simple adder, subtracter and comparator. By reducing the circuit scale, it is able to reduce costs and electric power and to realize high-speed processing. In the quantization and the reverse quantization, the object of the processing is input values, not differences. Therefore even when the predictive value is incorrect, the above mentioned small circuit can minimize the error propagation without lowering the compressive rate.

Embodiment 16

An image coding apparatus and an image decoding apparatus of Embodiment 16 are those in which a quantization representative point is added to a linear quantizing unit to realize a non-linear quantization unit for obtaining quantization values, like in Embodiment 15. These apparatuses prevent a decrease in dynamic range by a shift function.

Figure 19:
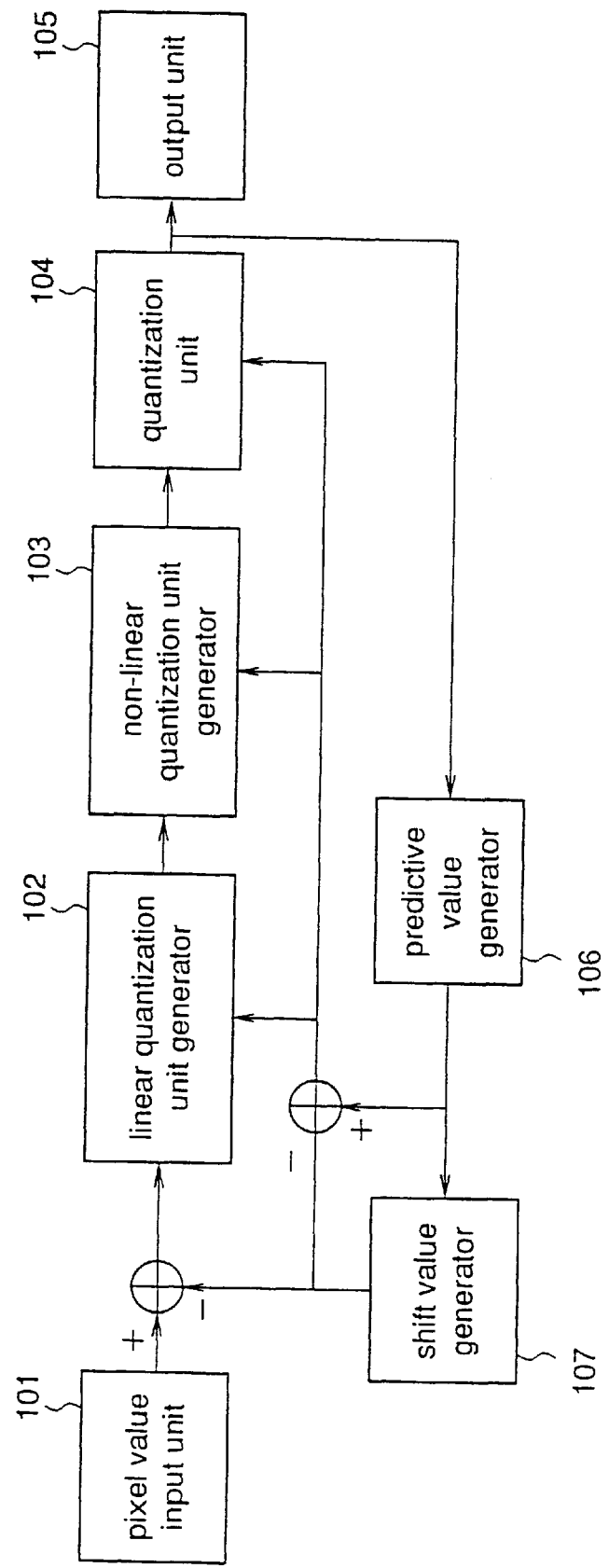
FIG. 19 is a block diagram showing a construction of an image coding apparatus of Embodiment 16 of the invention.

Referring to FIG. 19, there is shown the construction of the image decoding apparatus of Embodiment 16. A shift value generator 107 generates a shift value according to a specified system. Others are common to FIG. 16, and the descriptions are the same as those of Embodiment 15.

The operation of the image coding apparatus so constructed will be described. Similar to Embodiment 15, assuming that an input pixel value is indicated in 8-bit (d) and the quantization value after the coding is 6-bit (n), wherein n=6, k=d−n=2, and the addition upper bound number m=5.

When a pixel value is input from the pixel value input unit 101, the predictive value generator 106 generates a predictive value of 8-bit as a linear sum that is obtainable from the quantization values of the peripheral pixels. Based on the predictive value thus generated, the shift value generator 107 generates a shift value that is obtained according to a specified system. Based on the shift predictive value that is obtained by subtracting the above shift value from the above predictive value, the linear quantization unit generator 102 and the non-linear quantization unit generator 103 set quantization representative values for an shift input value that is obtained by subtracting the above shift value from the input pixel value.

Referring to FIGS. 20(a) to 20(d), there are shown an example of the setting of the quantization representative point in Embodiment 16. Embodiment 16 differs from Embodiment 15 in that the shift predictive value is used in place of the predictive value.

The quantization unit 104 selects the nearest quantization representative value of a shift input value, and outputs an allocated quantization value to the output unit 105.

In the image coding apparatus of Embodiment 16, the quantization representative values are basically added only in the vicinity of the shift predictive value by linear quantization, like Embodiment 15. Even non-linear quantization, there is required no ROM tables and the like. Further, since the input pixel value is shifted and its resulting value is directly quantized, error propagation during predictive coding is satisfactorily prevented.

Figure 21:
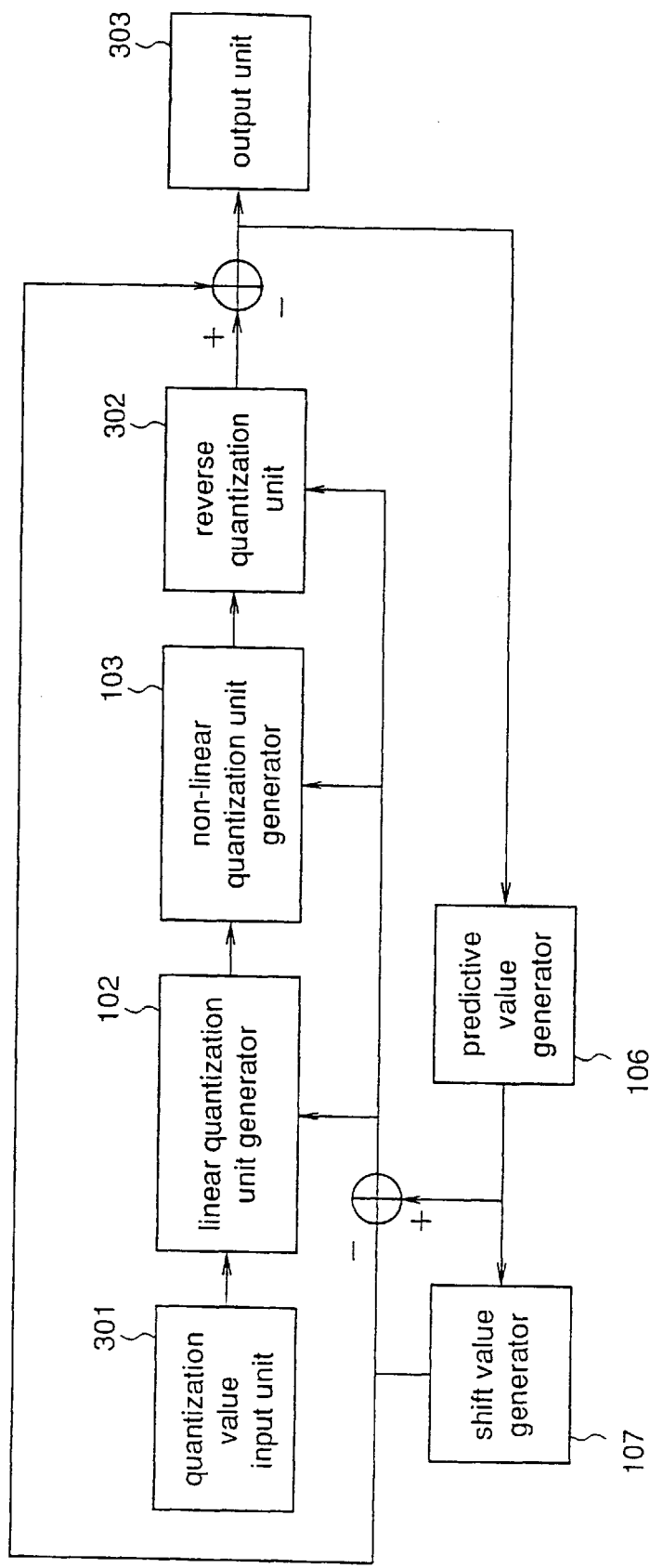
FIG. 21 is a block diagram showing a construction of an image decoding apparatus of Embodiment 16.

Referring to FIG. 21, there is shown the construction of the image decoding apparatus of Embodiment 16, in which the above coded data is decoded. The shift value generator 107 is the same as that of the image coding apparatus. Others are common to FIG. 18.

A description will be given of the operation of the image decoding apparatus of Embodiment 16. When a quantization value, i.e., the result of the coding, is input from the quantization value input unit 301, the predictive value generator 106 generates, as a linear sum, a predictive value for the input quantization value by utilizing the peripheral pixels. Based on the predictive value, the shift value generator 107 generates a shift value according to a specified system.

Similar to the image coding apparatus, the linear quantization unit generator 102 and the non-linear quantization unit generator 103 provide a non-linear quantization unit whose quantization width is small only in the vicinity of the predictive value. Utilizing the obtained non-linear quantization unit, the reverse quantization unit 302 performs the reverse quantization of the quantization value input from the quantization value input unit 301. To the value thus obtained, the shift value is added, followed by decoding. Its result is output to the output unit 303.

The image decoding apparatus of Embodiment 16 realizes, like Embodiment 15, the reverse quantization of non-linear quantization without ROM tables and the like. It is therefore able to realize a decoding circuit with a considerably small circuit.

Thus in the image coding and decoding apparatuses of Embodiment 16, the linear quantization unit generator 102 and the non-linear quantization unit generator 103 provide the non-linear quantization by operation processing. It is therefore possible to reduce the circuit scale. This enables to reduce costs and electric power and to satisfactorily prevent the error propagation during the predictive coding.

Embodiment 16 further provides the following advantage. Based on the predictive value generated in the predictive value generator 106, the shift value generator 107 generates a shift value according to a specified system. Whereas in generating a non-linear quantization unit, instead of such a predictive value, there is employed a shift predictive value that is obtained by subtracting a shift value from a predictive value, thereby avoiding the limit of the dynamic range.

Specifically, Embodiment 15 realizes the non-linear quantization with a small circuit and can prevent the error propagation during the predictive coding. In Embodiment 15, however, the maximum number of the linear quantization representative points is obtained by reducing the number of the quantization representative points to be added from the original setting number of $2^k$, furthermore, the setting is executed around a predictive point. As a result, in a dynamic range, an area exceeding the maximum quantization representative value and an area below the minimum quantization representative value are substantially beyond the object, whereby the dynamic range is restricted.

Whereas in Embodiment 16, the shift of a predictive value due to a shift value allows to extend such a restricted dynamic range in the direction of the shift, leading to the recovery of the range. It is therefore possible to provide dynamic range equivalent to that of the case in which linear quantization is mainly performed.

Embodiment 17

An image coding apparatus of Embodiment 17 is for obtaining a non-linear quantization value by a linear quantization value generator and a non-linear quantization value generator.

Figure 22:
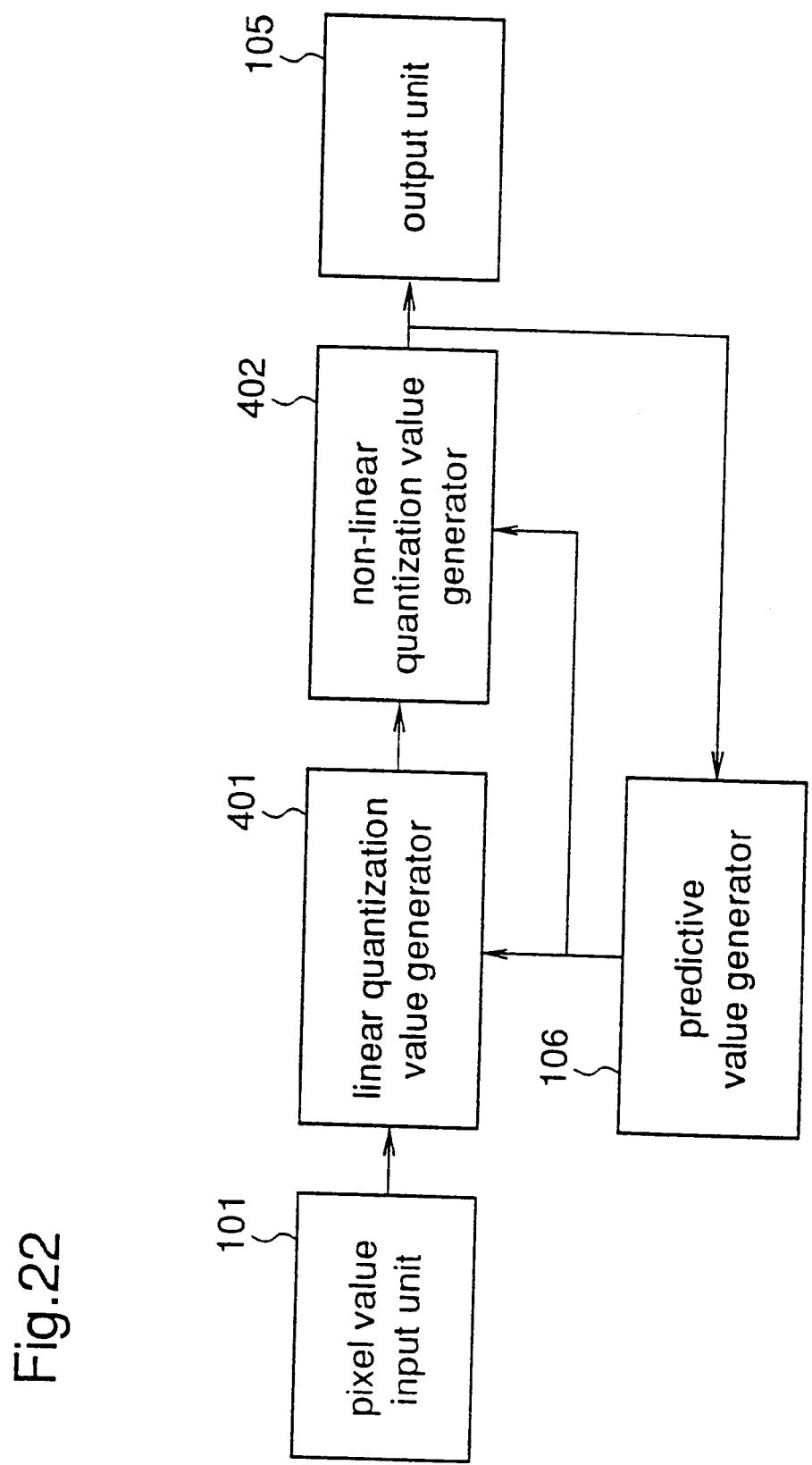
FIG. 22 is a block diagram showing a construction of an image coding apparatus of Embodiment 17 of the invention.

Referring to FIG. 22, there is shown the construction of the image decoding apparatus of Embodiment 17. A linear quantization value generator 401 generates a linear quantization value by the division processing of input pixel value. The generator 401 determines an offset value by the remainder of the division processing, and includes an offset value adding means for adding the offset value to the input pixel value. A non-linear quantization value generator 402 generates a non-linear quantization value by correcting the above linear quantization value with the difference between the input pixel value and a predictive value. Others are common to FIG. 16, and the descriptions are the same as those of Embodiment 15.

The image coding apparatus so constructed will operate as follows. When a pixel value is input from a pixel value input unit 101, a predictive value generator 106 generates a predictive value of 8-bit utilizing the peripheral pixels of the input pixel, as a linear sum obtained from the quantization values of the peripheral pixels. The input pixel value from the input unit 101 is also input to the linear quantization value generator 401, in which by the offset value adding means an offset value determined by lower k-bit of the predictive value is added to the input pixel value and then divided with $2^k$ to be converted into a linear quantization value. The "k" is obtained as the difference between the bit number of the dynamic range of the input pixel value and that of the quantization value to be output.

The linear quantization value is then input to the non-linear quantization value generator 402 to be corrected based on the difference value between the input pixel value and the predictive value, converted into a non-linear quantization value and then output from the output unit 105.

A description will be given of the algorithm for image coding. Similar to Embodiment 15, assuming that the input pixel value is indicated by 8-bit (d), and the quantization value after the coding is 6-bit (n) (n=6, k=d−n=2). As shown in FIGS. 23(*a*) to 23(*d*), when setting quantization representative values, to linear quantization representative values with quantization width of 4, there are set six quantization representative values consisting of four quantization representative values with quantization width of 1, adjacent to a predictive value (i.e., 13 in FIGS. 23(*a*) to 23(*d*)), and two quantization representative values with quantization width of 2.

Figure 24:
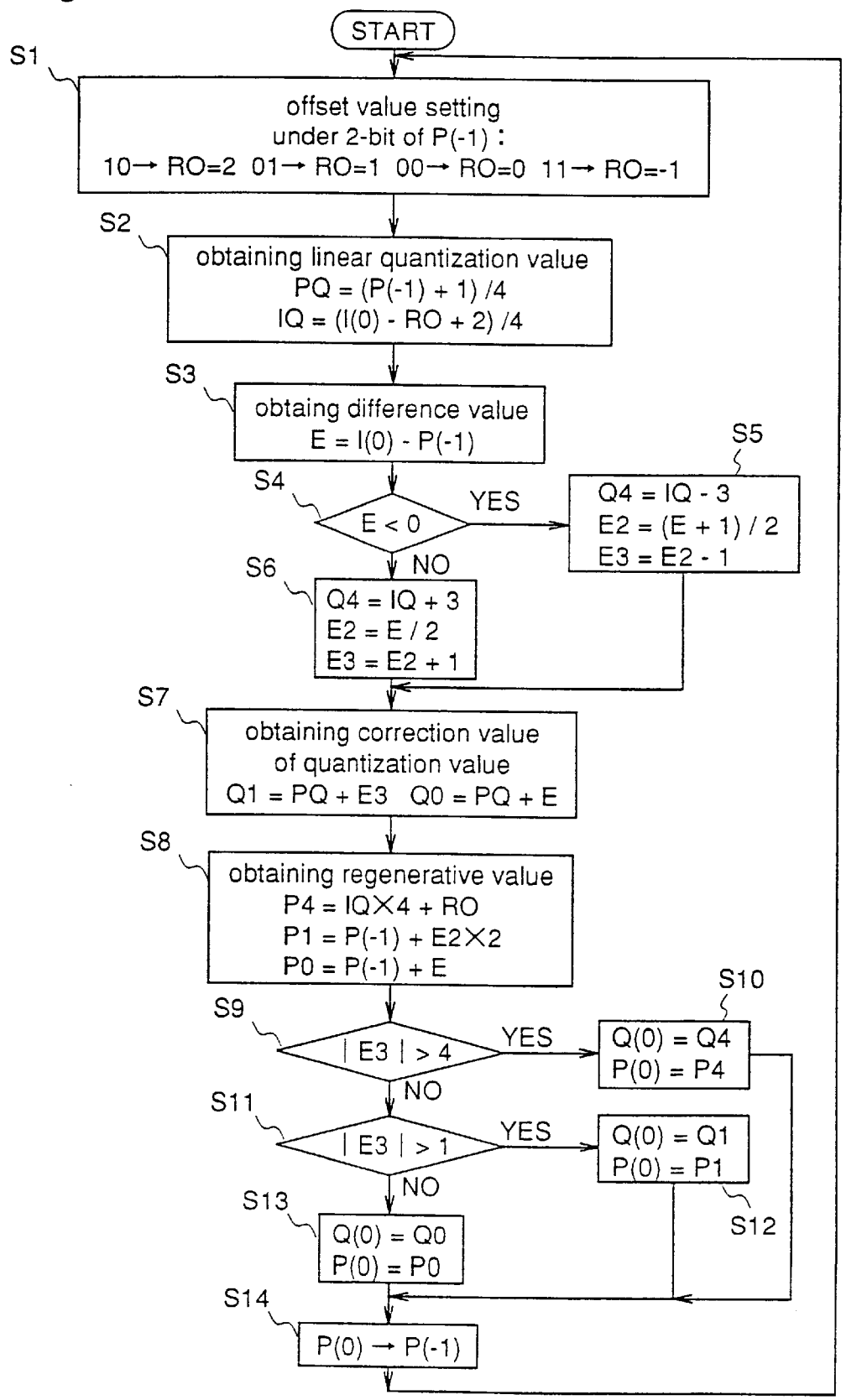
FIG. 24 is a flow chart showing a coding algorithm of the image coding apparatus of Embodiment 17.

Referring to FIG. 24, there is shown a flow chart of the algorithm of the image coding according to Embodiment 17. The quantization operation of the image coding apparatus will be described. In FIG. 24, P(t) denotes the predictive value generated at time t, I(t) denotes the input pixel value generated at time t, Q(t) denotes the input pixel value generated at time t, RO denotes an offset value and IQ denotes a linear quantization value. For the sake for simplicity, assuming that there is used a regenerated value of immediately before. The regenerative value can be obtained from the predictive value by executing the algorithm.

In step S1 in FIG. 24, the offset value adding means of the linear quantization value generator 401 determines an offset value from lower 2-bit of the predictive value P(−1) obtained from the regenerated value at the time immediately before. In step S2, the offset value is added to the input pixel value by the offset value adding means, and the result is divided by $2^2$ in the linear quantization value generator 401, to obtain a linear quantization value.

From step S3, the correction is performed by the non-linear quantization value generator 402. In step S3, the difference between the predictive value and the input pixel value is obtained. In step S4, the obtained difference is determined whether it is positive or negative. In step S5 or S6, a correction value is obtained. Based on the results, a correction value for the quantization value is operated in step S7, and a regenerative value is operated in step S8. In step S9 and S10, it is determined whether either value is adopted based on the difference value previously obtained. As a result, either of steps S10, S12 and S13 is executed to obtain a quantization value.

As described above, the conversion of the input pixel value into the quantization value is completed. Also in step S10, S12 or S13, a regenerative value P(0) is obtained and in step S14, the regenerative value is then feedbacked so as to use as a predictive value. Then, the operation for obtaining the next quantization value is repeated.

As can be seen from the above algorithm, the image coding apparatus of Embodiment 17 can be executed only by simple add-subtract and the comparison. Although non-linear quantization is employed, there is required no complex circuit such as ROM tables. This algorithm provides the value equivalent to the linear quantized input pixel value as a quantization value, so that the influence of error propagation hardly occurs.

Figure 25:
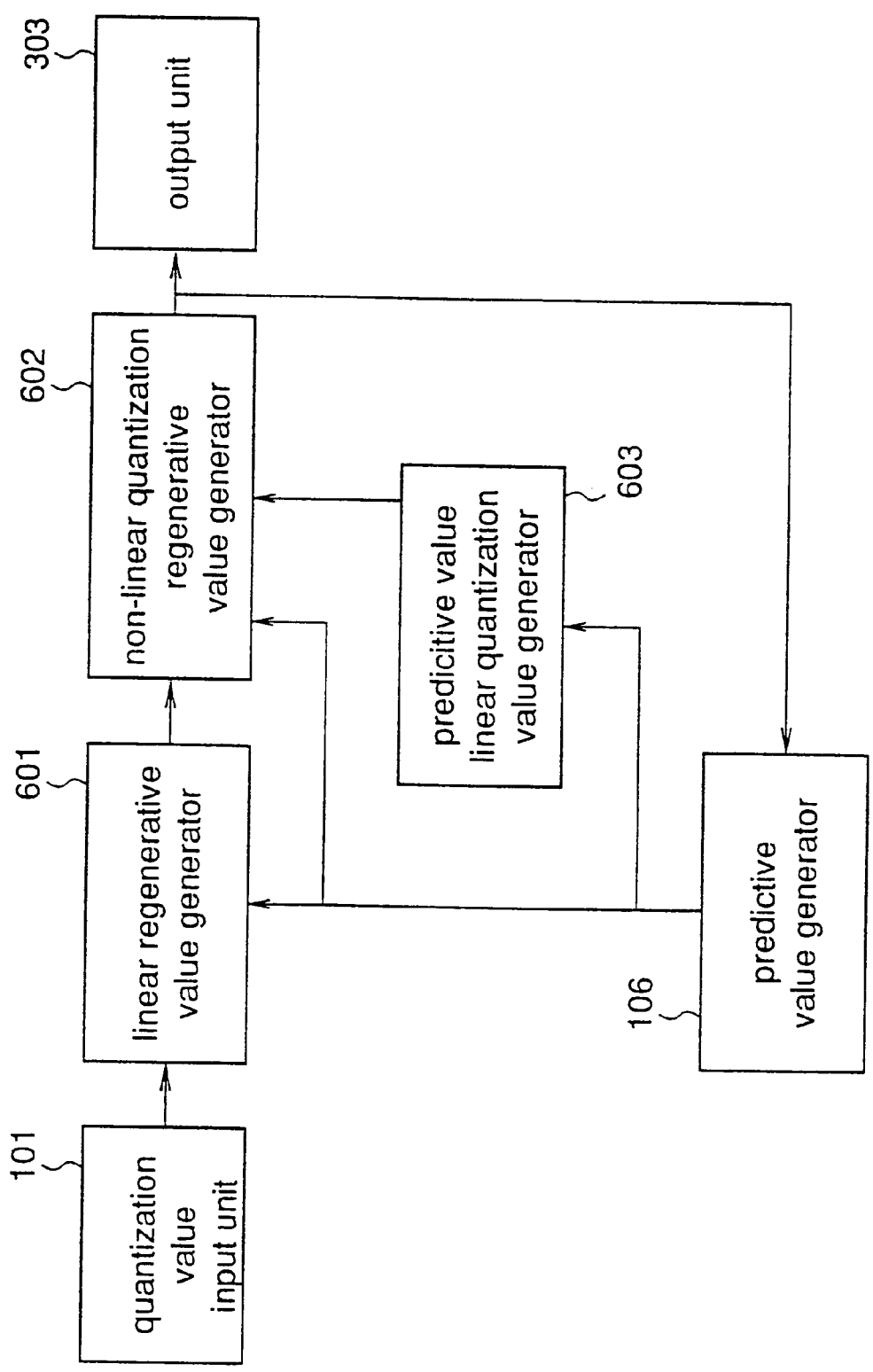
FIG. 25 is a block diagram showing a construction of an image decoding apparatus of Embodiment 17.

Referring to FIG. 25, there is shown the construction of the image decoding apparatus of Embodiment 17. A linear regenerative value generator 601 generate a linear quantization value for the input quantization value. The generator 601 includes an offset value adding means in which an offset value is determined by the remainder of the division operation of a predictive value, and the offset value is added to a linear regenerative value. A non-linear quantization regenerative value generator 602 performs a correction by the difference value between an input quantization value and a predictive value linear quantization value. A predictive value quantization value generator 603 performs a division operation of the predictive value to obtain a predictive linear quantization value. A quantization value input unit 301, an output unit 303 and a predictive value generator 106 are common to FIG. 18, and the descriptions is the same as those of Embodiment 15.

A description will be given of the operation of the image decoding apparatus of Embodiment 17.

The offset value adding means in the linear regenerative generator 601 finds a specified offset value against lower k-bit of the predictive value of the predictive value generator 106. The generator 601 performs a multiplication operation of an input quantization value from the quantization value input unit 301 to obtain the value of $2^k$, and adds the above offset value to the value $2^k$ to convert it into a linear quantization regenerative value, and outputs it to the non-linear quantization value generator 602.

The generator 602 divides the predictive value by $2^k$ to obtain a predictive linear quantization value, and outputs it to the non-linear quantization value generator 602. The generator 602 adds a correction value generated from the difference value between the input quantization value and the predictive linear quantization value to a linear quantization regenerative value or a predictive value, to obtain a quantization regenerative value, and then outputs it to the output unit 303.

A description will be given of the algorithm for image decoding. Assuming that an input pixel value at the coding and a regenerative value are indicated in 8-bit (d), a regenerative value after the decoding is indicated in 8-bit, and the quantization value after the coding is indicated in 6-bit (n) (n=6, k=d−n=2). In setting quantization representative values, similar to the coding apparatus, six quantization representative values are added and then provided, as shown in FIG. 23.

Figure 26:
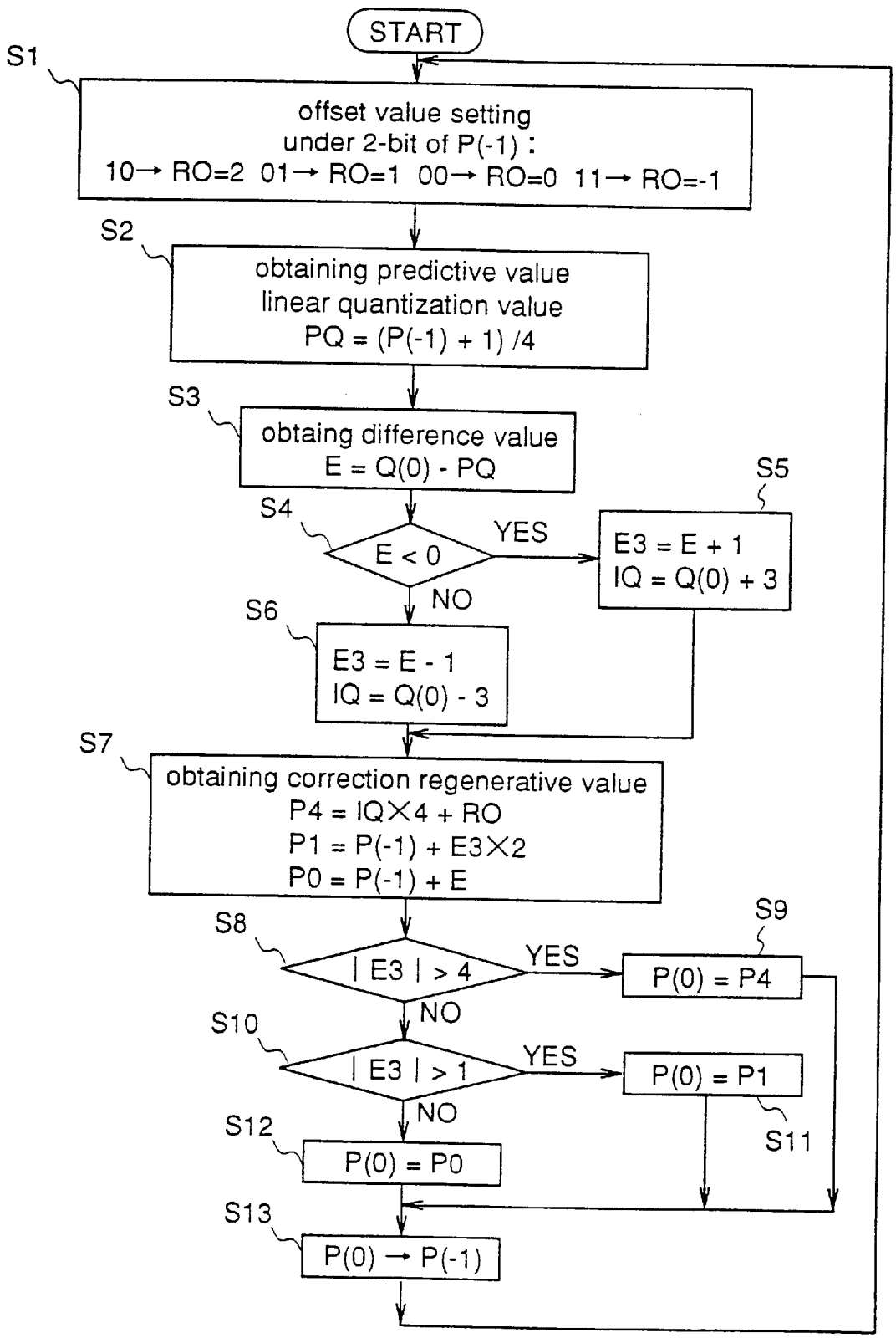
FIG. 26 is a flow chart showing a decoding algorithm of the image decoding apparatus of Embodiment 17.

Referring to FIG. 26, there is shown a flow chart of the algorithm for image decoding in Embodiment 17. According to the flowchart, a description will be given of the algorithm for non-linear quantization value operation. Assuming that P(t) denotes a quantization regenerative value and a predictive value each being generated at time t, Q(t) denotes an input quantization value input at time t, RO denotes an offset value, PQ denotes a predictive value linear quantization value and IQ denotes a linear regenerative value. For the sake of simplicity, assuming that the regenerative value at immediately before is used as a predictive value.

In step S1, the offset value adding means in the linear regenerative value generator 601 sets an offset value by lower 2-bit of the predictive value P(−1) obtained from the quantization regenerative value of immediately before. In step S2, the predictive value is divided by $2^2$ in the predictive value linear quantization value generator 603 to obtain a predictive value linear quantization value PQ.

From step S3, the correction is performed in the non-linear quantization regenerative value generator 602. In step S3, a difference value between the predictive value linear quantization value and the input quantization value is obtained. In step S4, it is determined whether the difference is positive or negative. In step S5 or S6, a correction value is obtained. Based on the results, the operation of a correction regenerative value is operated in step S7, and steps S8 and S10, based on the obtained difference value, it is determined whether either value should be adopted. Steps S9, S11 or S12 is executed to obtain a quantization regenerative value.

As described above, the processing for decoding the input quantization value into the quantization regenerative value is executed. The obtained quantization regenerative value is feedbacked in step S13, whereby the operation for obtaining the next quantization regenerative value is repeated.

Although the image decoding algorithm employs a non-linear quantization, there is required no ROM table for the reverse quantization. Required are only simple add-subtract. Therefore, irrespective of the suitable change of the quantization representative value due to a predictive value, the decoding processing can be realized with a considerable small circuit.

In the image coding apparatus of Embodiment 17, the predictive value against the input data is generated based on the peripheral data in the predictive value generator 106. The linear quantization value generator 401 and the non-linear quantization value generator 402 provide that after the quantization representative value is set by the linear processing, and the quantization representative value is added to the vicinity of the predictive value to perform a non-liner quantization whose quantization width is small only in the vicinity of the predictive value, thereby obtaining a quantization value. This is executed by the operation processing used basically in linear quantization. Hence, without ROM tables and the like, the apparatus can be realized by a simple adder-subtracter. It is therefore possible to reduce the size of the circuit, leading to reduced cost and electric power, permitting a high-speed processing.

In the image decoding apparatus of Embodiment 17, a linear quantization regenerative value is obtained by the linear processing in the linear regenerative value generator 601, a predictive value linear quantization value is obtained in the predictive value linear quantization value generator 603 based on a predictive value generated in the predictive value generator 106. Based on the results, the correction is executed in the non-linear quantization regenerative value generator 602 based on the difference value between the input quantization value and the predictive linear quantization value, to obtain a quantization regenerative value. It is therefore possible to realize the reverse quantization with a small circuit and to reduce costs and electric power.

In the quantization and the reverse quantization there is processed an input value not a difference. Even when the predictive value is incorrect, the error propagation can be minimize without reducing the compressive rate. This enables to realize with such a small circuit as described.

Embodiment 18

An image coding apparatus of Embodiment 18 is for obtaining a quantization representative value by the linear quantization value generator and the non-linear quantization value generator, like in Embodiment 17. The apparatus prevents a decrease in dynamic range by a shift function.

Figure 27:
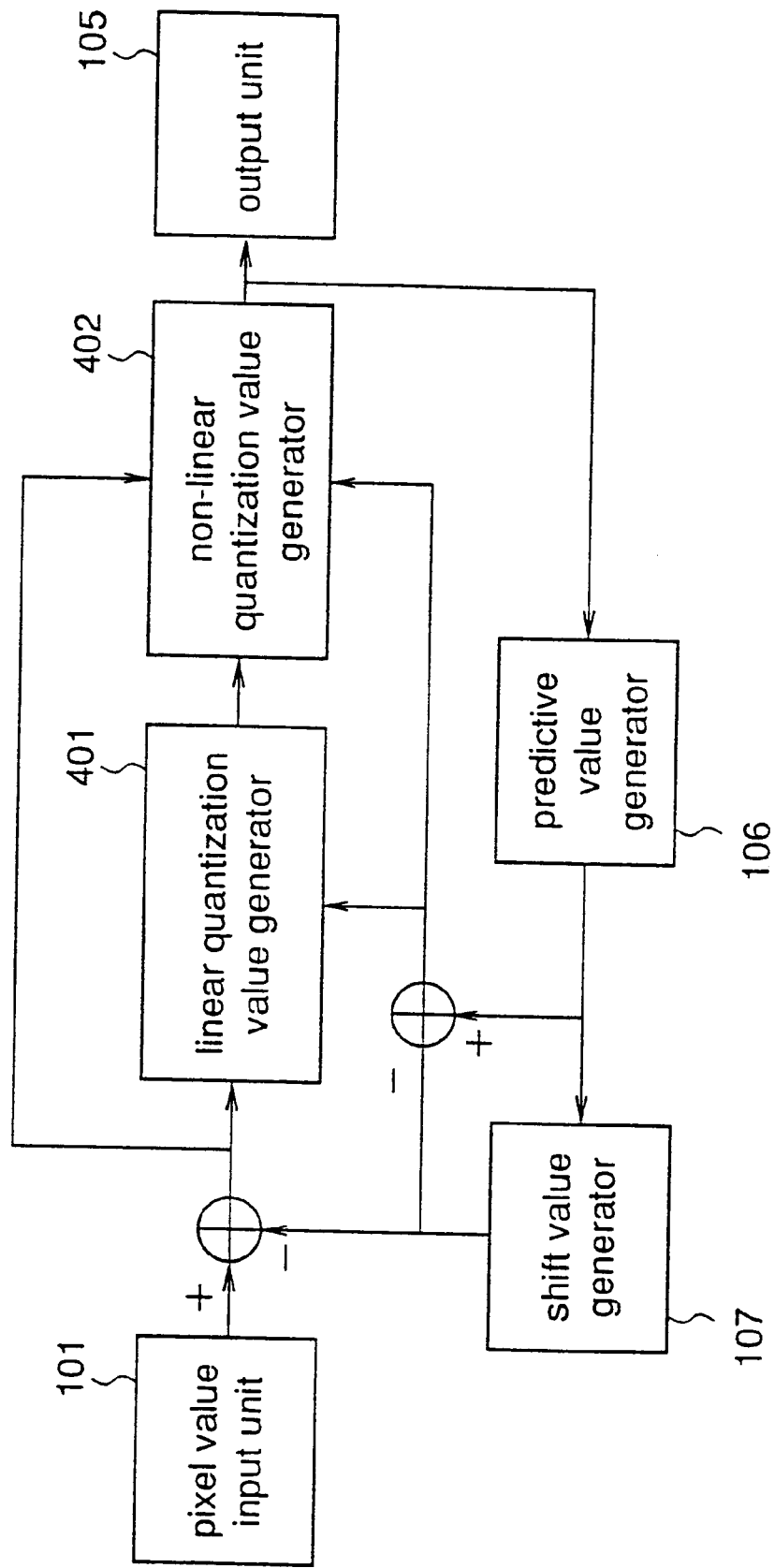
FIG. 27 is a block diagram showing a construction of an image coding apparatus of Embodiment 18 of the invention.

Referring to FIG. 27, there is shown the construction of the image decoding apparatus of Embodiment 18. A shift value generator 107 generates a shift value according to a specified system. Others are common to FIG. 22, and the descriptions are the same as those of Embodiment 17.

The image coding apparatus so constructed will operate as follows. When a pixel value is input from a pixel value input unit 101, a predictive value generator 106 generates a predictive value of 8-bit utilizing the peripheral pixels of the input pixel, as a linear sum obtained from the quantization values of the peripheral pixels. Based on the generated predictive value, the shift value generator 107 generates a shift value by a specified system. While a shift input value obtained by subtracting the shift value from the input pixel value from the pixel value input unit 101, is input to a linear quantization value generator 401 and, by the offset value adding means, there is added an offset value determined by lower k-bit of the predictive value, and then divided by $2^k$ to be converted into a linear quantization value. The "k" is obtained as the difference between the bit number of the dynamic range of the input pixel value and that of the quantization value to be output.

The linear quantization value is then input to the non-linear quantization value generator 402 to be corrected based on the difference value between the input pixel value and the predictive value, converted into a non-linear quantization value and then output from the output unit 105.

A description will be given of the algorithm for image coding. Similar to Embodiment 17, assuming that the input pixel value is indicated by 8-bit (d), and the quantization value after the coding is 6-bit (n) (n=6, k=d−n=2). When setting quantization representative values, like Embodiment 17, there are added six quantization representative values consisting of four quantization representative values with quantization width of 1, and two quantization representative values with quantization width of 2. It is noted that the predictive value is employed instead of the shift predictive value.

Figure 28:
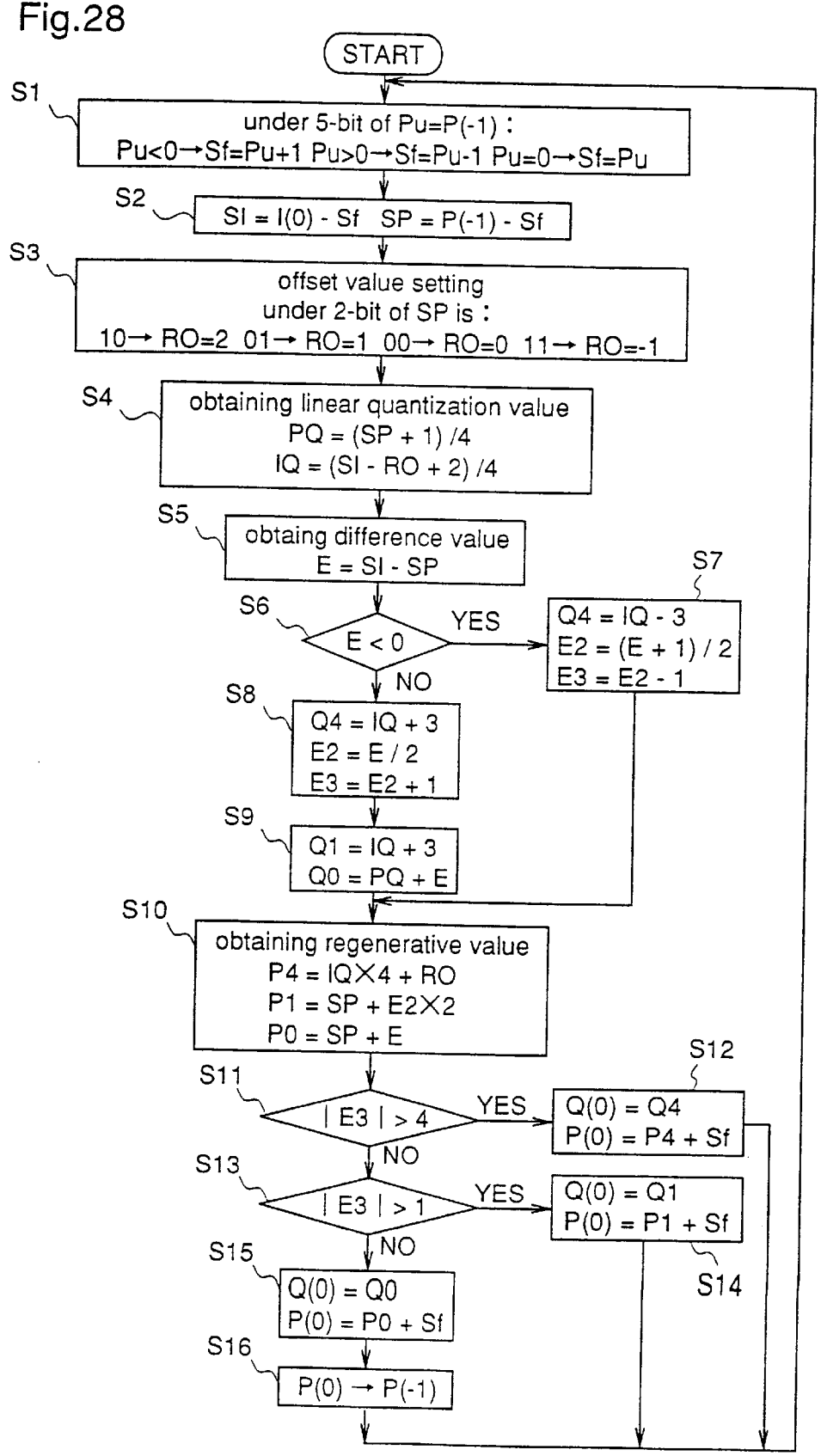
FIG. 28 is a flow chart showing a coding algorithm of the image coding apparatus of Embodiment 18.

Referring to FIG. 28, there is shown a flow chart of the algorithm of the image coding according to Embodiment 18. The quantization operation of the image coding apparatus will be described. In FIG. 28, P(t) denotes the predictive value generated at time t, Sf is a shift value obtained from the predictive value, I(t) denotes the input pixel value generated at time t, Q(t) denotes the input quantization value generate at time t, RO denotes an offset value and IQ denotes a linear quantization value. For the sake for simplicity, assuming that there is used as regenerative value of immediately before. The regenerative value can be obtained from the predictive value by executing the algorithm.

In step S1 in FIG. 28, the shift value generator 107 determines a shift value Sf from upper 5-bit of the obtained predictive value P(−1) obtained from the regenerative value of immediately before. In step S2, a shift input value obtained by subtracting the shift value from the input pixel value, and a shift predictive value obtained by subtracting the shift value from the predictive value. In step S3, the offset value adding means in the linear quantization value generator 401 sets an offset value by lower 2-bit of the shift predictive value. In step S4, after the offset value is added to the shift input value in the offset value adding means and the result is divided by $2^2$ in the linear quantization value.

From step S5, the correction is performed by the non-linear quantization value generator 402. In step S5, the difference between the predictive value and the input pixel value is obtained. In step S6, the obtained difference is determine whether it is positive or negative. In step S7 or S8, a correction value is obtained. Based on the results, a correction value for the quantization value is operated in steps S8 and S9, and a regenerative value is operated in step S10. In steps S11 and S13, it is determined whether either value is adopted based on the difference value previously obtained. As a result, either of steps S12, S14 and S15 is executed to obtain a quantization value.

As described above, the conversion of the input pixel value into the quantization value is completed. Also in step S12, S14 or S15, a regenerative value P(•) to which the shift value has been added is obtained, and in step S16, the regenerative value is then feedbacked so as to use as a predictive value. Then, the operation for obtaining the next quantization value is repeated.

As can be seen from the above algorithm, the image coding apparatus of Embodiment 18 can be executed only by simple add-subtract and the comparison. Although non-linear quantization is employed, there is required no complex circuit such as ROM tables. This algorithm also provides the value equivalent to the linear quantized input pixel value as a quantization value, so that the influence of error propagation hardly occurs.

Figure 29:
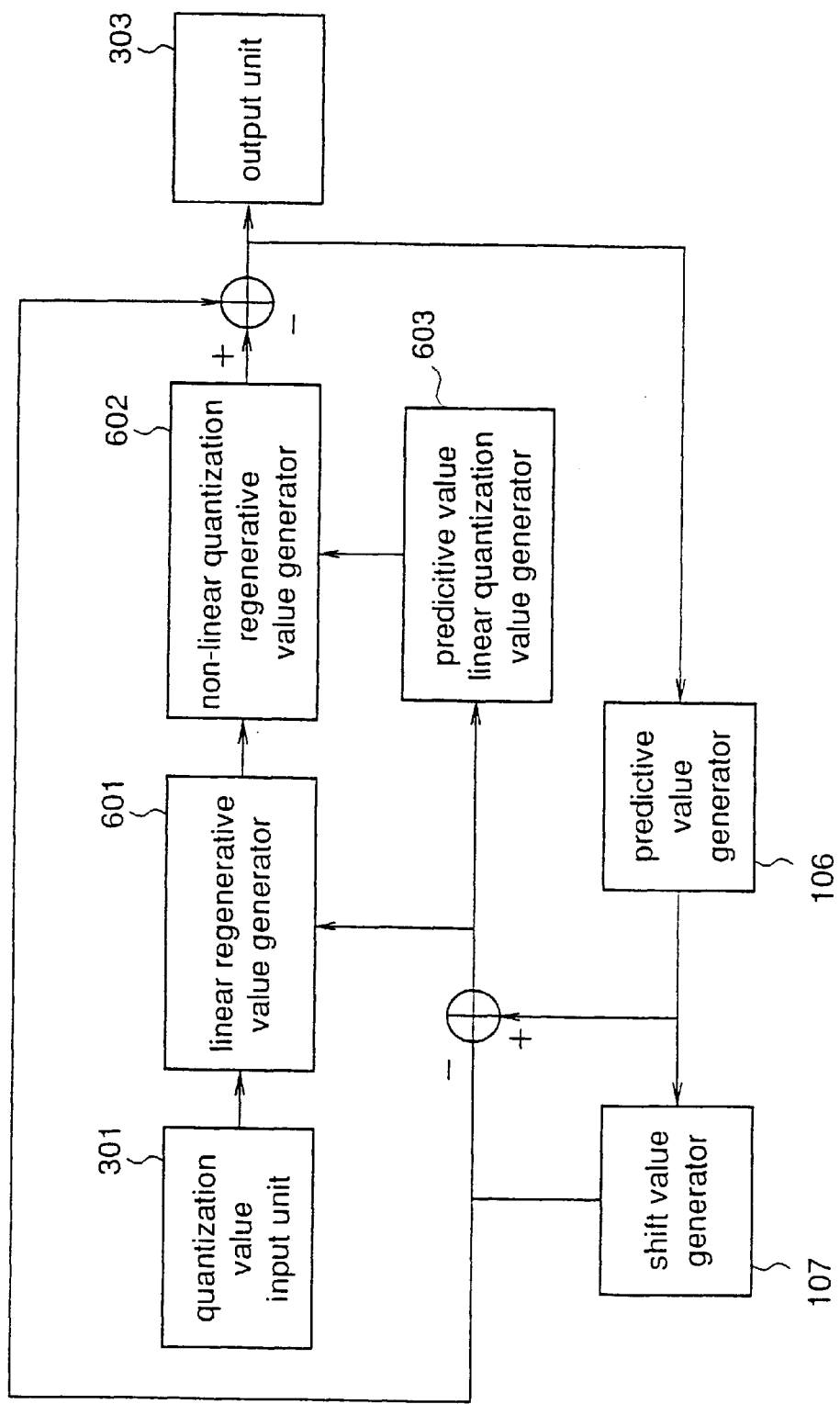
FIG. 29 is a block diagram showing a construction of an image decoding apparatus of Embodiment 18.

Referring to FIG. 29, there is shown the construction of the image decoding apparatus of Embodiment 18. A shift value generator 107 generates a shift value by a specified system. Others are common to FIG. 25, and the descriptions are the same as those of Embodiment 17.

A description will be given of the operation of the image decoding apparatus of Embodiment 18. The shift value generator 107 generates shift value by a specified system, based on the predictive value generated in the predictive value generator 106. The offset value adding means in the linear regenerative generator 601 finds a specified offset value based on lower k-bit of the shift predictive value. The generator 601 performs a multiplication operation of an input quantization value from the quantization value input unit 301 to obtain the value of $2^k$, and adds the above offset value to the value $2^k$ to convert it into a linear quantization regenerative value, and outputs it to the non-linear quantization value generator 602.

The generator 602 divides the predictive value by $2^k$ to obtain a predictive linear quantization value, and outputs it to the non-linear quantization value generator 602. The generator 602 adds a correction value generated from the difference value between the input quantization value and the predictive linear quantization value to a linear quantization regenerative value or a predictive value, to obtain a quantization regenerative value, and then outputs it to the output unit 303.

A description will be given of the algorithm for image decoding. Assuming that an input pixel value at the coding and a regenerative value are indicated in 8-bit (d), and a quantization value after the coding in indicated in 6-bit (n) (n=6, k=d−n=2). In setting quantization representative value, six quantization values are added to be arranged, as in the image coding apparatus.

Figure 30:
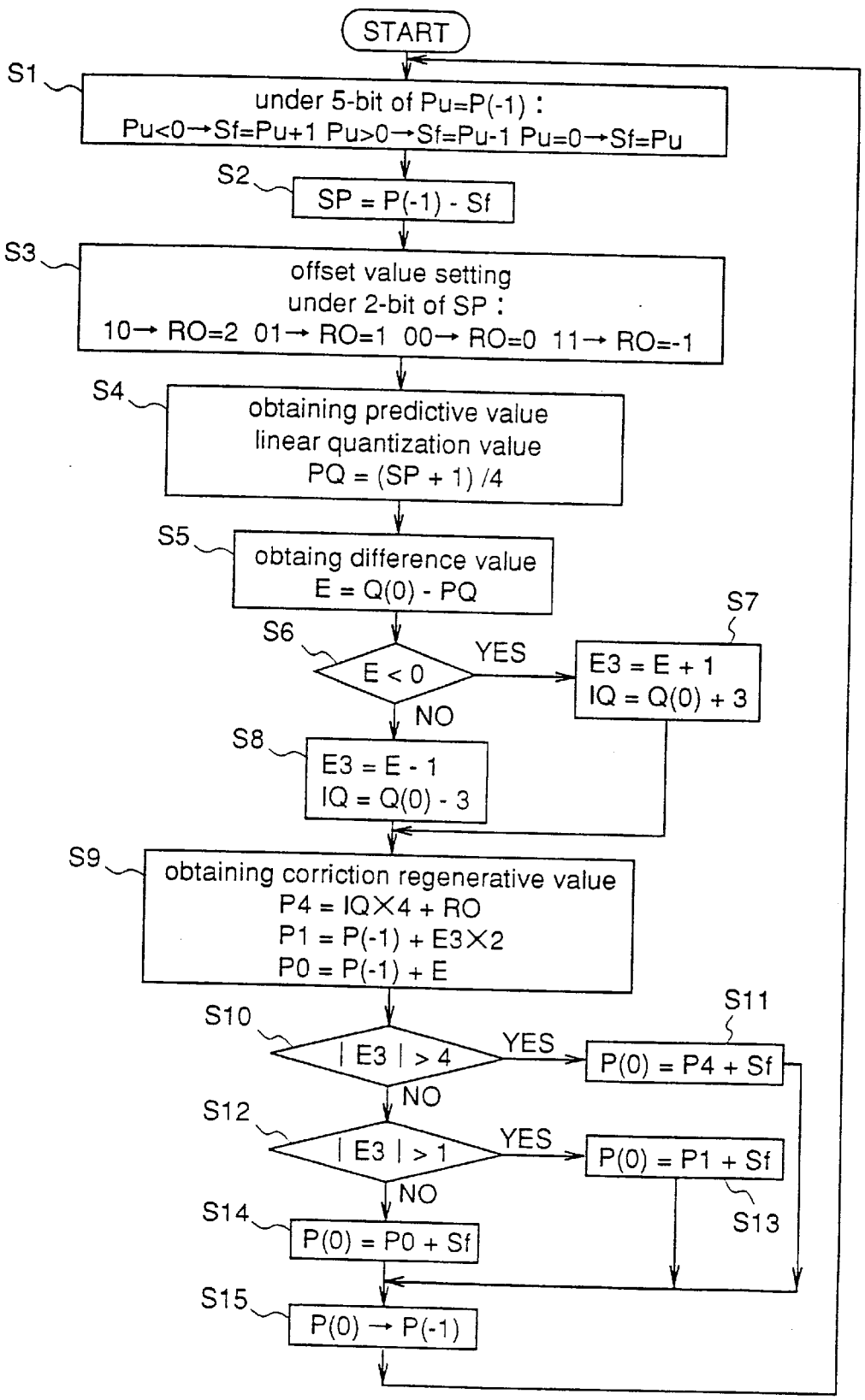
FIG. 30 is a flow chart showing a decoding algorithm of the image decoding apparatus of Embodiment 18.

Referring to FIG. 30, there is shown a flow chart of the algorithm for image decoding in Embodiment 18.
According to the flowchart, a description will be given of the algorithm for non-linear quantization value operation. Assuming that P(t) denotes a quantization regenerative value and a predictive value each being generated at time t, Q(t) denotes an input quantization value input at time t, RO denotes an offset value, PQ denotes a predictive value linear quantization value, Sf denotes a shift value obtained from the predictive value and IQ denotes a linear regenerative value. For the sake of simplicity, assuming that the regenerative value at immediately before is used as a predictive value.

In step S1 in FIG. 30, the shift value generator 107 determines a shift value Sf by upper 5-bit of the predictive value P(−1) obtained from the regenerative value at immediately before the time. In step S2, the shift value is subtracted from the predictive value to obtain a shift predictive value. In step S3, the offset value adding means in the linear regenerative value generator 601 determines an offset value by lower 2-bit of the predictive value P(−1) obtained from the quantization regenerative value at immediately before the time. In step S4, the shift predictive value is divided by $2^2$ in the predictive value linear quantization value generator 603 to obtain a predictive value linear quantization value PQ.

From step S5, the correction is carried out in the non-linear quantization regenerative value generator 602. In step S5, a difference value between the predictive value linear quantization value and the input quantization value is obtained. In step S6, it is determined whether the difference value is positive or negative. In step S7 or S8, a correction value is obtained. Based on the results, a correction regenerative value is operated in step S9. In steps S10 and S12, it is determined from the difference value whether either value should be adopted. Step S11, 13 or 14 is executed to obtain a quantization regenerative value, a shift value is added thereto and the result is output.

Although the image decoding algorithm employs a non-linear quantization, there is required no ROM table for the reverse quantization. Required are only simple add-subtract. Therefore, irrespective of the suitable change of the quantization representative value due to a predictive value, the decoding processing can be realized with a considerable small circuit.

In the image coding apparatus of Embodiment 18, the predictive value against the input data is generated based on the peripheral data in the predictive value generator 106. The linear quantization value generator 401 and the non-linear quantization value generator 402 provide that after the quantization representative value is set by the linear processing, and the quantization representative value is added to the vicinity of the predictive value to perform a non-linear quantization whose quantization width is small only in the vicinity of the predictive value, thereby obtaining a quantization value. Thus, like Embodiment 17, the realization of the non-linear quantization processing at a small circuit allows to reduce costs and electric power. This permits a high-speed processing and enables to satisfactorily prevent the error propagation during the predictive coding.

In the image decoding apparatus of Embodiment 18, a linear quantization regenerative value is obtained by the linear processing in the linear regenerative value generator 601, a predictive value linear quantization value is obtained in the predictive value linear quantization value generator 603 based on a predictive value generated in the predictive value generator 106. Based on the results, the correction is executed in the non-linear quantization regenerative value generator 602 based on a difference value between the input quantization value and the predictive linear quantization value, to obtain a quantization regenerative value. It is therefore possible to realize the reverse quantization with a small circuit and to reduce costs and electric power.

Furthermore in the apparatus of Embodiment 18, based on a predictive value generated in the predictive value generator 106, the shift value generator 107 generates a shift value by a specified system. In generating a non-linear quantization unit, a shift predictive value that is obtained by subtracting the shift value from the predictive value is employed instead of the predictive value. Therefore, a dynamic range restricted by a decrease of a linear quantization representative value can be recovered by extending the range to the shift direction. This realizes a dynamic range equivalent to that of the case in which linear quantization is mainly performed, like Embodiment 16.

It should be noted that although the correction for obtaining the non-linear quantization value or non-linear quantization regenerative value is carried out based on the difference value between a shift input value and a shift predictive value, it may be based on a difference value between a shift value and a predictive values, resulting in the same effect.

Embodiment 19

An image coding apparatus and an image decoding apparatus of Embodiment 19 are those in which quantization representative points are added to a linear quantizing unit to realize a non-linear quantization unit for obtaining a quantization value, and are provided with a function to set quantization representative points to a specific area.

Figure 31:
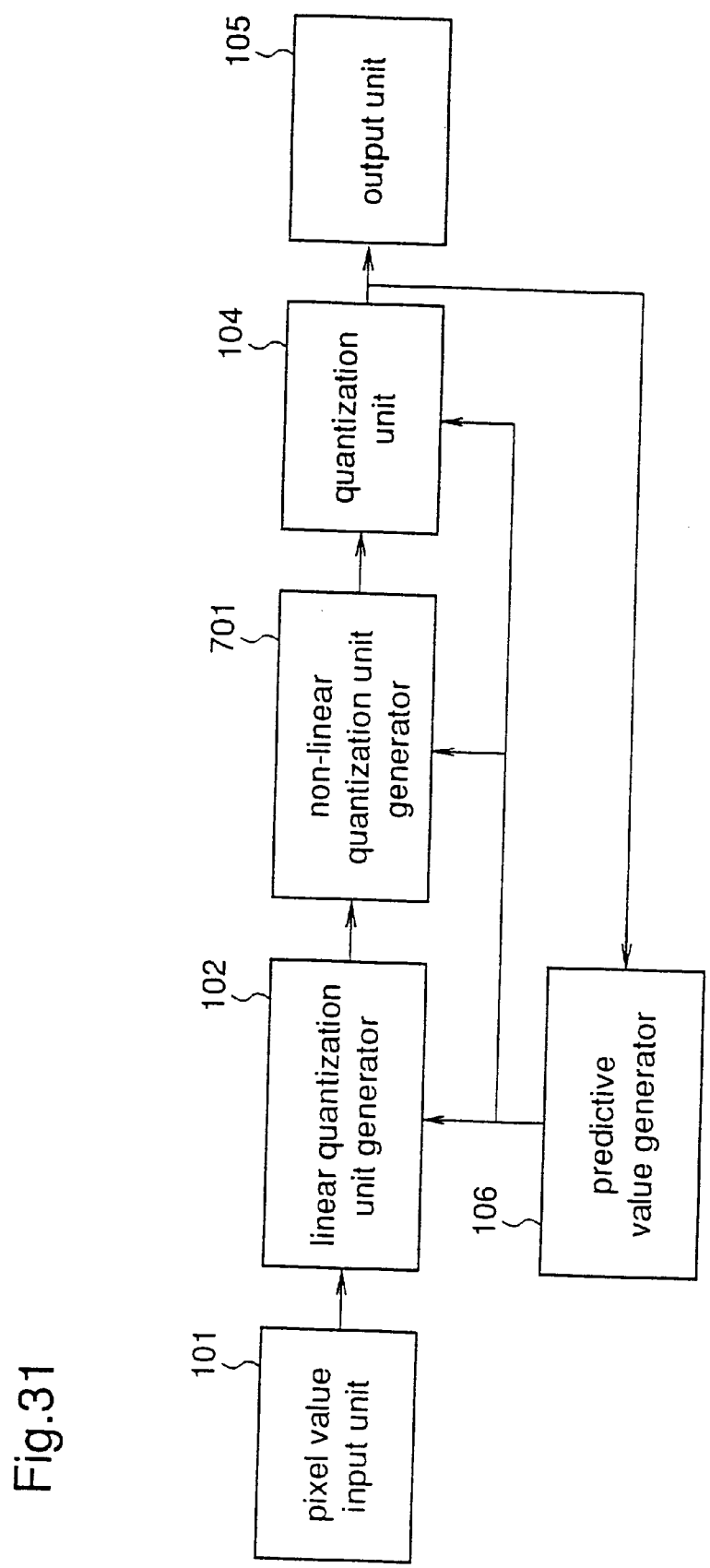
FIG. 31 is a block diagram showing a construction of an image coding apparatus of Embodiment 19 of the invention.

Referring to FIG. 31, there is shown the construction of the image decoding apparatus of Embodiment 19. A non-linear quantization unit generator 701 generates a non-linear quantization unit in which quantization representative points are added to a specific area in addition to the vicinity of a predictive point. Others are common to FIG. 16, and the descriptions are the same as those of Embodiment 15.

The image coding apparatus so constructed will operate as follows. Similar to Embodiment 15, assuming that an input pixel value is indicated in 8-bit (d), a quantization value after the coding is indicated in 6-bit (n) wherein n=6, k=d−n=2; m=5 wherein m is the number that has been previously set for setting quantization representative values to be added; and p=3 wherein p is a second addition upper bound number that has been previously set for adding quantization representative points to a specific area.

The operations up to the linear quantization unit having linear quantization representative values is generated in the linear quantization unit generator 102, are common to Embodiment 15. The linear quantization representative values are generated with the quantization width of 4 ($2^2$), resulting in 59 ($2^6$−5).

Referring to FIG. 32(a), there is shown a setting of quantization representative values by the linear quantization unit generator 102. In this cases, an area ranging from −128 to −119 and an area ranging from 119 to 127 are beyond the area to be selected as quantization representative values.

The non-linear quantization unit generator 701 adds quantization representative values to linear quantization representative values. That is, not more than m−p quantization representative points are added in the vicinity of the predictive value such that the quantization width near the predictive value becomes smaller than that of the linear quantization unit. In this example, in the range of two levels across the predictive value of 13, two (m−p=2) quantization representative values, i.e., 11 and 15, are added as shown in FIG. 32(b). As a result, only in the vicinity of the predictive value, the quantization width turns to be 2, while that of the other area is 4. The quantization representative points total 61.

Subsequently the non-linear quantization unit generator 701 adds each one quantization representative value to the area ranging from −128 to −119 and the area ranging from 119 to 127 (2<p=3). The quantization width of these area turns to be 8. As a result, the quantization representative values total 63 (<$2^6$), whereby the quantization value as the coding result is indicated by 6-bit.

As shown in FIG. 32(c), the quantization value allocated for the area ranging from −128 to −119 is −31 being the minimum. The quantization representative values are allocated in increasing order like Embodiment 1, so that 31 is allocated for the area ranging from 119 to 127.

Subsequently the quantization in the quantization unit 104 and the output to the output unit 108 are carried out in the same manner as in Embodiment 1.

Figure 33:
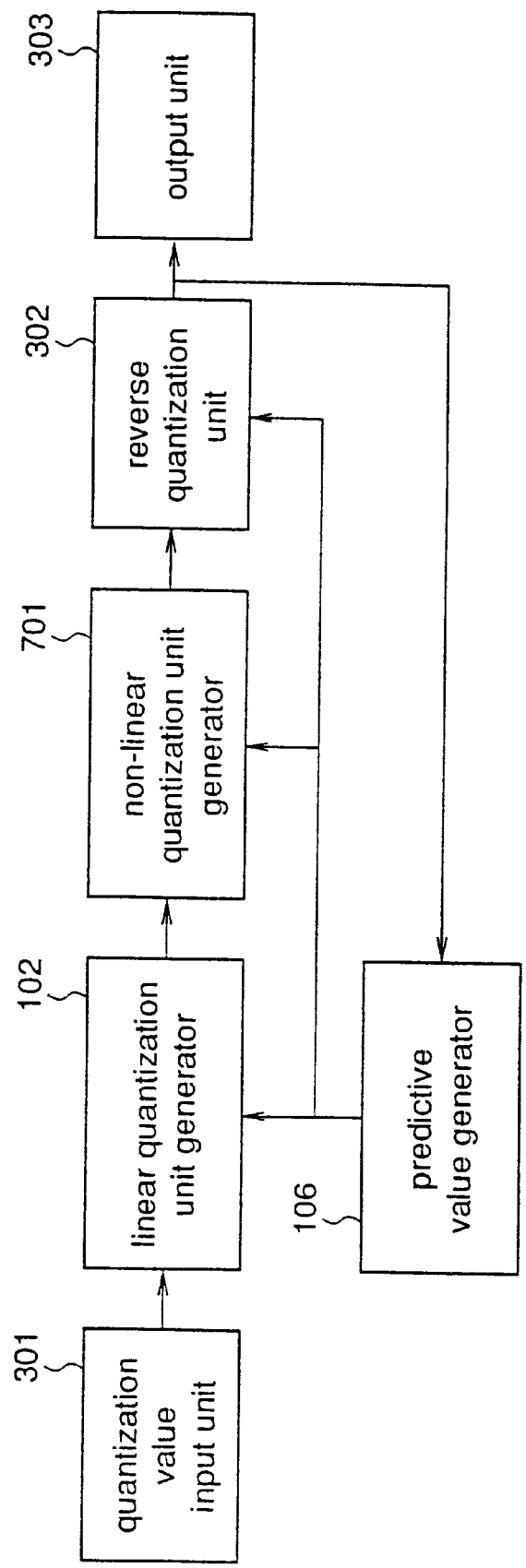
FIG. 33 is a block diagram showing a construction of an image decoding apparatus of Embodiment 19.

Referring to FIG. 33, a description will be given of the image decoding apparatus of Embodiment 19 in which the above coded data is decoded.

A non-linear quantization unit generator 701 is the same as that of the image coding apparatus. Others are common to FIG. 18.

The operation of the image decoding apparatus of Embodiment 19 is the same as that of Embodiment 15, except that the quantization representative values of the non-linear quantization unit generated in the non-linear quantization unit generator 701 are those which are shown in FIGS. 32(e) to 32(d).

There is required no ROM table and the like, thereby realizing the decoding processing at a small circuit.

As described above, the image coding and decoding apparatuses of Embodiment 19 are provided with the non-linear quantization unit generator that functions to add quantization representative values to a specific area. Therefore, the dynamic range restriction due to the addition of the quantization representative values to the vicinity of a predictive value, can be reduced by the construction having no function of generating shift values in Embodiment 16.

Embodiment 20

An image coding apparatus and an image decoding apparatus of Embodiment 20 are those in which non-linear quantization values are obtained by a linear quantization value generator and a non-linear quantization value generator, and a specified coding or decoding is carried out in reply to the input of a specific area.

Figure 34:
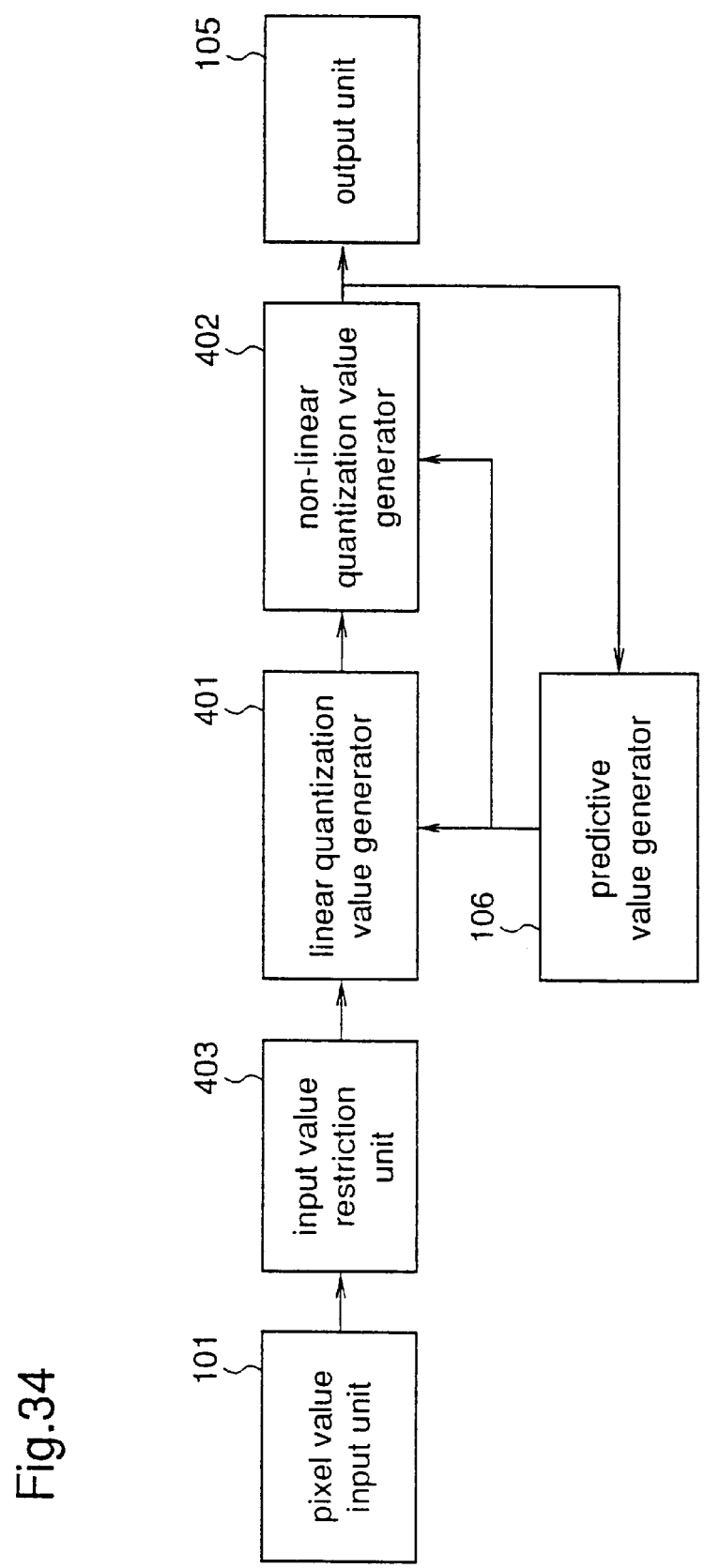
FIG. 34 is a block diagram showing a construction of an image coding apparatus of Embodiment 20 of the invention.

Referring to FIG. 34, there is shown the construction of the image decoding apparatus of Embodiment 20. An input restriction unit 403 examines the magnitude of an input pixel value from a pixel value input unit. When it is within a specified range, the restriction unit 403 outputs the input pixel value to a linear quantization value generator 401, and, when it is beyond the range, does not output the input pixel value but outputs a specified quantization value to a non-linear quantization value generator 402. When the quantization value is output from the restriction unit 403, the generator 402 outputs it to an output unit 105. Others are common to FIG. 22, and the descriptions are the same as those of Embodiment 17.

A description will be given of the operation of the image coding apparatus so constructed. Like Embodiment 17, assuming that an input pixel value is indicated in 8-bit (d), a quantization value after the coding is indicated in 6-bit (n) wherein n=6, k=d−n=2, the addition upper bound m is 5, and a second addition upper bound number p is 3.

When a pixel value is input from the pixel value input unit 101, the predictive value generator 106 generates a predictive value of 8-bit by utilizing pixels around the input pixel.

The input pixel value from the input unit 101 is also input to the input value restriction unit 403 and then determined whether it is within a specified range.

At that time, when the input pixel value is within the range, the input pixel value is input to the linear quantization unit 401, and there is added an offset value which is determined by lower k-bit of the predictive value in the unit 401. Like in Embodiment 17, the obtained value is converted into a linear quantization value by division processing, which value is then corrected in the non-linear quantization value generator 402, based on a difference value between the input value and the predictive value, so that it is converted into a non-linear quantization value and then output from the output unit 106.

On the other hand, when the input pixel value is outside of the specified range, the input value restriction unit 403 generates a non-linear quantization value by a specified system, which value is then input to the generator 402 and output from the output unit 105.

Figure 36:
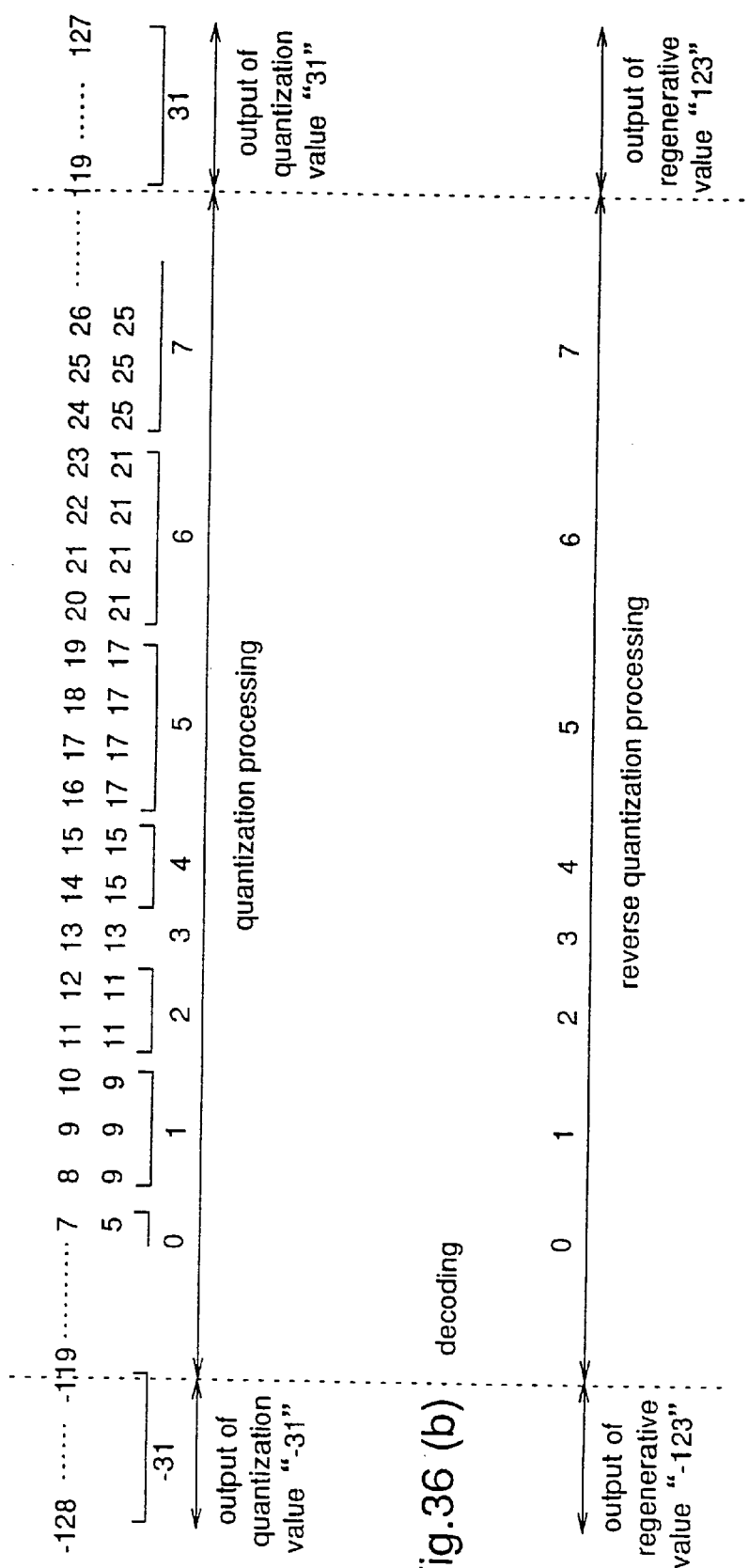
FIGS. 36(a) and 36(b) are diagrams for explaining the coding of the image coding apparatus and the decoding of the image decoding apparatus of Embodiment 20.

Referring to FIG. 36(a), when an input pixel value is in the range of from −118 to 118, the input value restriction unit 403 outputs it to the linear quantization value generator 401. The output pixel value is then processed in the generator 401 and the non-linear quantization value generator 402, like the coding apparatus of Embodiment 17, thereby obtaining a quantization value.

When an input pixel value is in the range of from −128 to −119, or from 119 to 127, the restriction unit 403 does not output it to the generator 401, but generates the non-linear quantization values "−31" or "31", and outputs it to the generator 402. This results in the same coding result like Embodiment 19.

Figure 35:
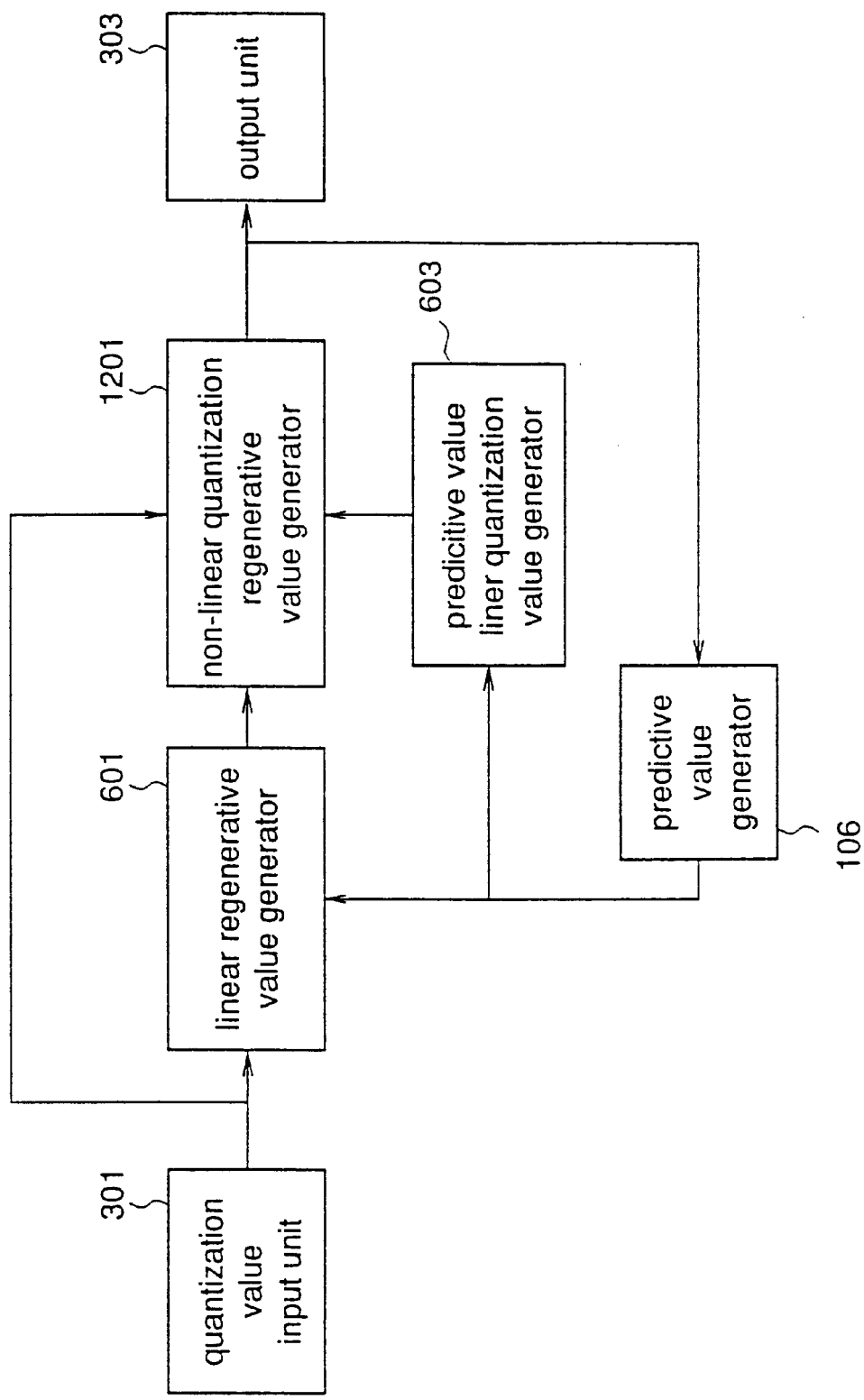
FIG. 35 is a block diagram showing a construction of an image decoding apparatus of Embodiment 20.

Referring to FIG. 35, a description will be given of the image decoding apparatus of Embodiment 20 in which the above coded data is decoded. When a specific quantization value is input, a non-linear quantization value generator 1201 outputs a specified regenerative value. Others are common to FIG. 25.

When a specific one is input to the quantization value input unit 301, the unit 301 outputs it to the non-linear quantization value generator 1201, and the generator 1201 outputs a specified regenerative value to the output unit 308. The above specific one is a specified non-linear quantization value that is output to the non-linear. quantization value generator 402 from the input value restriction unit 403. Other cases are processed in the same operation as in the image decoding apparatus of Embodiment 17.

Referring to FIG. 36(b), when the quantization value input to the quantization value input unit is neither −31 nor 31, the same processing as in Embodiment 17 is executed to obtain a regenerative value, which is then output. When it is −31 or 31, the non-linear quantization regenerative value generator 1201 outputs −123 and 123, respectively, to the output unit 308. This results in the same decoding result as in Embodiment 19.

The image coding and decoding apparatuses of Embodiment 20 requires no ROM table and the like, thereby realizing the coding/decoding processing at a small circuit. In addition, the apparatuses function to output a specified value against the input pixel value or quantization value of a specific area. Hence the dynamic range restriction due to the addition of quantization representative values to the vicinity of a predictive value, can be reduced by the construction having no function of generating shift values in Embodiment 16.

Embodiment 21

The image coding apparatus of Embodiment 21 is provided with an input restriction function.

The image coding apparatus of Embodiment 16 realized the non-linear quantization by adding quantization representative values to the vicinity of a predictive values of the quantization representative values obtained by linear quantization. The number of linear quantization representative values is reduced by the number of quantization representative values to be added. Thus the range of quantization in the linear quantization, i.e., dynamic range, should be restricted.

Figure 37:
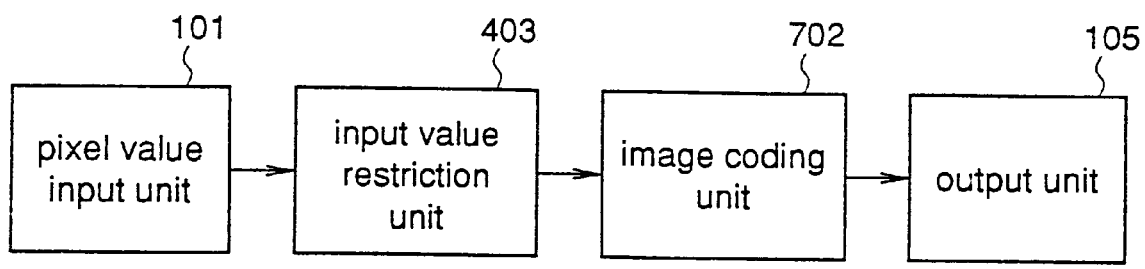
FIG. 37 is a block diagram showing a construction of an image coding apparatus of Embodiment 21 of the invention.

Referring to FIG. 37, there is shown the construction of the image coding apparatus of Embodiment 21. An input value restriction unit 403 restricts he input value. An image coding unit 702 comprises the linear quantization unit generator, the non-linear quantization unit generator, the quantization unit and the predictive value generator as shown in Embodiment 15. A pixel value input unit 101 and an output unit 105 are common to FIG. 16.

The image coding apparatus of Embodiment 21 performs the coding in the following operations. The input pixel value from the pixel value input unit 101 is input to the input value restriction unit 403, and then restricted to the range for which the quantization can be executed in the linear quantization unit of the image coding unit 702. The restricted input value is converted into a quantization value in the coding unit 702, in the same coding processing as in Embodiment 15. The obtained value is output to the output unit 105.

When m quantization representative points are added in the non-linear quantization unit, the restriction in the restriction unit 403 should be executed so that the dynamic range of the input pixel value is reduced by at least $m \times 2^k$ levels.

As described above, in the image coding apparatus of Embodiment 21, the input value restriction unit 403 restricts the input pixel values to the range capable of being processed by the linear quantization. It is therefore able to satisfactorily hold the characteristic that a fine image quality is obtainable from the predictive coding in the non-linear quantization processing that prevents the error propagation due to a small circuit.

It is noted that although the image coding unit 702 is constructed according to Embodiment 15, it may be constructed according to Embodiment 17, resulting in the same effect.

Embodiment 22

The image coding apparatus of Embodiment 22 is provided with a function to restrict a quantization value.

Figure 38:
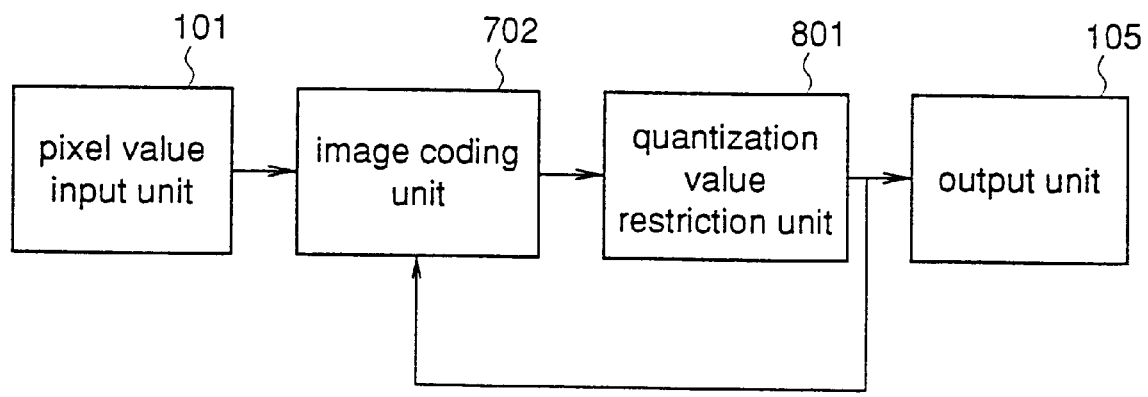
FIG. 38 is a block diagram showing a construction of an image coding apparatus of Embodiment 22 of the invention.

Referring to FIG. 38, there is shown the construction of the image coding apparatus. A quantization value restriction unit 801 restricts a quantization value. Others are common to FIG. 37.

The coding is carried out in the following. When an input pixel value is input from the pixel value input unit 101, the coding unit 702 converts the input pixel value into a quantization value in the same coding processing as in Embodiment 15, and the obtained value is input to a quantization value restriction unit 801. The unit 801 detects the value of the input quantization value and, when it is outside a range of from the minimum value to the maximum value determined to the quantization value, the detective value is restricted to the range and then output to the output unit 105.

Thus in Embodiment 22, the quantization value as the coding result is restricted to a specific range by the quantization value restriction unit 801, thereby omitting the restriction of the dynamic range of an input value. This enables to obtain the same effect as in Embodiment 21.

It is noted that although the image coding unit 702 is constructed according to Embodiment 15, it may be constructed according to Embodiment 17, resulting in the same effect.

Embodiment 23

The image coding apparatus of Embodiment 23 is provided with a function to restrict shift input.

The construction of the apparatus is common to Embodiment 18, the description will be given referring to FIG. 27. The linear quantization value generator 102 includes the shift input value restriction means that restricts the shift input value obtained from an input pixel value and a shift value to a specific range. Others are common to Embodiment 18.

Figure 39:
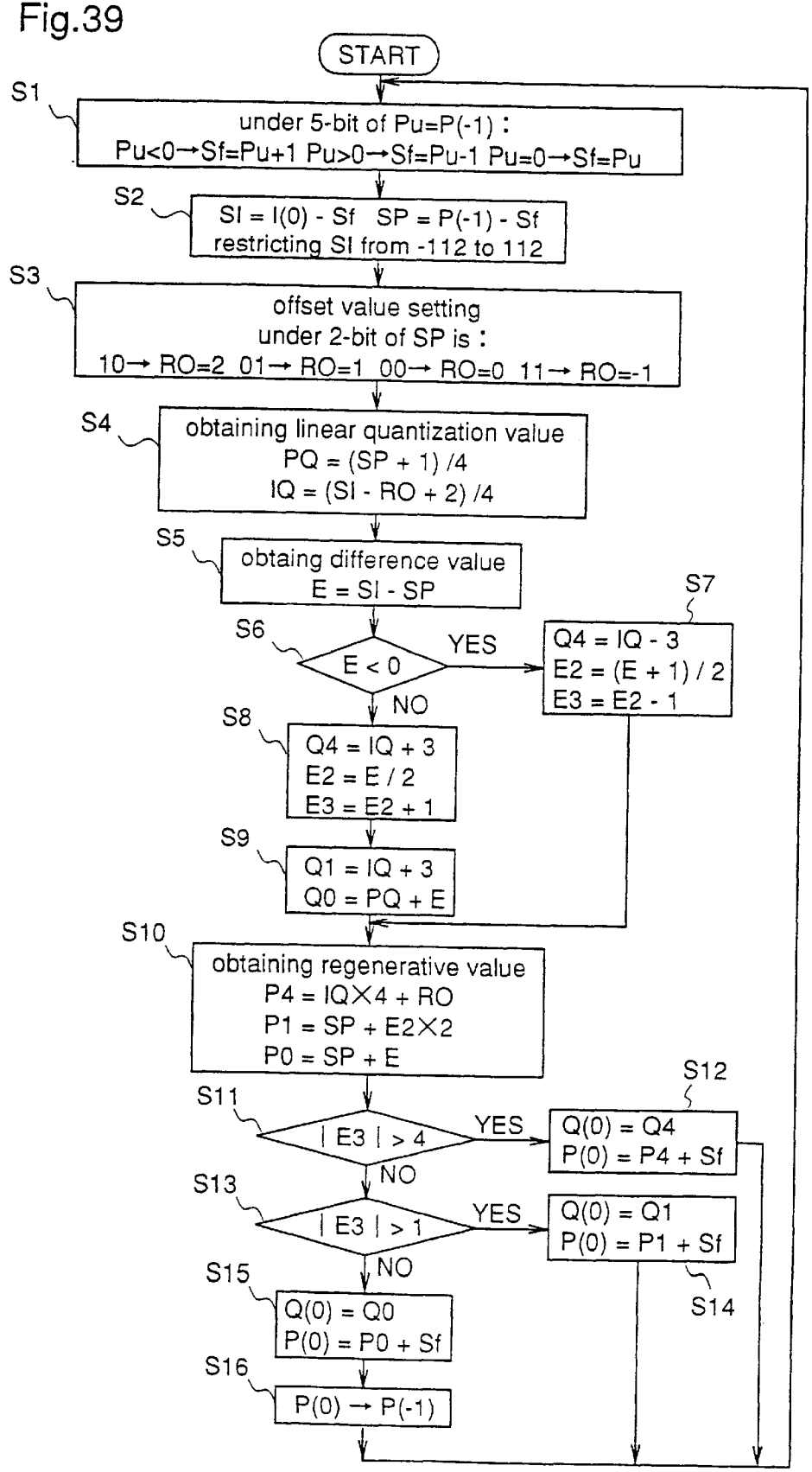
FIG. 39 is a flow chart showing a coding algorithm of an image coding apparatus of Embodiment 23 of the invention.

Referring to FIG. 39, there is shown a flow chart illustrating the coding algorithm of the image coding apparatus of Embodiment 23. The flow of FIG. 39 differs from that of FIG. 28 in that the range of a shift input value is restricted in step S2. Others are common to Embodiment 18.

Thus in Embodiment 23, the shift input restriction function provides the effect similar to the input restriction function of Embodiment 21. In the apparatus of Embodiment 21, however, when input data is determined as non-object by the fixed setting of the input restriction unit, such input data is never employed in the succeeding processing. Whereas in Embodiment 23 the shift input restrictions realizes the restriction depending on the shift value setting, permitting a further flexible application.

It is noted that although Embodiment 23 is constructed according to Embodiment 18, it may be constructed according to Embodiment 16, resulting in the same effect.

Embodiment 24

The image coding and decoding apparatus of Embodiment 24 is able to set error codes.

The construction of the image coding apparatus is same as that of Embodiment 22, and it will be described referring to FIG. 38. In Embodiment 24 so constructed, a quantization value restriction unit 801 enables to prohibit the use of a pattern of a specified n-bit in a normal quantization. This further enables to allocate an error code showing an error in a quantization value, to such a patterns not to be used. In a case where a quantization value is in 6-bit, the numerals from −31 to 31 are utilized in the quantization, and −32 is set to an error code.

Figure 40:
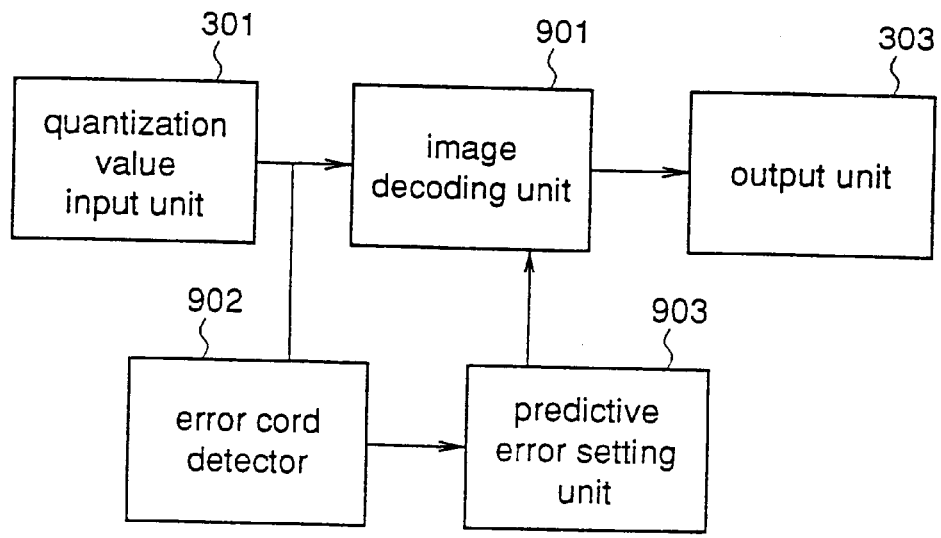
FIG. 40 is a block diagram showing a construction of an image decoding apparatus of Embodiment 24 of the invention.

Referring to FIG. 40, there is shown the construction of the image decoding apparatus of Embodiment 24 in which the error code processing is executed. An image decoding unit 901 comprises the linear quantization unit generator, the non-linear quantization unit generator and the predictive value generator shown in FIG. 18, and the unit 901 performs the same decoding processing as the image decoding apparatus of Embodiment 15. An error code detector 902 detects an error code of an input quantization value. A predictive error setting unit 903 sets a difference from a predictive value.

A description will be given of the decoding processing in the decoding apparatus of Embodiment 24. An input quantization value from the quantization value input unit 301 is first determined whether it is error code or not in the error code detector 902. For an error code, the difference from a predictive value is set to be 0 in the image decoding unit 901 through the predictive error setting unit 903, thereby outputting the predictive value as it is to the output unit 303.

When an input quantization value is not an error code, a normal decoding is carried out in the decoding unit 901 and its result is output to the output unti 303.

in the above processing, when an error code is detected, the predictive value is output as a regenerative value.

When an error is contained in the data coded by the image coding apparatus so constructed, parts including such an error is replaced with an error code, whereby the above function of the decoding apparatus is valid.

Figure 41:
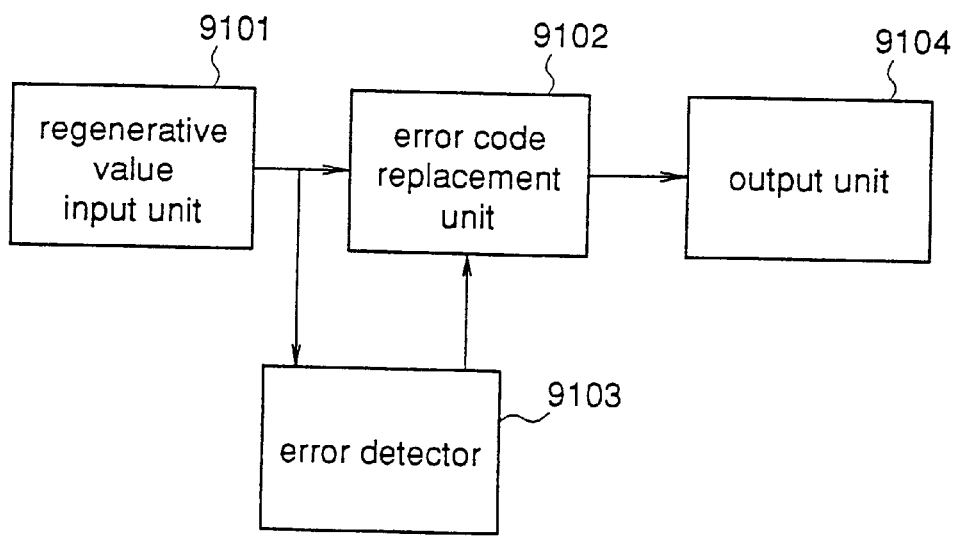
FIG. 41 is a block diagram showing a construction of an error code processing unit of the image decoding apparatus of Embodiment 24.

Referring to FIG. 41, there is shown a circuit for inserting an error code. A regenerative value input unit 9101 regenerates a coded data. An error code replacement unit 9102 replaces a quantization value of a regenerative data with an error code. An error detector 9103 detects an error of a regenerative data. An output unit 9104 outputs data after the replacement.

In the error code insertion circuit so constructed, the error detector 9103 detects whether there is an error in data regenerated from a magnetic tape or a transmission signal in the input unit 9101. The quantization value whose error is detected in the detector 9103 is then replaced with an error code in the error code replacement unit 9102. In this way, the quantization value that may have an error is replaced with an error code and then output to the output unit 9104.

Thus the image coding and decoding apparatuses of Embodiment 24 are provided with the quantization value input unit 301, thereby setting a specific quantization value as an error code. The obtained coded data is subjected to the error code replacement processing by the error code insertion circuit as described. Therefore, in the image decoding apparatus provided with the error code detector 902 and the predictive error setting unit 903, when an error code is detected, a predictive value itself is employed as a regenerative value, thereby minimizing the influence of the error.

Embodiment 25

It should be noted that the image coding and decoding apparatuses as described in the foregoing have many common processing. In Embodiment 25, therefore, there are shown a circuit common to these apparatuses.

Figure 42:
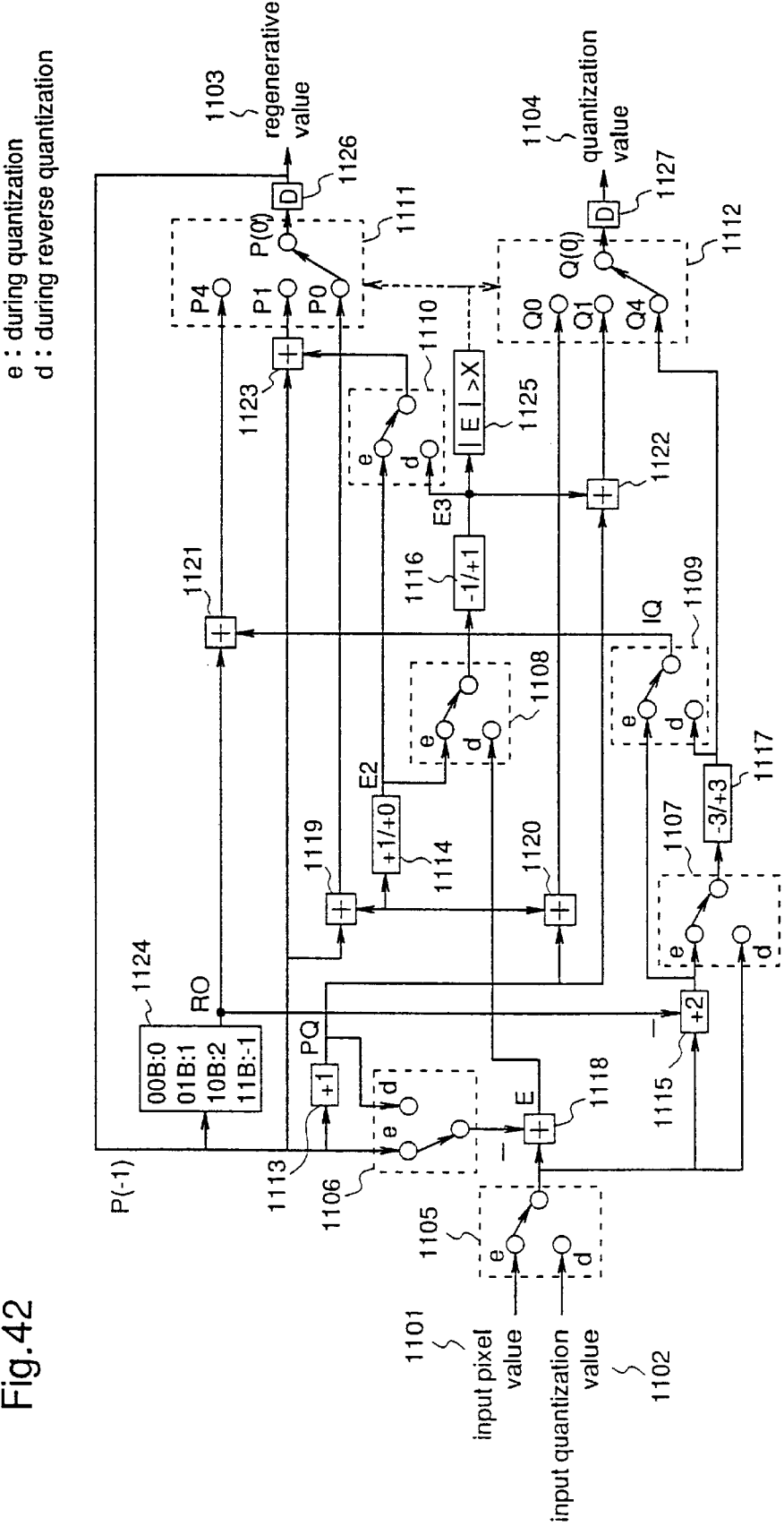
FIG. 42 is a block diagram showing a construction of a circuit shared between an image coding apparatus and an image decoding apparatus of Embodiment 25 of the invention.
Figure 43:
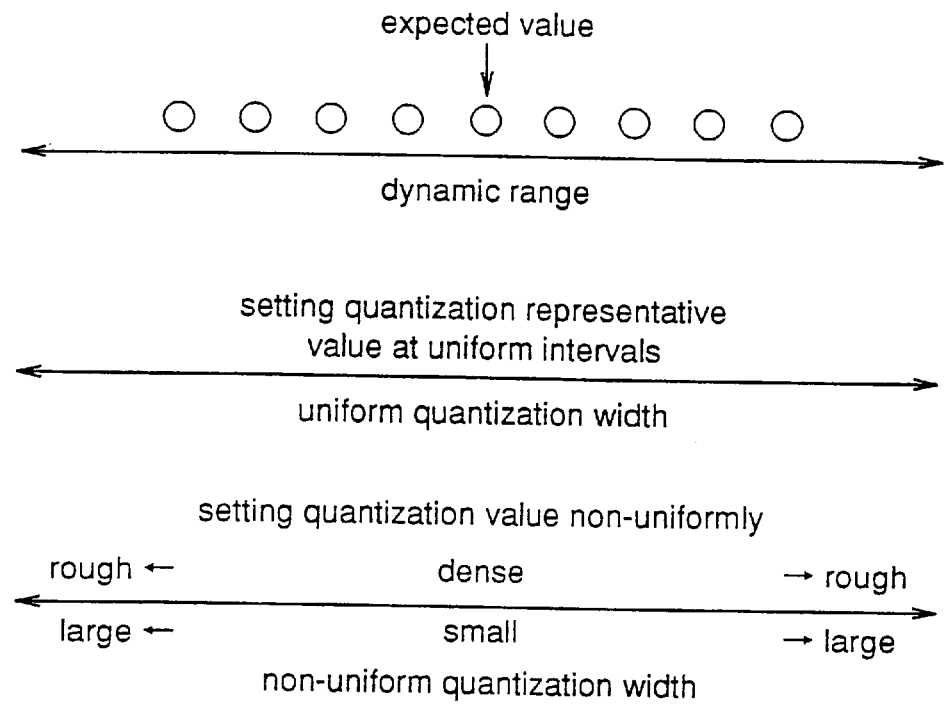
FIG. 43 is a diagram for explaining a non-linear quantization processing of a conventional image coding apparatus.

Referring to FIG. 42, there is shown the construction common to the coding apparatus and the decoding apparatus. A pixel value input unit 1101, a quantization value input unit 1102, a quantization regenerative value output unit 1103 and a quantization value output unit 1104 are those which are shown in FIG. 16 and FIG. 18 in Embodiment 15.

Numerals 1105 to 1112 designate switches, 1113 to 1123 designate adder-subtracters, 1124 and 1125 designate comparators, and 1126 and 1127 designate delay units.

In the circuit shown in FIG. 42, at the quantization (decoding) the switches 1105 to 1110 are connected in "e" direction, while at the reverse quantization (decoding) they are connected to "d" direction. Therefore at the coding, the same processing as the aforesaid image coding algorithm as previously described can be realized, and at the decoding, the same processingas the aforesaid image decoding algorithm can be realized.

Thus in the common circuit of Embodiment 25, the coding processing and the decoding processing can be switched, permitting to share almost of all circuits. This enables to considerably reduce the circuit size, leading to the reduced costs and effective applications of the device resource.

While the present invention has been described in terms of particular illustrative embodiments, many other modifications will occur to those skilled in the art without departing from the spirit and scope of the appended claims. The invention can comply with optional image signal. As to the method of generating a predictive value, the bit numbers of an input pixel value and a quantization value and the like, optional methods other than the embodiments are applicable. The constructions illustrated in the embodiments can be realized in a variety of methods and processing order, and also be realized by software. Additionally, the image coding apparatus and decoding apparatuses utilizing a combination of the above mentioned plural techniques are available.

What is claimed is:

1. An image coding apparatus that codes an input pixel value whose dynamic range is d-bit, to obtain a quantization value of n-bit and transmits it:

predictive value generating means for generating a predictive value of the input pixel value from pixels in the vicinity of the input pixel;

linear quantization unit generating means for generating a linear quantization unit having linear quantization representative points for quantization whose accuracy is d-bit and quantization width is $2^{d-n}$, the number of which points being obtained by subtracting a pre-set addition upper limit number from $2^n$;

non-linear quantization unit generating means for generating a non-linear quantization unit that adds, to the quantization representative values of said linear quantization unit, quantization representative points of not more than said addition upper limit number are added in the vicinity of said predictive value, the quantization width in the vicinity of said predictive value of said non-linear quantization unit being smaller than that of said linear quantization unit; and quantization means for quantizing the input pixel value by said non-linear quantization unit to obtain a quantization value.

2. The image coding apparatus of claim 1 further comprising means for generating a shift value from a predictive value generated by said predictive value generating means, wherein:

said non-linear quantization unit generating means adds said quantization representative points in the vicinity of a shift predictive value which is obtained by subtracting said shift value from said predictive value; and said quantization means quantizes a shift input value which is obtained by subtracting said shift value from an input pixel value in said non-linear quantization unit.

3. The image coding apparatus of claim 2 wherein said linear quantization unit generating means has offset value adding means that determines an offset value by a remainder after dividing said predictive value by $2^{d-n}$, said offset value being added to the linear quantization representative point of said linear quantization unit.

4. The image coding apparatus of claim 2 further comprising shift input value restriction means for restricting the magnitude of said shift input value to output a restricted shift input value.

5. The image coding apparatus of claim 4 wherein said quantization means defines a specific n-bit pattern as an error code, said pattern being not used for a quantization value.

6. The image coding apparatus of claim 2 wherein said quantization means has quantization value restriction means for restricting the magnitude of the generated quantization value.

7. The image coding apparatus of claim 6 wherein said quantization means defines a specific n-bit pattern as an error code, said pattern being not used for a quantization value.

8. The image coding apparatus of claim 2 wherein said quantization means generates a quantization value so that when an input pixel value is minimum, its corresponding quantization value is minimum, and, as increasing the input pixel value, its corresponding quantization value increases.

9. The image coding apparatus of claim 1 wherein said non-linear quantization unit generating means adds, to the quantization representative values of said linear quantization unit, quantization representative points whose number is not more than that obtained by subtracting a pre-set second addition upper limit number from said addition upper limit number in the vicinity of said predictive value, to obtain the quantization width in the vicinity of said predictive value being smaller than that of said linear quantization unit; and adding quantization representative points of not more than said second addition upper limit number in a range covering said addition upper limit number, having a quantization width is $2^{d-n}$, at which said linear quantization point is not set by said linear quantization unit generating means, thereby generating a non-linear quantization unit.

10. The image coding apparatus of claim 9 wherein said linear quantization unit generating means has offset value adding means that determines an offset value by a remainder after dividing said predictive value by $2^{d-n}$, said offset value being added to the linear quantization representative point of said linear quantization unit.

11. The image coding apparatus of claim 9 further comprising input value restriction means for restricting the magnitude of said input pixel value to output a restricted input value.

12. The image coding apparatus of claim 11 wherein said quantization means defines a specific n-bit pattern as an error code, said pattern being not used for a quantization value.

13. The image coding apparatus of claim 9 wherein said quantization means has quantization value restriction means for restricting the magnitude of the generated quantization value.

14. The image coding apparatus of claim 13 wherein said quantization means defines a specific n-bit pattern as an error code, said pattern being not used for a quantization value.

15. The image coding apparatus of claim 9 wherein said quantization means generates a quantization value so that when an input pixel value is minimum, its corresponding quantization value is minimum, and, as increasing the input pixel value, its corresponding quantization value increases.

16. The image coding apparatus of claim 1 wherein said linear quantization unit generating means has offset value adding means that determines an offset value by a remainder after dividing said predictive value by $2^{d-n}$, said offset value being added to the linear quantization representative point of said linear quantization unit.

17. The image coding apparatus of claim 1 further comprising input value restriction means for restricting the magnitude of said input pixel value to output a restricted input value.

18. The image coding apparatus of claim 17 wherein said quantization means defines a specific n-bit pattern as an error code, said pattern being not used for an output quantization value.

19. The image coding apparatus of claim 1 wherein said quantization means has quantization value restriction means for restricting the magnitude of the generated quantization value.

20. The image coding apparatus of claim 19 wherein said quantization means defines a specific n-bit pattern as an error code, said pattern being not used for a quantization value.

21. The image coding apparatus of claim 1 wherein said quantization means generates a quantization value so that when an input pixel value is minimum, its corresponding quantization value is minimum, and, as increasing the input pixel value, its corresponding quantization value increases value.

22. The image coding apparatus that codes an input pixel value whose dynamic range is d-bit, to obtain a quantization value of n-bit and transmits it:
predictive value generating means for generating a predictive value of the input pixel value from pixels in the vicinity of the input pixel;
linear quantization value generating means that divides an input pixel value by $2^{d-n}$ in d-bit accuracy, to generate a linear quantization value; and
non-linear quantization value generating means that corrects said linear quantization value based on a difference value between said input pixel value and said predictive value, to generate a non-linear quantization value.

23. The image coding apparatus of claim 22 further comprising shift value generating means for generating a shift value from a predictive value generated by said predictive value generating means, wherein:
said linear quantization unit generating means that divides a shift input value which is obtained by subtracting said shift value from an input pixel value, by $2^{d-n}$, to generate a linear quantization value in d-bit accuracy.

24. The image coding apparatus of claim 23 wherein said linear quantization value generating means has offset value adding means that determines an offset value by a remainder after dividing said predictive value by $2^{d-n}$, said offset value being added to said input pixel value.

25. The image coding apparatus of claim 23 further comprising shift input value restriction means for restricting the magnitude of said shift input value to output a restricted shift input value.

26. The image coding apparatus of claim 25 wherein said non-quantization value generating means defines a specific n-bit pattern as an error code, said pattern being not used for a quantization value.

27. The image coding apparatus of claim 23 wherein said non-linear quantization value generating means has quantization value restriction means for restricting the magnitude of the generated quantization value.

28. The image coding apparatus of claim 27 wherein said non-quantization value generating means defines a specific n-bit pattern as an error code, said pattern being not used for a quantization value.

29. The image coding apparatus of claim 23 wherein said non-linear quantization value generating means generates a quantization value so that when an input pixel value is minimum, its corresponding quantization value is minimum, and, as increasing the input pixel value, its corresponding quantization value increases.

30. The image coding apparatus of claim 22 further comprising input value restriction means that examines whether the magnitude of said input pixel value is in a specified range and, when it is in the range, outputs said input pixel value to said linear quantization value generating means, and when it is outside the range, does not output said input pixel value but outputs a specified restricted quantization value to said non-linear quantization value generating means, wherein:
said non-linear quantization value generating means regards said restricted quantization value as a non-linear quantization value when said restricted quantization value is input from said input value restriction means.

31. The image coding apparatus of claim 30 wherein said linear quantization value generating means has offset value adding means that determines an offset value by a remainder after dividing said predictive value by $2^{d-n}$, said offset value being added to said input pixel value.

32. The image coding apparatus of claim 30 wherein said non-linear quantization value generating means has quantization value restriction means for restricting the magnitude of the generated quantization value.

33. The image coding apparatus of claim 32 wherein said non-quantization value generating means defines a specific n-bit pattern as an error code, said pattern being not used for a quantization value.

34. The image coding apparatus of claim 30 wherein said non-linear quantization value generating means generates a quantization value so that when an input pixel value is minimum, its corresponding quantization value is minimum, and, as increasing the input pixel value, its corresponding quantization value increases.

35. The image coding apparatus of claim 22 wherein said linear quantization value generating means has offset value adding means that determines an offset value by a remainder after dividing said predictive value by $2^{d-n}$, said offset value being added to said input pixel value.

36. The image coding apparatus of claim 9 further comprising input value restriction means for restricting the magnitude of said input pixel value to output a restricted input value.

37. The image coding apparatus of claim 36 wherein said quantization means defines a specific n-bit pattern as an error code, said pattern being not used for a quantization value.

38. The image coding apparatus of claim 22 wherein said non-linear quantization value generating means has quantization value restriction means for restricting the magnitude of the generated quantization value.

39. The image coding apparatus of claim 38 wherein said non-quantization value generating means defines a specific n-bit pattern as an error code, said pattern being not used for a quantization value.

40. The image coding apparatus of claim 22 wherein said non-linear quantization value generating means generates a quantization value so that when an input pixel value is minimum, its corresponding quantization value is minimum, and, as increasing the input pixel value, its corresponding quantization value increases.

41. The image decoding apparatus that decodes a quantization value of n-bit to obtain a regenerative value whose dynamic range is d-bit, comprising:
predictive value generating means for generating a predictive value of an input quantization value from pixels in the vicinity of the input quantization value;
linear quantization unit generating means for generating a linear quantization unit having linear quantization representative points for quantization whose accuracy is d-bit and quantization width is $2^{d-n}$, the number of which points being obtained by subtracting a pre-set addition upper limit number for $2^n$;
non-linear quantization unit generating means for generating a non-linear quantization unit that adds, to the quantization representative values of said linear quantization unit, quantization representative points of not more than said addition upper limit number are added in the vicinity of said predictive value, the quantization width in the vicinity of said predictive value of said non-linear quantization unit being smaller than that of said linear quantization unit; and reverse quantization means for performing reverse quantizing of the input pixel value by said non-linear quantization unit to obtain a regenerative value.

42. The image decoding apparatus of claim 41 further comprising shift value generating means for generating a shift value from said predictive value wherein:

said non-linear quantization unit generating means generates a non-linear quantization unit by adding the quantization representative point of not more than said number in the vicinity of a shift predictive value which is obtained by subtracting said shift value from said predictive value, and adds said shift value to said regenerative value to obtain a pixel value and then outputs it.

43. The image decoding apparatus of claim 42 wherein said linear quantization unit generating means has offset value adding means that determines an offset value by a remainder after dividing said predictive value by $2^{d-n}$, said offset value being added to the linear quantization representative point of said linear quantization unit.

44. The image decoding apparatus of claim 42 wherein a specific n-bit pattern is regarded as an error code that is not used in a normal coding, and said predictive value is regarded as said regenerative value when a pattern of said input quantization value agrees with a pattern of said error code.

45. The image decoding apparatus of claim 44 wherein when the input quantization value to be transmitted has a possibility of including an error, said input quantization value is replaced with said error code.

46. The image decoding apparatus of claim 41 wherein said non-linear quantization unit generating means adds, to the quantization representative values of said linear quantization unit, quantization representative points whose number is not more than that obtained by subtracting a pre-set second addition upper limit number from said addition upper limit number in the vicinity of said predictive value, to obtain the quantization width in the vicinity of said predictive value being smaller than that of said linear quantization unit; and adding quantization representative points of not more than said second addition upper limit number in a range covering said addition upper limit number, having a quantization width is $2^{d-n}$, at which said linear quantization point is not set by said linear quantization unit generating means, thereby generating a non-linear quantization unit.

47. The image decoding apparatus of claim 46 wherein said linear quantization unit generating means has offset value adding means that determines an offset value by a remainder after dividing said predictive value by $2^{d-n}$, said offset value being added to the linear quantization representative point of said linear quantization unit.

48. The image decoding apparatus of claim 46 wherein a specific n-bit pattern is regarded as an error code that is not used in a normal coding, and said predictive value is regarded as said regenerative value when a pattern of said input quantization value agrees with a pattern of said error code.

49. The image decoding apparatus of claim 48 wherein when the input quantization value to be transmitted has a possibility of including an error, said input quantization value is replaced with said error code.

50. The image decoding apparatus of claim 41 wherein said linear quantization unit generating means has offset value adding means that determines an offset value by a remainder after dividing said predictive value by $2^{d-n}$, said offset value being added to the linear quantization representative point of said linear quantization unit.

51. The image decoding apparatus of claim 41 wherein a specific n-bit pattern is regarded as an error code that is not used in a normal coding, and said predictive value is regarded as said regenerative value when a pattern of said input quantization value agrees with a pattern of said error code.

52. The image decoding apparatus of claim 51 wherein when the input quantization value to be transmitted has a possibility of including an error, said input quantization value is replaced with said error code.

53. The image decoding apparatus that decodes a quantization value of n-bit to obtain a regenerative value whose dynamic range is d-bit, comprising:

predictive value generating means for generating a predictive value of an input quantization value from pixels in the vicinity of the input quantization value;

predictive value linear quantization value generating means that divides an input predictive value by $2^{d-n}$, to generate a predictive value linear quantization value in d-bit accuracy;

linear quantization regenerative value generating means that multiplies said input quantization value to generate a linear quantization regenerative value in d-bit accuracy; and reverse quantization means for generating a regenerative value by correcting said predictive value linear quantization value based on a difference value between said input quantization value and said predictive value linear quantization value.

54. The image decoding apparatus of claim 53 further comprising shift value generating means for generating a shift value from said predictive value wherein:

said predictive value linear quantization value generating means that divides a shift predictive value which is obtained by subtracting said shift value from said predictive value, by $2^{d-n}$, to generate a predictive value linear quantization value, and adds said shift value to said regenerative value to obtain a pixel value and then outputs it.

55. The image coding apparatus of claim 54 wherein said linear quantization regenerative value generating means has offset value adding means that determines an offset value by a remainder after dividing said predictive value by $2^{d-n}$, said offset value being added to said input pixel value.

56. The image decoding apparatus of claim 54 wherein a specific n-bit pattern is regarded as an error code that is not used in a normal coding, and said predictive value is regarded as said regenerative value when a pattern of said input quantization value agrees with a pattern of said error code.

57. The image decoding apparatus of claim 56 wherein when the input quantization value to be transmitted has a possibility of including an error, said input quantization value is replaced with said error code.

58. The image decoding apparatus of claim 53 wherein said linear quantization regenerative value generating means generates a specified linear quantization regenerative value when said input quantization value is a specified value.

59. The image coding apparatus of claim 58 wherein said linear quantization regenerative value generating means has offset value adding means that determines an offset value by a remainder after dividing said predictive value by $2^{d-n}$, said offset value being added to said input pixel value.

60. The image decoding apparatus of claim 58 wherein a specific n-bit pattern is regarded as an error code that is not used in a normal coding, and said predictive value is regarded as said regenerative value when a pattern of said input quantization value agrees with a pattern of said error code.

61. The image decoding apparatus of claim 60 wherein when the input quantization value to be transmitted has a possibility of including an error, said input quantization value is replaced with by said error code.

62. The image coding apparatus of claim 53 wherein said linear quantization regenerative value generating means has offset value adding means that determines an offset value by a remainder after dividing said predictive value by $2^{d-n}$, said offset value being added to said input pixel value.

63. The image decoding apparatus of claim 53 wherein a specific n-bit pattern is regarded as an error code that is not used in a normal coding, and said predictive value is regarded as said regenerative value when a pattern of said input quantization value agrees with a pattern of said error code.

64. The image decoding apparatus of claim 63 wherein when the input quantization value to be transmitted has a possibility of including an error, said input quantization value is replaced with said error code.

* * * * *